US009121275B2

(12) United States Patent
Patterson et al.

(10) Patent No.: US 9,121,275 B2
(45) Date of Patent: Sep. 1, 2015

(54) POSITIVE DISPLACEMENT EXPANDER

(71) Applicant: Exponential Technologies, Inc., Calgary (CA)

(72) Inventors: Curtis Patterson, Calgary (CA); Alejandro Juan, Calgary (CA); Kristjan Gottfried, Calgary (CA); Erik Farrell, Calgary (CA)

(73) Assignee: Exponential Technologies, Inc., Calgary (CA)

( * ) Notice: Subject to any disclaimer, the term of this patent is extended or adjusted under 35 U.S.C. 154(b) by 146 days.

(21) Appl. No.: 13/720,084

(22) Filed: Dec. 19, 2012

(65) Prior Publication Data

US 2013/0200634 A1 Aug. 8, 2013

Related U.S. Application Data

(60) Provisional application No. 61/577,576, filed on Dec. 19, 2011.

(51) Int. Cl.
| | | |
|---|---|---|
| *F01C 1/08* | (2006.01) | |
| *F01C 1/18* | (2006.01) | |
| *F01C 19/00* | (2006.01) | |
| *F01C 3/08* | (2006.01) | |
| *F01C 13/00* | (2006.01) | |
| *F01C 21/08* | (2006.01) | |
| *F01C 19/06* | (2006.01) | |

(Continued)

(52) U.S. Cl.
CPC . *F01C 19/00* (2013.01); *F01C 3/08* (2013.01); *F01C 13/00* (2013.01); *F01C 19/06* (2013.01); *F01C 21/00* (2013.01); *F01C 21/08* (2013.01); *H02K 7/1823* (2013.01); *Y10T 29/49012* (2015.01)

(58) Field of Classification Search
CPC .......... F01C 19/00; F01C 21/00; F01C 19/06; F01C 21/08; F01C 3/08; F01C 13/00; H02K 7/1823; Y10T 29/49012
USPC ................................................ 418/191–206.1
See application file for complete search history.

(56) References Cited

U.S. PATENT DOCUMENTS 2,242,058 A * 5/1941 Cuny ............................ 418/195
2,431,817 A * 12/1947 Mann ........................... 418/61.1
(Continued)

FOREIGN PATENT DOCUMENTS

| CA | 2491298 | 6/2006 |
| CA | 2759433 | 10/2008 |

(Continued)

*Primary Examiner* — Hoang Nguyen
(74) *Attorney, Agent, or Firm* — Dwayne E. Rogge; Schacht Law Offices, Inc.

(57) ABSTRACT

Provided herein are multiple variations, applications, and variations for producing electrical power from a flowing fluid such as a gas or liquid under pressure, for example natural gas flowing through a pipeline, by means of one or more positive displacement devices that drive one or more electrical generators. The electrical generators may be immersed in the flow stream together with the positive displacement devices as disclosed, or alternately may be isolated from the flow stream, such as by magnetic coupling, in order to promote longevity and to decrease the risk of accidental discharge or explosion of the fluid in the flow stream. To further decrease such risks, the positive displacement devices may isolate the drive fluid from the environment without the use of dynamic seals.

24 Claims, 43 Drawing Sheets

(51) Int. Cl.
*F01C 21/00* (2006.01)
*H02K 7/18* (2006.01)

(56) References Cited

U.S. PATENT DOCUMENTS

| | | | | |
|---|---|---|---|---|
| 2,582,413 | A | * | 1/1952 | Clark .......................... 418/153 |
| 3,101,700 | A | * | 8/1963 | Bowdish ...................... 418/195 |
| 3,856,440 | A | | 12/1974 | Wildhaber |
| 4,373,881 | A | * | 2/1983 | Matsushita .................. 418/195 |
| 4,799,870 | A | * | 1/1989 | McMaster .................... 418/151 |
| 5,171,138 | A | | 12/1992 | Forrest |
| 5,755,196 | A | | 5/1998 | Klassen |
| 6,036,463 | A | | 3/2000 | Klassen |
| 6,239,361 | B1 | | 5/2001 | Snaper |
| 6,336,389 | B1 | | 1/2002 | English et al. |
| 6,497,564 | B2 | | 12/2002 | Klassen |
| 6,612,821 | B1 | * | 9/2003 | Kuijpers et al. ............... 418/152 |
| 6,634,873 | B2 | | 10/2003 | Klassen |
| 6,694,858 | B2 | | 2/2004 | Grimes |
| 6,705,161 | B1 | | 3/2004 | Klassen |
| 6,739,852 | B1 | | 5/2004 | Klassen |
| 6,887,057 | B2 | | 5/2005 | Klassen |
| 6,923,055 | B2 | * | 8/2005 | Klassen ......................... 73/265 |
| 2007/0207049 | A1 | * | 9/2007 | Ooi .............................. 418/195 |
| 2010/0074786 | A1 | | 3/2010 | Juan et al. |
| 2010/0133834 | A1 | | 6/2010 | Nimberger |
| 2010/0215531 | A1 | | 8/2010 | Arnold |

FOREIGN PATENT DOCUMENTS

| | | |
|---|---|---|
| GB | 1269063 | 3/1972 |
| WO | WO2010047602 | 4/2010 |

* cited by examiner

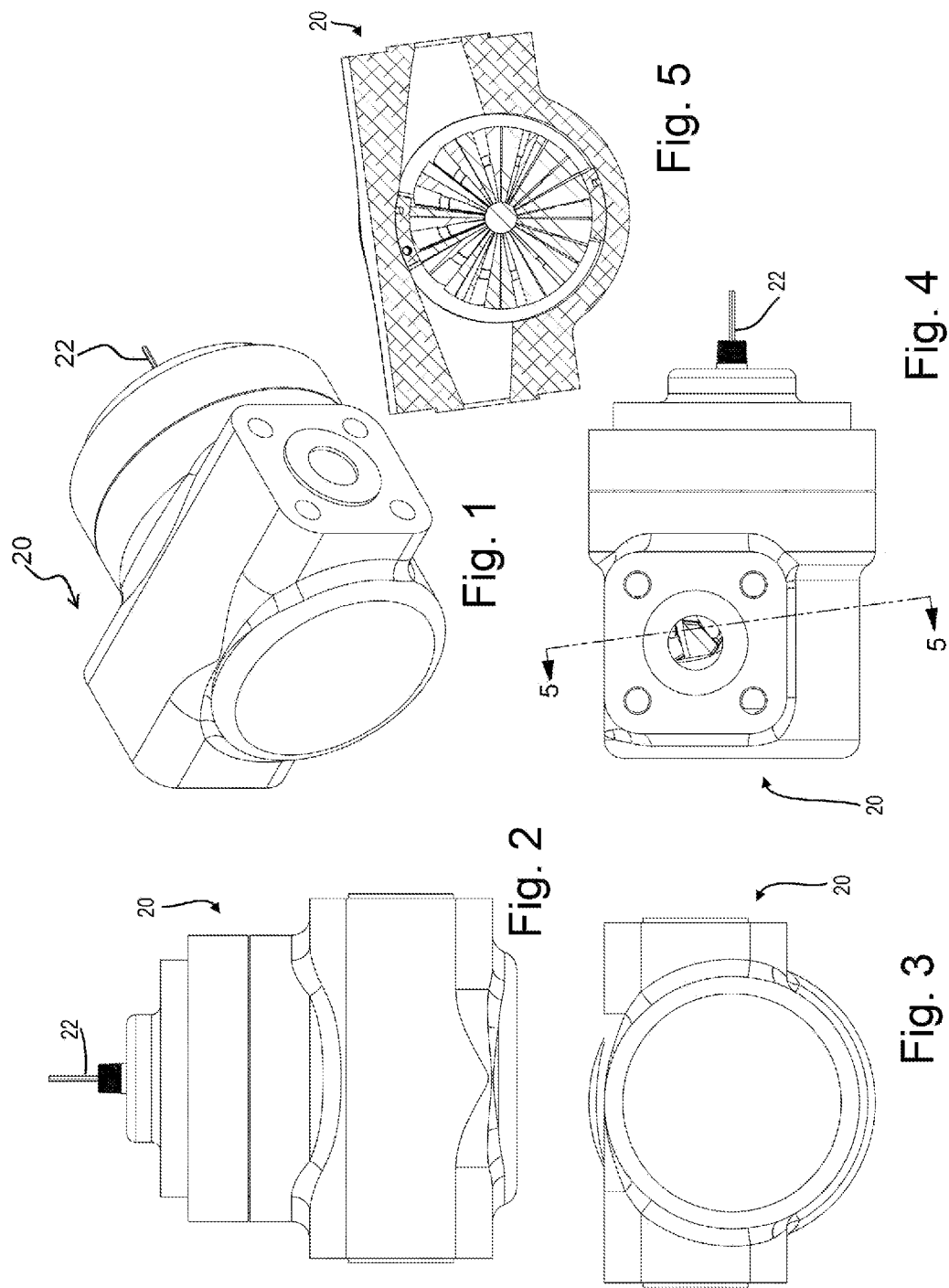

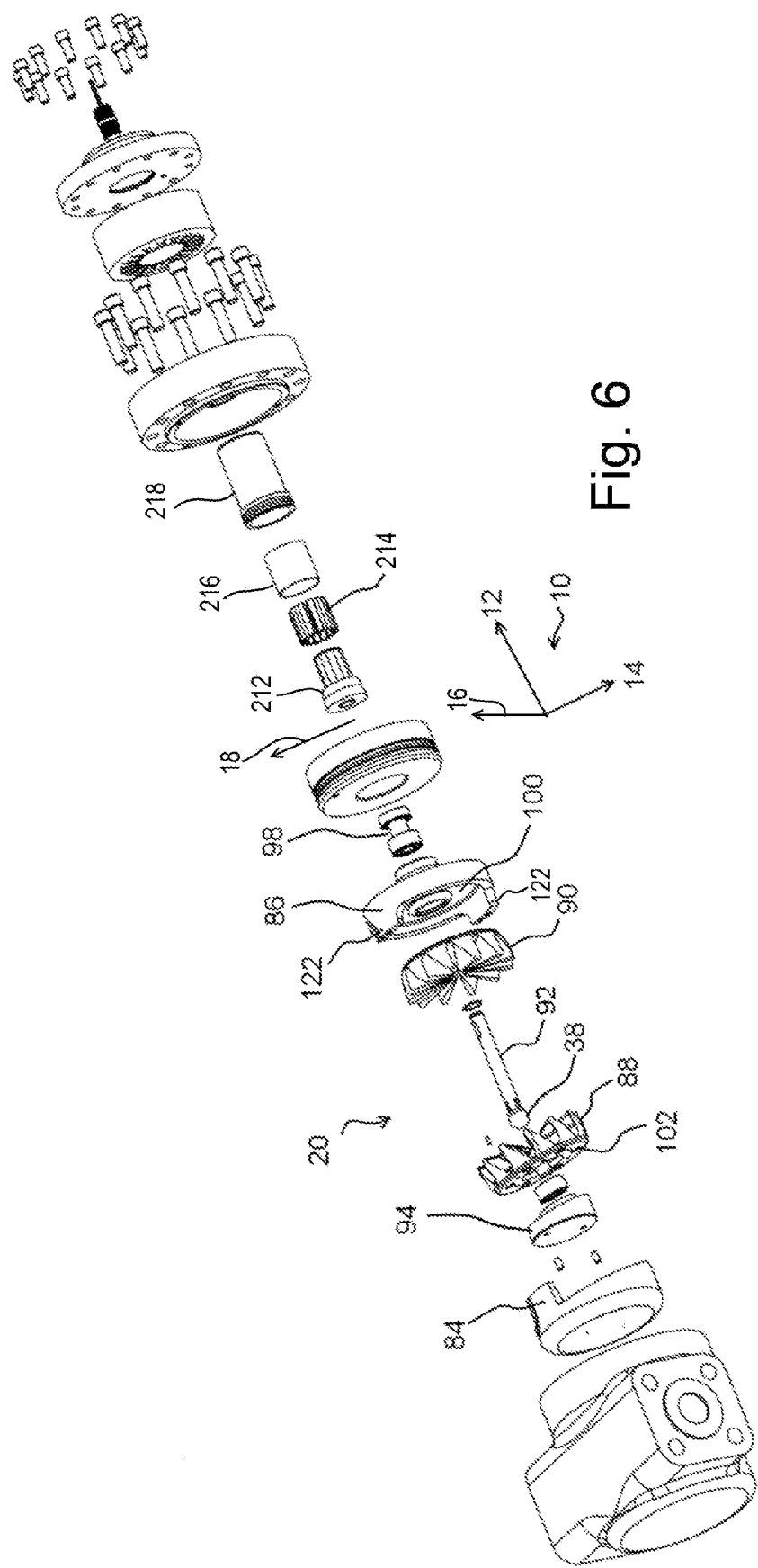

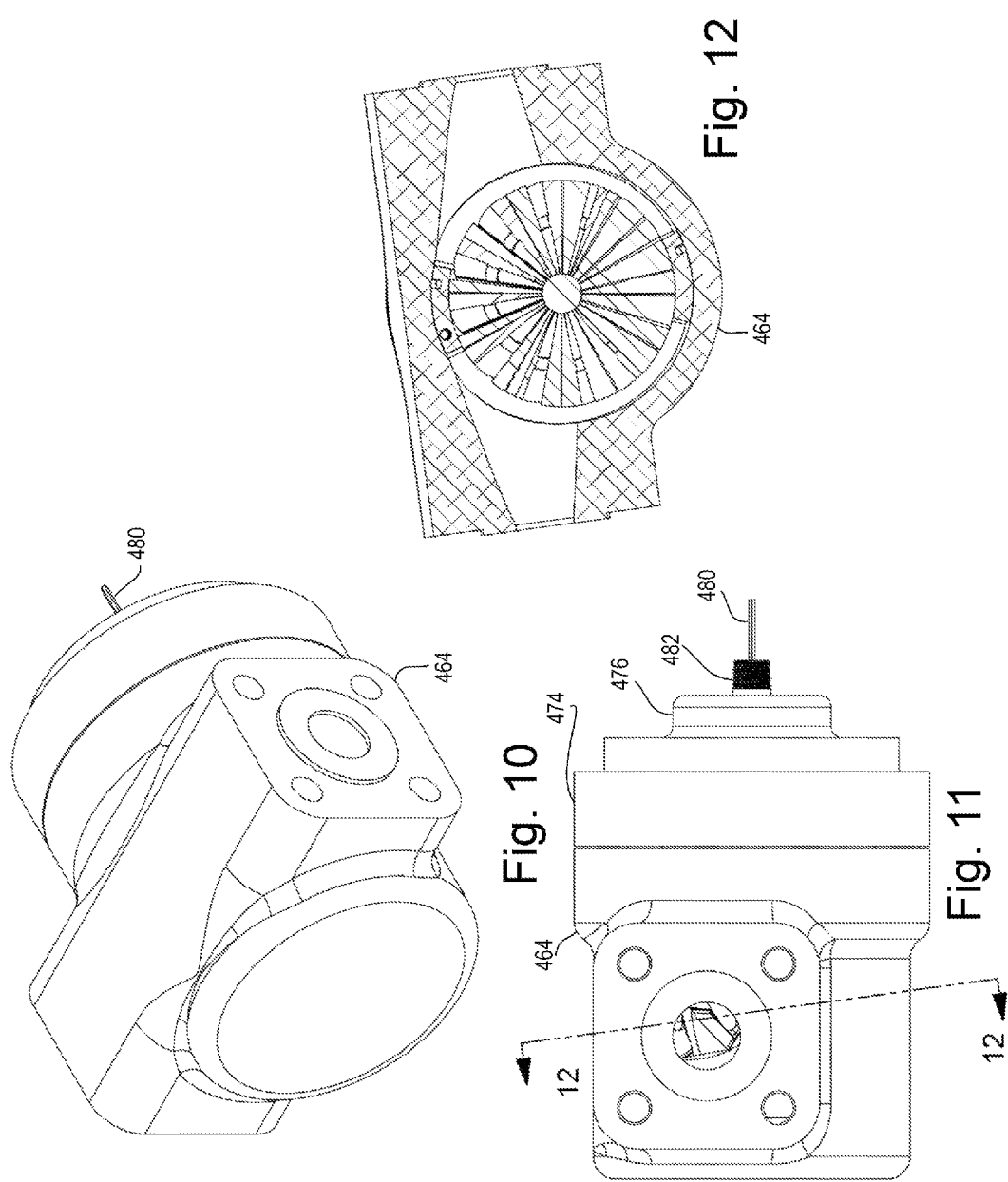

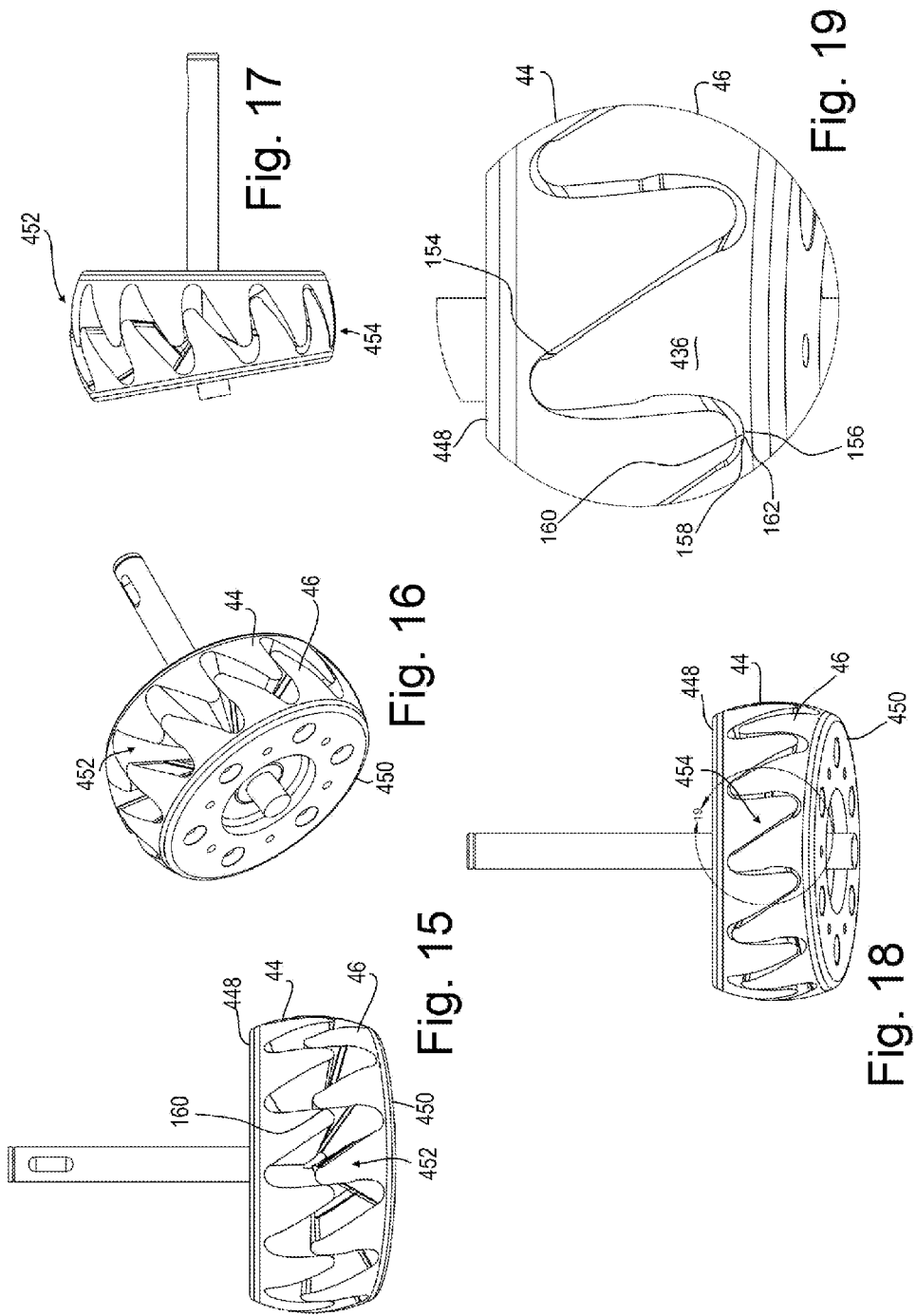

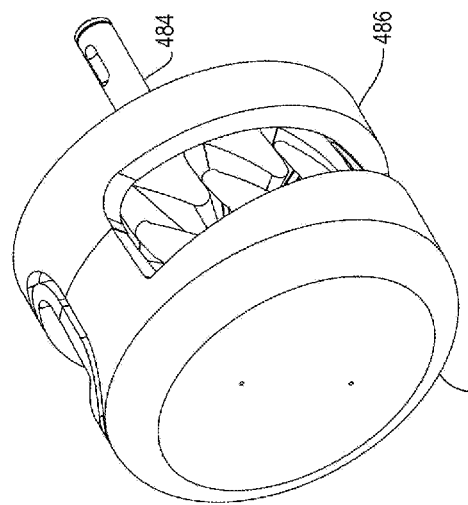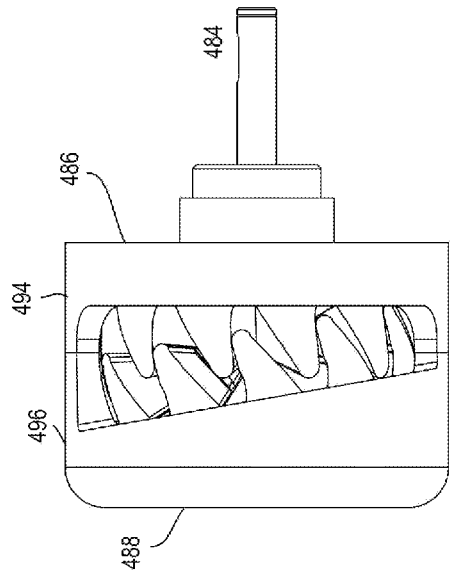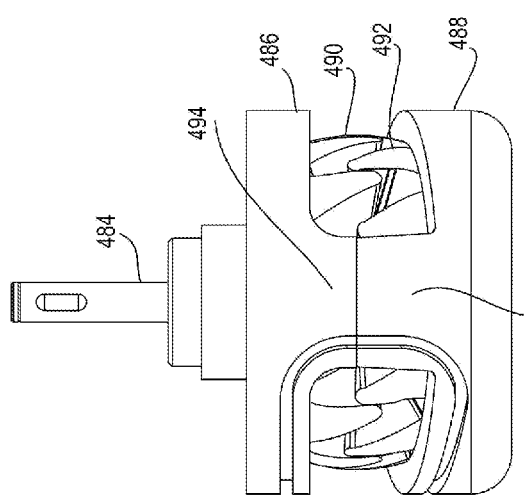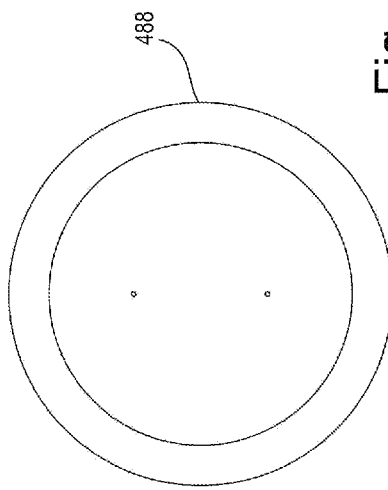

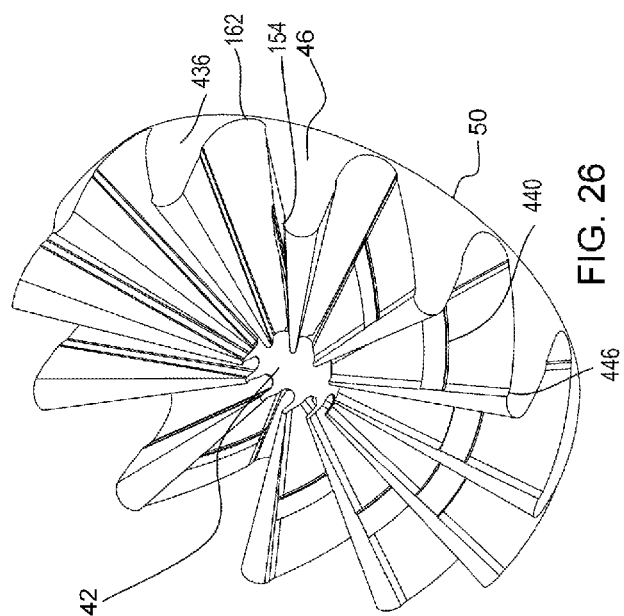

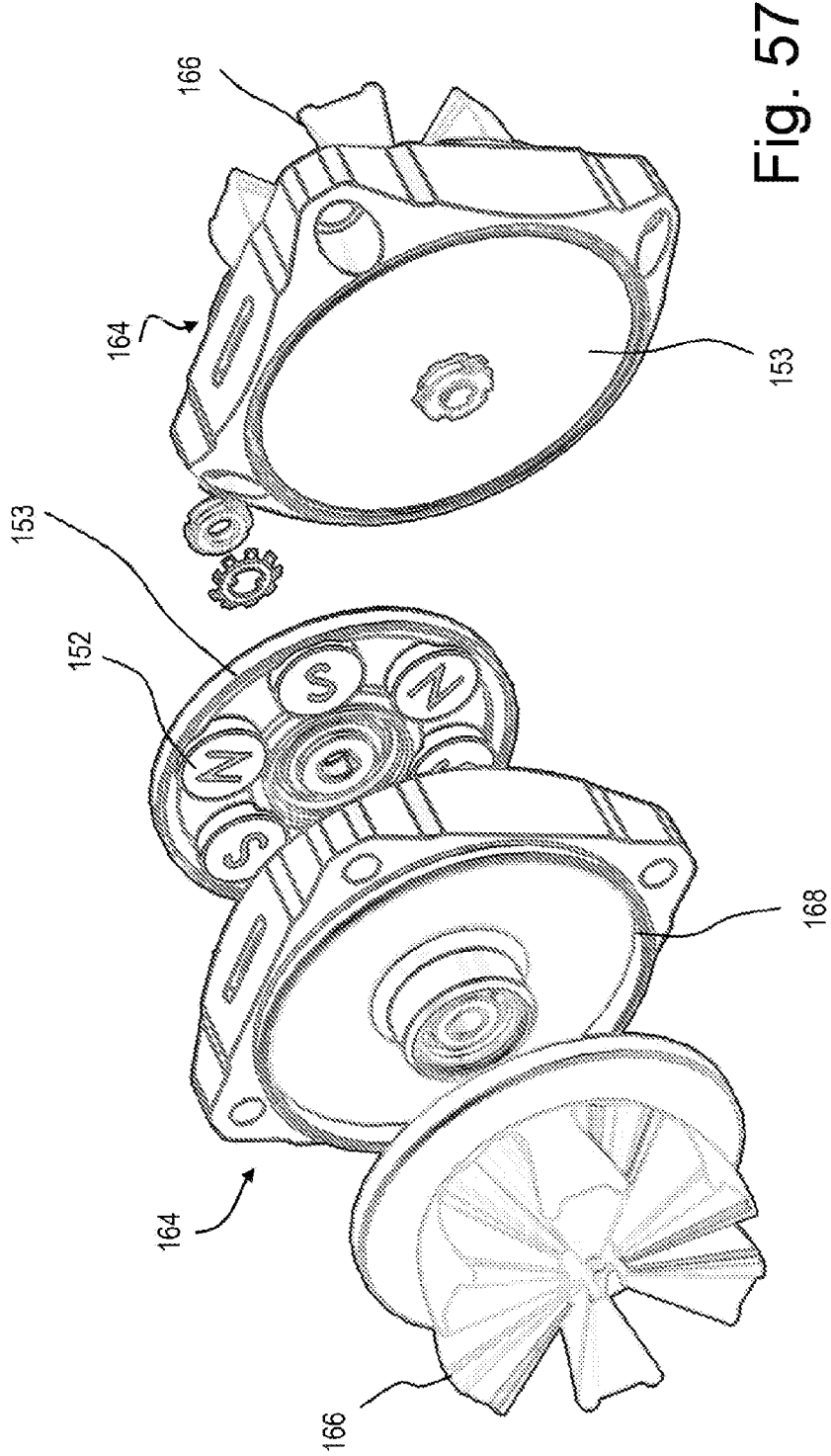

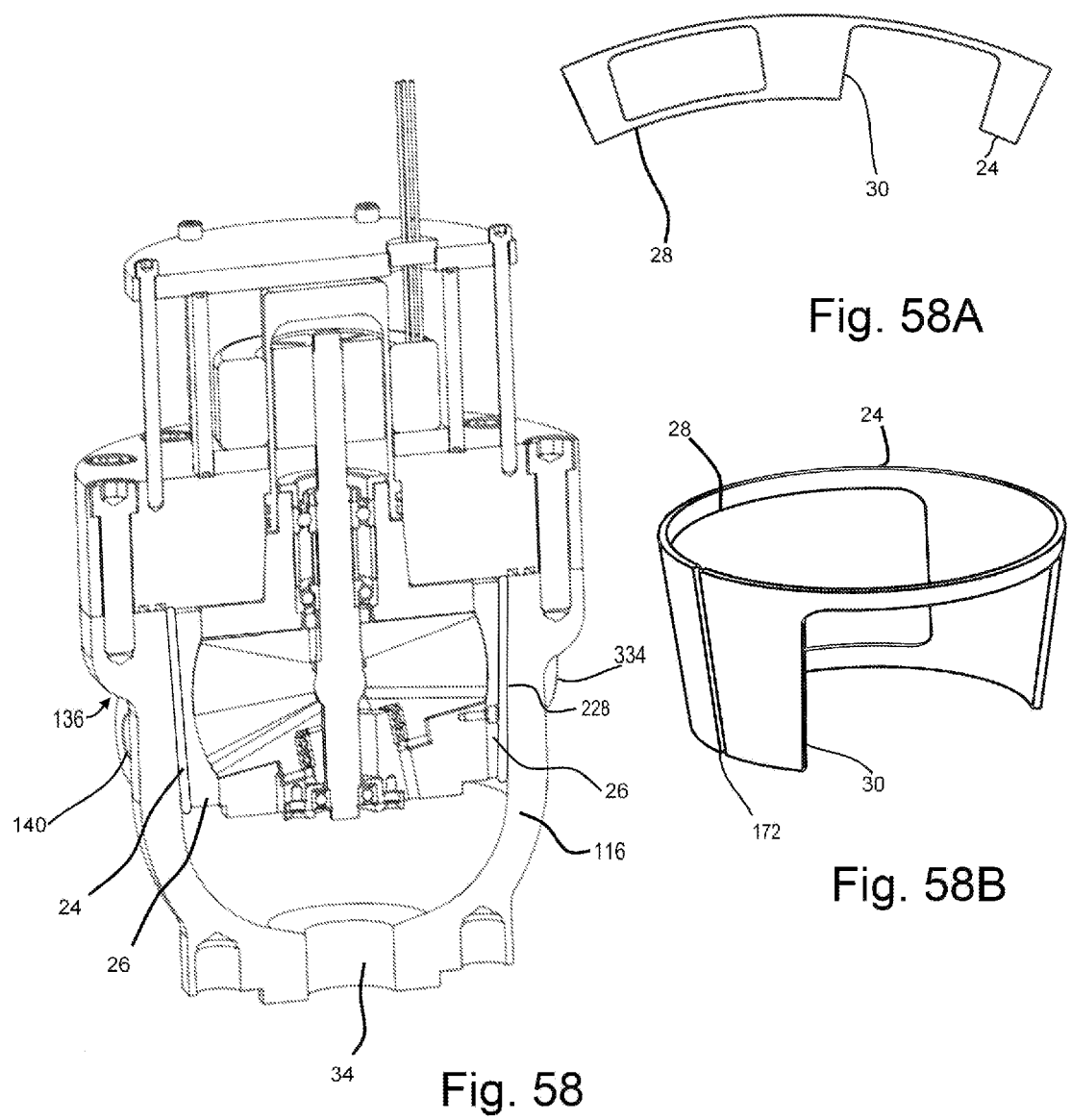

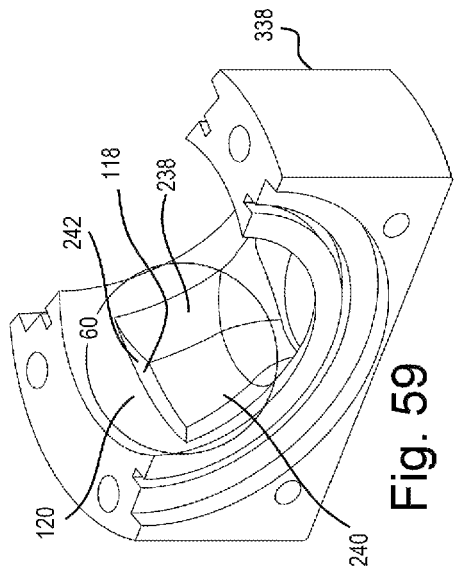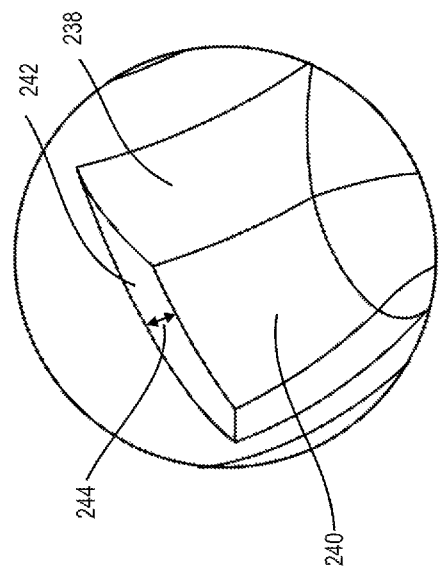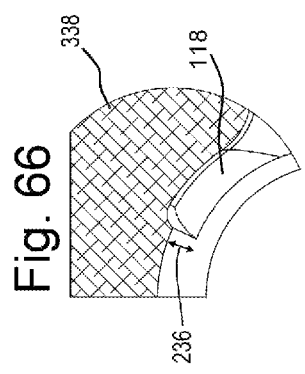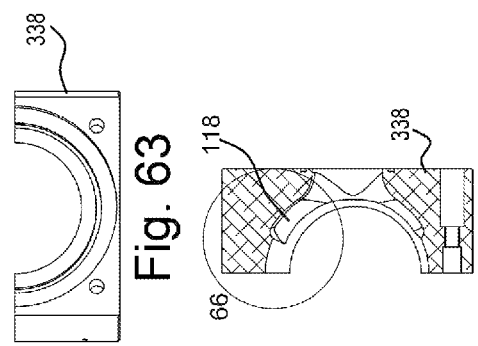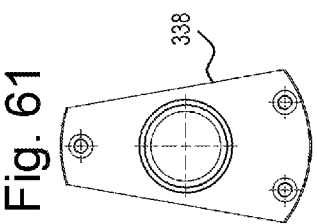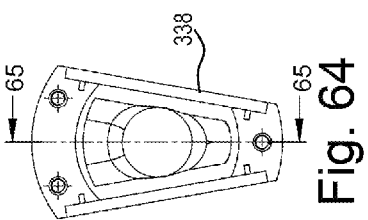

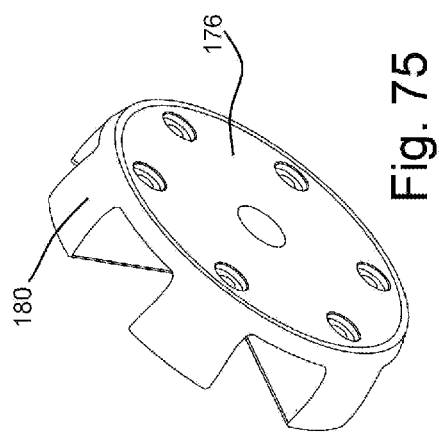
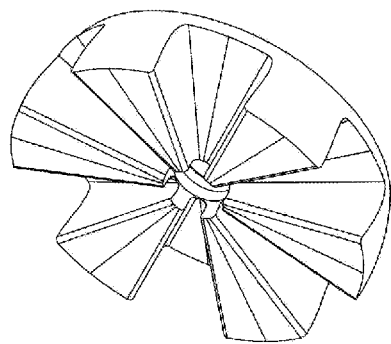
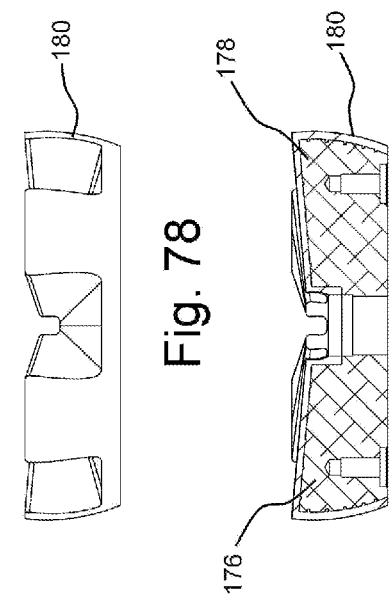
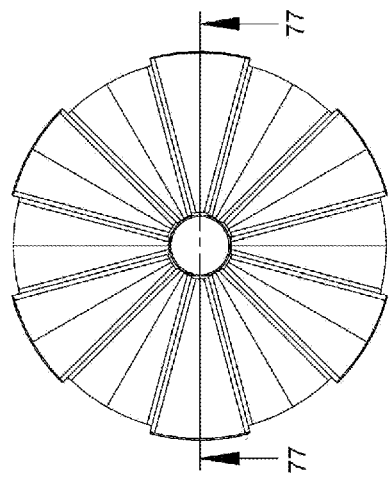

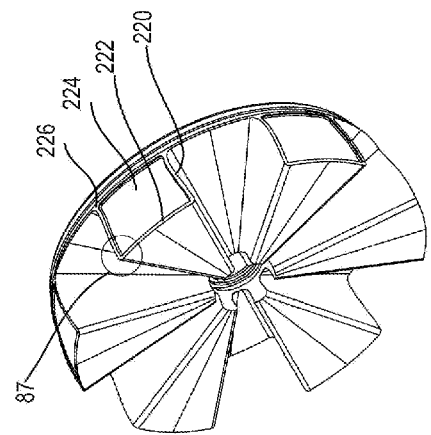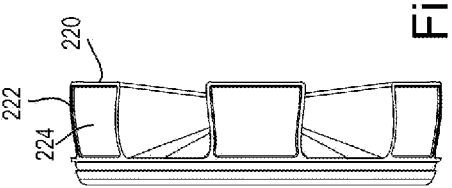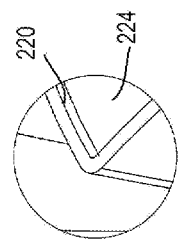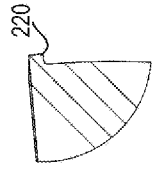

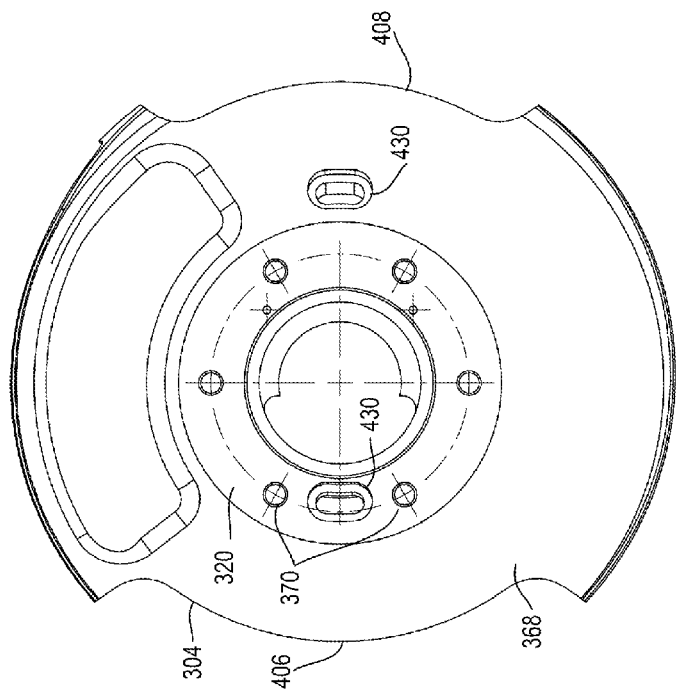
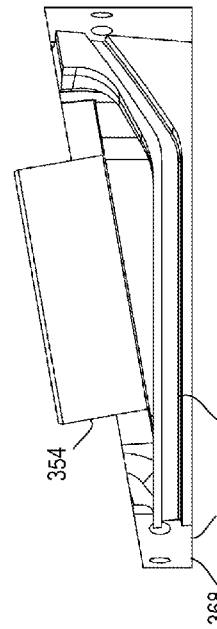
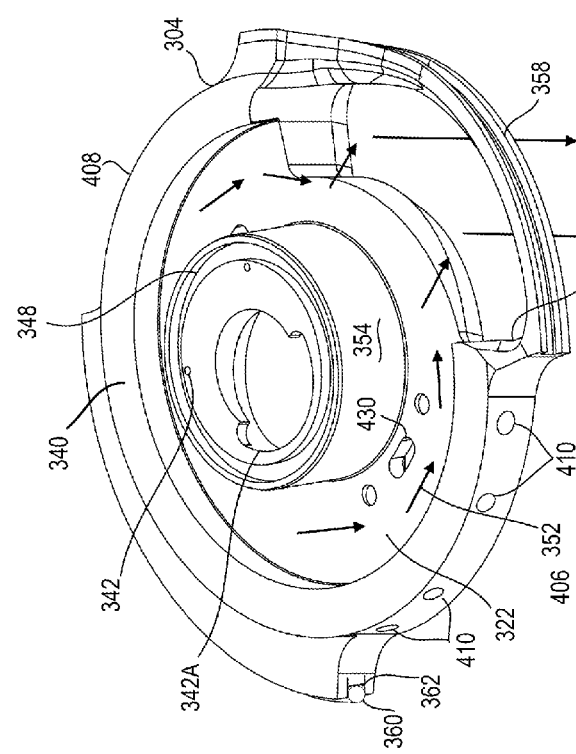
Fig. 94
Fig. 95
Fig. 93

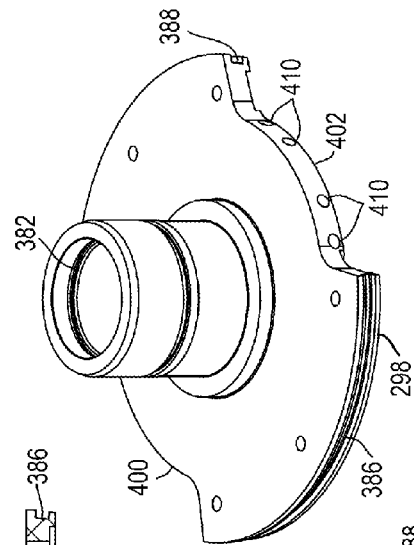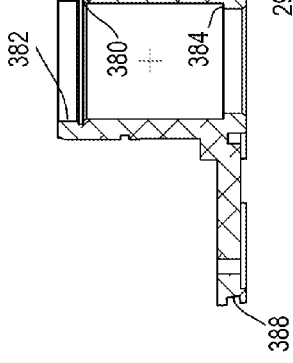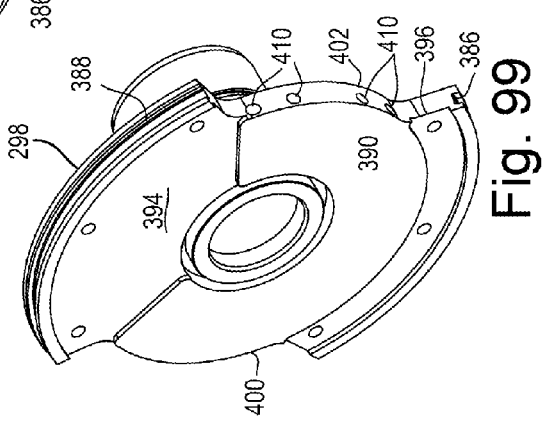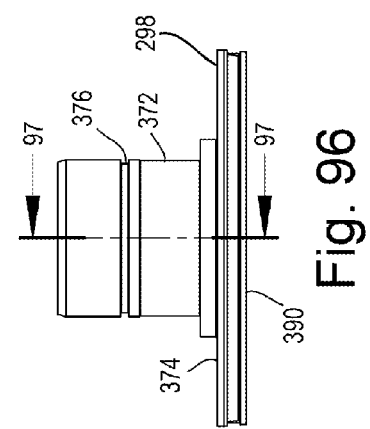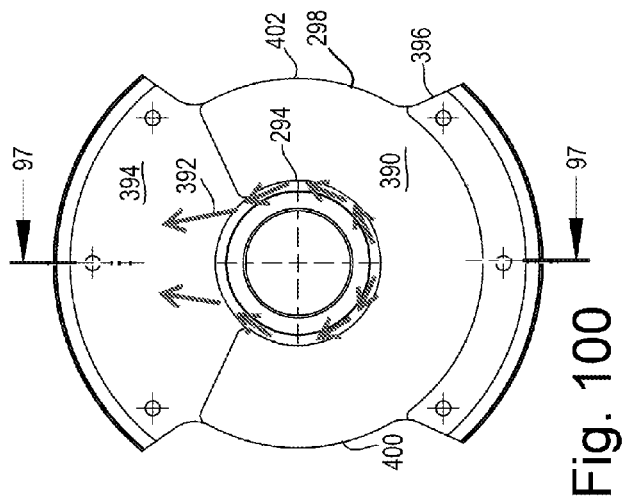

POSITIVE DISPLACEMENT EXPANDER

RELATED APPLICATIONS

This application claims priority benefit of U.S. Ser. No. 61/577,576, filed on Dec. 19, 2011 incorporated herein by reference for the technical disclosures therein.

BACKGROUND OF THE DISCLOSURE a) Field of the Disclosure

The disclosed subject matter relates to apparatus and methods for harnessing energy from a pressure differential in a fluid flow stream, and in particular to the production of mechanical output and/or the generation of electrical power therefrom.

b) Background Art

It has been attempted to harness the potential energy in a flowing fluid by conventional reciprocating piston, turbine, or other means in order to drive a motor, or to otherwise generate mechanical or electrical power. The existence of a reliable source of fluid flow and pressure such as may for example be provided by tidal flows, wave energy, or at gas well sites, provides an attractive renewable energy source for the generation and supply of electrical power. This is particularly at remote locations where no line power is available, and where other energy sources such as solar or wind power are not viable.

Numerous gas-actuated reciprocal and turbine devices have been proposed for utilization of the energy of a pressure drop in a fluid flow stream to perform some form of work. Those that are intended for use in gas well applications also typically avoid venting the gas to the atmosphere, which is particularly important when the drive gas is explosive or corrosive (e.g. sour gas).

By way of example, Canadian patent no. 2,491,298 to Paval provides a closed-loop, gas-actuated reciprocal drive apparatus that utilizes the potential energy in the pressure differential existing between areas of higher and lower pressure in a natural gas pipeline to actuate the apparatus without exhausting the gas to the atmosphere. The reciprocating motion of the apparatus is in turn used to drive a compressor or chemical pump.

U.S. Pat. No. 6,336,389 to English describes an apparatus wherein a similar reciprocating motion is generated, but is then transferred through a linkage to produce rotational motion, which can subsequently be used to drive an injection pump or similar type of equipment. U.S. Pat. No. 6,694,858 to Grimes also describes an apparatus that produces a reciprocating motion for driving reciprocating equipment without expelling the gas to the atmosphere, and instead directing it back into the pipeline.

U.S. patent publication no. 2010/0133834 to Nimberger provides a differential pressure generator in which a bladed turbine rotor (rather than a reciprocating piston) is actuated by a controlled stream of fluid, and in which the electrical circuitry of the generator is isolated from the fluid stream without the use of dynamic seals in order to enhance safety.

While gas-actuated reciprocal and turbine devices have utility in some applications, their efficiency may be limited by frictional and/or inertial losses (particularly in the case of reciprocating devices), and/or by blow-by of the drive gas in the case of turbine devices. As a result, such devices may not be suitable for low-flow well sites or the like. In an effort to overcome these limitations, positive displacement expanders in which, for example, a Wankel rotary engine is driven by the differential fluid pressure (instead of a reciprocal or turbine apparatus) have also been utilized.

One example of a positive displacement device in which energy from a pressurized gas is converted to mechanical energy is provided in U.S. patent publication no. 2010/0215531 to Arnold. This publication describes a compressed air motor comprising a gear pump in which an intermeshing shaft rotor and a counterpart rotor are driven by the compressed gas to effect rotation of a power takeoff shaft. The speed ratio of the shaft and counterpart rotors of the Arnold motor may generally be expressed by the equation (1+1/N):1, such that one of the two rotors will have one additional lobe or "tooth" as compared to the other. To accommodate this speed ratio, the rotors of the Arnold motor (and other similar positive displacement devices) are formed with a "wave" or smooth gear-like profile that exhibits a pseudo rolling action from lobe-to-lobe during operation. Although this helps to ensure that gas cannot flow through the motor without driving the rotors, it also makes the rotors susceptible to grinding and jamming by particles of debris that may be present in the pressurized gas stream.

There accordingly exists a need for devices that are able to efficiently harness energy from a pressure differential in a fluid flow stream, and that in some variations are suitable for use in dirty environments (such as natural gas wells) in which impurities or debris may be found in the fluid flow stream.

SUMMARY OF THE DISCLOSURE

In general, two different definitions for the general term "rotor" are applied herein. The first term applies for example to the pressure rotors 88/90 of FIG. 6 were the rotors affect or are affected by a fluid flow or pressure differential. The second term applies for example to the electric rotor 112 of FIG. 41 which cooperates with a stator 170 to generate electricity, or to rotate when an electric current is applied thereto.

A rotary positive displacement device is disclosed herein, the device in one form comprising: an outer housing comprising an outer housing fluid inlet, outer housing fluid outlet, and wherein at least a portion of the inner surface comprises a frusta-conic surface; an inner housing having a frusta-spherical inner surface, a frusta-conic outer surface, an inner housing fluid inlet adjacent the outer housing fluid inlet, an inner housing fluid outlet; and a malleable gasket pressed between the frusta-conic inner surface of the outer housing and the frusta-conic outer surface of the inner housing to form a fluid-tight seal therebetween.

The rotary positive displacement device as recited above may be arranged wherein a slight degree of movement of the inner housing relative to the outer housing is permitted by the gasket relative to the outer housing during assembly, and movement of the inner housing relative to the outer housing is repressed following assembly by rigid attachment of the inner housing to the outer housing.

Also disclosed is a rotor for a rotary positive displacement device comprising; a forward surface operatively configured to interoperate with an opposing rotor; a rearward surface longitudinally opposite the forward surface; wherein the forward surface comprises a circumferential pattern of mounds and valleys; wherein the rotor is configured to rotate in a first rotational direction defining a leading face on each mound; wherein the leading face of each mound comprises a raised portion from a radially inward portion of each mound toward the radially outward portion of the mound to form a contact surface on the leading face of each mound where the opposing rotor will contact during the period of minimum volume of the rotation, and wherein the remainder of the leading face does not contact during any point of rotation.

The rotor for a rotary positive displacement device as recited above may be arranged where the contact surface on the leading face of each mound of will contact the opposing rotor during full rotation of the rotors, wherein the remainder of the leading face does not contact the opposing rotor during full rotation of the rotors.

A rotary positive displacement device is also disclosed, in one form comprising: a plurality of interoperating rotors each having a frusta-spherical outer surface; wherein the axis of rotation of the rotors are offset from parallel and intersecting; a housing having a frusta-spherical inner surface of larger diameter than the outer diameter of the rotors; the housing further having a fluid inlet and a fluid outlet to the frusta-spherical inner surface; wherein the rotors rotate within the housing; at least one deflecting projection extending from the frusta-spherical inner surface of the housing, and the deflecting projection having a radial thickness substantially equivalent to the gap between the inner surface of the housing and the outer surface of the rotors to deflect or direct debris and fluid passing through the housing towards the center of rotation of the rotors.

The rotary positive displacement device as recited above may be arranged wherein: the rotors form a point of maximum separation, and at a point of minimum separation during rotation; at least one seal block is positioned at the point of maximum separation; and at least one seal block is positioned at the point of minimum separation.

The rotary positive displacement device as recited above may further comprise: an outer housing component and an inner housing component forming the housing; a malleable seal fitted between an inner surface of the outer housing; and an outer surface of the inner housing; and the malleable material having a thickness substantially equivalent to the gap between the inner surface of the outer housing and the outer surface of the inner housing.

The rotary positive displacement device as recited in claim 7 wherein the malleable seal is an O-ring, fitted partially within an O-ring groove disposed in the outer surface of the inner housing and/or the inner surface of the outer housing.

The rotary positive displacement device as recited above may be arranged wherein the malleable seal is flat seal disposed between the outer surface of the inner housing and the inner surface of the outer housing.

The rotary positive displacement device as recited above may alternately be arranged wherein rotors comprise an outer surface formed of a malleable material so as to allow debris such as sand and other contaminates within a fluid flow passing through the device, to temporarily impregnate the surface of the rotor such as to reduce jamming or damage to the rotors.

A rotary positive displacement device is disclosed, in one form comprising: a plurality of interoperating rotors having interoperating lobes and valleys on a front side thereof, each rotor having a frusta-spherical radially outward surface; wherein the axis of rotation of the rotors are offset from parallel and intersecting; and wherein each rotors is constructed of a malleable material fastened to a backing plate.

The rotary positive displacement device a recited above may be arranged wherein the malleable material is a polymeric composition.

The rotary positive displacement device as recited above may be arranged wherein the rigid backing plate is coupled to a back side of the malleable material in opposition to the face side of the rotor wherein the backing plate is comprised of a different material than the malleable material.

The rotor as recited above may be arranged wherein the backing plate is comprised of metal.

The rotor as recited above may be arranged wherein the coefficient of expansion of the malleable material is substantially equivalent to the coefficient of expansion of the backing plate.

The rotor as recited above may be arranged wherein the backing plate is fastened to the main body with screws.

A rotary positive displacement device is disclosed herein. In one form the device comprising: a plurality of interoperating rotors each having a frusta-spherical outer surface; wherein the axis of rotation of the rotors are offset from parallel and intersecting; and wherein the rotors comprise interoperating mounds and valleys which contact substantially at a top dead center position and substantially at a bottom dead center position.

A rotary positive displacement device is disclosed herein. In one form comprising: a plurality of interoperating rotors each having a frusta-spherical outer surface; wherein the axis of rotation of the rotors are offset from parallel and intersecting; a geometric pattern of grooves provided in the rearward surface of at least one rotor; and wherein the grooves extend radially from adjacent the radial center of the rear surface to the radially outward surface.

A rotor in one form is disclosed as being made from a process comprising the steps of: providing a backing plate having mounds and valleys provided thereon; overmolding the backing plate with a polymer material; wherein the mounds are machined integral with the backing plate; and wherein the mounds extend into the polymer material coated lobes.

The process as recited above may produce a rotor wherein the thickness of the polymer material is less than $\frac{1}{8}$".

A positive rotary motion device in disclosed, in one form having a plurality of opposing rotors, a fluid inlet, and a fluid outlet. The device comprising: where one or more of the rotors have a flat back face, which forms a close gap or engages a seal to a flat housing face; further comprising a surface defining a flow channel that surrounds a shaft seal and/or bearings, and wherein the flow channel has an opening that communicates with the fluid outlet, wherein the moat and discharge combination directs fluid and debris flow away from the shaft seal and/or bearings and towards the fluid outlet.

The positive rotary motion device as recited above may be arranged wherein the flow channel is disposed in the housing.

The positive rotary motion device as recited above may be arranged wherein the flow channel is disposed in the flat back face of the rotor.

A positive displacement rotary motion device is disclosed, in one form comprising: an inner housing formed by: an upper support component; a through shaft with a center sphere feature; magnets mounted to rotate with an upper part of the through shaft; a lower angled tilt support component; a first and a second spherical rotors each with a plurality of lobes where the rotors are offset from collinear; a first rotor mounted to through shaft; the rotors having a frusta-spherical radially outward surface; a second rotor bearing against the tilt support component; side blocks attached between and supporting the upper support component and lower tilt support components; the side blocks having spherical concave faces that engage spherical outsides of the first and second rotors; a bottom bearing holder, bearing against the through shaft, the bottom bearing holder fastened to the tilt support component.

The positive displacement rotary motion device as recited above may further comprise: a mating gasket or O-ring seal on a radially outer surface thereof for placement of the rotary motion device into an outer housing having inlet and outlet ports.

The positive displacement rotary motion device as recited above may further comprise: an end cap attached to the housing, a containment shroud member extending out of the housing end flange; and the containment shroud member surrounded by a stator element for producing electricity.

The positive displacement rotary motion device as recited above may further comprise clearance holes to allow some freedom of movement of the side blocks relative to the upper support component and/or lower support component during assembly.

The positive displacement rotary motion device as recited above may further comprise: an upper bearing chamber; a lower bearing chamber; and surfaces defining communication ports between the upper bearing chamber and the lower bearing chamber to provide pressure balancing between the bearing chambers.

The positive displacement rotary motion device as recited above may further comprise: felt seals positioned between bearing and fluid chambers for pressure balancing bearings and/or bearing seals.

The positive displacement rotary motion device as recited above may further comprise: a magnetic field translating cable having a first end within a fluid chamber positioned near the shaft; a plurality of magnets fixed to rotate with the shaft about the magnetic field translating cable; the magnetic field translating cable having a central portion passing through and sealed to a pressure containing flange; and the magnetic field translating cable having a second end positioned external of the fluid chamber and within a stator such that rotation of the magnets produces a magnetic field flux, which is translated through the cable to the stator where the magnetic field flux to produce electric current within the stator.

The positive displacement rotary motion device as recited above may be arranged wherein: the stator is contained within a stator housing, sealed to the pressure containing flange; and electric current transmitting wires pass through a sealed fitting of the stator housing to transmit electric current generated in the stator to external devices.

A rotary positive displacement device is disclosed, in one form having a plurality of rotors with interoperating mounds and valleys thereon wherein: the rotors each having an axis of rotation that is offset and intersecting; the rotors form a point of maximum separation, and at a point of minimum separation during rotation; at least one seal block is positioned at the point of maximum separation; and at least one seal block is positioned at the point of minimum separation.

BRIEF DESCRIPTION OF THE DRAWINGS

FIG. 1 is an isometric view of a first variation of the disclosure.

FIG. 2 is a top view of the variation of FIG. 1.

FIG. 3 is a front or end view of the variation of FIG. 1.

FIG. 4 is a side view of the variation of FIG. 1.

FIG. 5 is a cross section of the variation of FIG. 1 taken along line 5-5 of FIG. 4.

FIG. 6 is an exploded view of the variation of FIG. 1.

FIG. 10 is an isometric view of a second variation of the disclosure.

FIG. 11 is a side view of the variation of FIG. 10.

FIG. 12 is a side cutaway view taken along line 12-12 of FIG. 11.

FIG. 15 is a top view of one variation of a plurality of interoperating rotors.

FIG. 16 is an isometric view of the variation of FIG. 15.

FIG. 17 is a side view of the variation of FIG. 15.

FIG. 18 is a bottom view of the variation of FIG. 15.

FIG. 19 is a detail view of area 19 of FIG. 18.

FIG. 20 is a top view of the variation of FIG. 15 wherein the rotors are held by a plurality of support components.

FIG. 21 is an isometric view of the variation of FIG. 20.

FIG. 22 is a front view of the variation of FIG. 20.

FIG. 23 is a side view of the variation of FIG. 20.

FIG. 24 is an isometric view of the contact face of one variation of a rotor as shown in FIG. 19.

FIG. 25 is a side view of the variation of FIG. 24.

FIG. 26 is an isometric view of the contact face of one variation of a rotor as shown in FIG. 19.

FIG. 27 is a side view of the variation of FIG. 26.

FIG. 56 is an exploded view of the variation of FIG. 54.

FIG. 57 is an assembled view of the variation of FIG. 56 from an alternate angle.

FIG. 58 is an isometric cutaway view of the variation of FIG. 41 also showing one variation of a conformable seal.

FIG. 58A shows one example of a sealing member 24 in a flat orientation.

FIG. 58B shows one example of the sealing member 24 in a frusta-conic orientation.

FIG. 59 is a shaded view of one variation of a seal block of FIG. 51 with scoop formed therewith.

FIG. 60 is a detail exploded view of the region 60 of FIG. 59.

FIG. 61 is a bottom view of the variation of FIG. 59.

FIG. 62 is a front view of the variation of FIG. 59.

FIG. 63 is a side view of the variation of FIG. 59.

FIG. 64 is a top view of the variation of FIG. 59.

FIG. 65 is a cutaway view of FIG. 64 taken along line 65-65.

FIG. 66 is a detail view of the region 66 of FIG. 65.

FIG. 74 is a front perspective view of the variation of FIG. 71 with the overmolded outer layer applied thereto.

FIG. 75 is a rear perspective view of the variation of FIG. 74.

FIG. 76 is a face view of the variation of FIG. 74.

FIG. 77 is a side cutaway view of the variation of FIG. 76 taken along line 77-77.

FIG. 78 is a side view of the variation of FIG. 74.

FIG. 82 is a perspective face view of an variation of a rotor with a lip for reducing viscous drag.

FIG. 83 is a side view of the variation of FIG. 82.

FIG. 84 is a face view of the variation of FIG. 83.

FIG. 85 is a cutaway view of the variation of FIG. 84 taken along line 85-85.

FIG. 86 is a detail view of area 86 of FIG. 85.

FIG. 87 is a detail view of area 87 of FIG. 82.

FIG. 93 is a top isometric view of one variation of a tilt support component.

FIG. 94 is a bottom view of the tilt support component of FIG. 93.

FIG. 95 is a side view of the tilt support component of FIG. 93.

FIG. 96 is a side view of one variation of a support component.

FIG. 97 is a section view of the support component of FIG. 96 taken along line 97-97.

FIG. 98 is an isometric top view of the support component of FIG. 96.

FIG. 99 is an isometric bottom view of the support component of FIG. 96.

FIG. 100 is a bottom view of the support component of FIG. 96.

DESCRIPTION OF THE PREFERRED VARIATIONS

Figure 49:
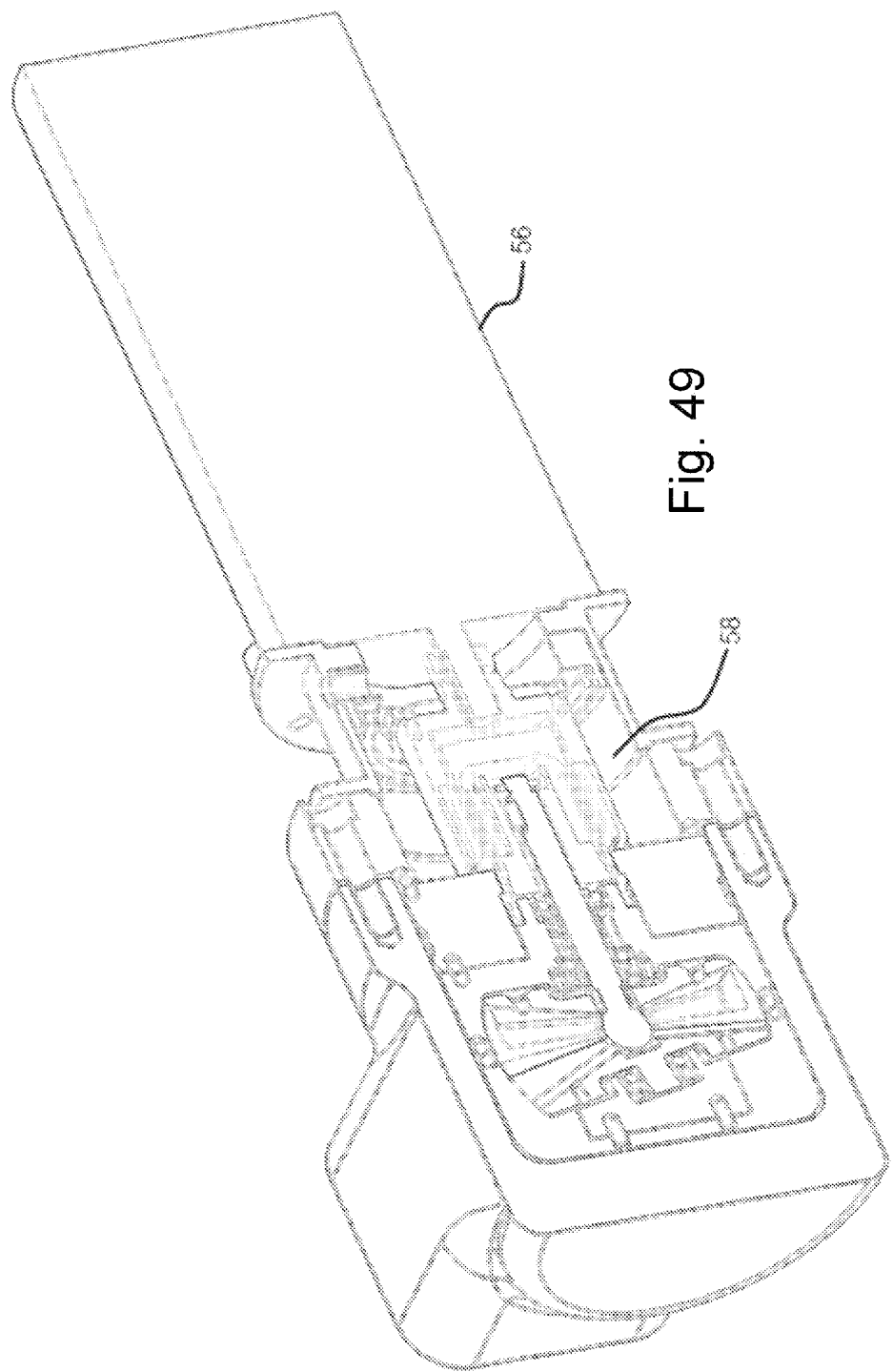
FIG. 49 is an isometric cutaway view of one variation with a magnetic coupling provided between the positive displacement engine and an electric generator.
Figure 50:
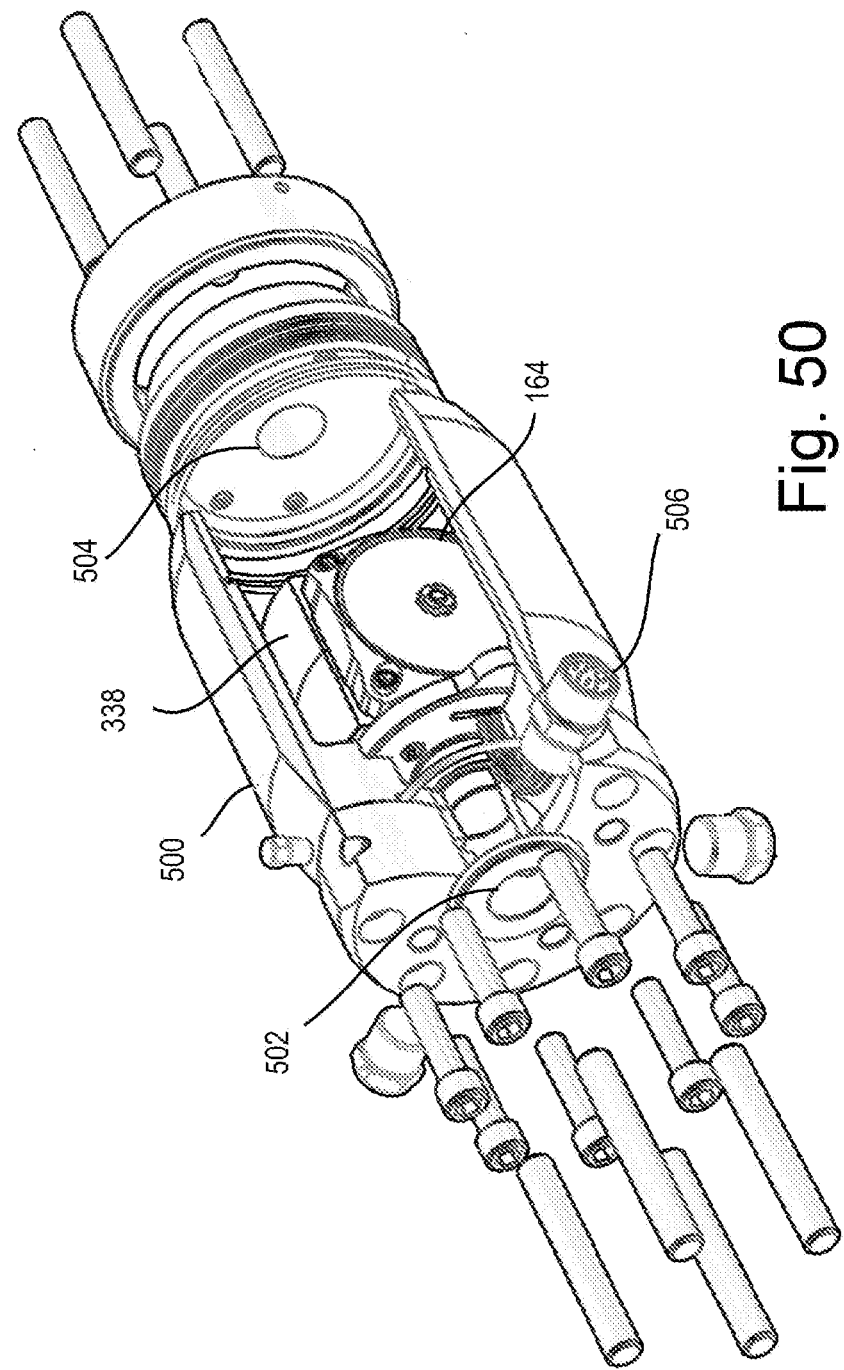
FIG. 50 is an isometric partial cutaway view of a split shaft symmetric dual generator variation of the disclosure.

Provided herein is an apparatus 20 as shown in the variation of FIG. 1 as well as other variations, applications, and variations shown in other drawings and described. The apparatus utilized for producing electrical power from a flowing fluid such as a gas or liquid under pressure, for example natural gas flowing through a pipeline, by means of one or more positive displacement devices that drive one or more electrical generators 56 of FIG. 49 or equivalents. The electrical generators may be immersed in the flow stream together with the positive displacement devices as shown for example in the variation of FIG. 50, but are preferably isolated from the flow stream, such as by magnetic coupling 58 as shown in FIG. 49, in order to promote longevity and to decrease the risk of accidental discharge or explosion of the fluid in the flow stream. To further decrease such risks, the positive displacement devices of the apparatus 20 may isolate the drive fluid from the environment without the use of dynamic seals.

An axes system 10 is disclosed including as shown in FIG. 6, a longitudinal axis 12 generally parallel to the axis of the shaft 92. Also disclosed is a transverse axis 14 orthogonal to the longitudinal axis 12. A vertical axis 16 is disclosed, orthogonal to both the longitudinal axis 12 and the transverse axis 14. A radial axis 18 is also disclosed, extending outward from and orthogonal to the axis of rotation of the shaft 92 or other associated components having a circular component.

In one variation, the flowing fluid is not consumed by the device, nor is the fluid vented or released from the device 20 to the atmosphere. In some variations, the positive displacement devices 20 disclosed herein may also drive an output shaft either directly or via magnetic coupling in order to perform some form of mechanical work other than driving an electrical generator. In several variations shown, the device utilizes a canned motor arrangement with a generator interior to the housing, and output wiring 22 extending therefrom.

A control system may be employed to effectively utilize the generated power, such as by controlling the charging of one or more batteries in order to provide a reliable source of electrical power for equipment in remote sites such as well sites. In a typical application, the control system will permit continuous charging of the batteries until they are fully charged (provided that fluid flow is present), and prevent the batteries from being overcharged by electronic circuitry, decoupling the generator from the positive displacement device, and/or by partially or completely closing a control valve upstream of the positive displacement device to retard or stop rotation of the positive displacement device rotors.

By using such a control system, a relatively consistent voltage at the batteries may be maintained and may be relied upon notwithstanding transient fluctuations or interruptions in the fluid flow. In addition, the control system may monitor the battery potential and/or control the power and torque of the positive displacement device by adjusting the load on the generator in real time, and may include logical queries and safety features to prevent overcharging the batteries. By controlling and adjusting load, the control system may also prevent over-speed operation and/or facilitate start-up of the positive displacement device by sending stored power from the batteries to temporarily run the generator as a motor which may be used to provide braking torque.

To reduce the risk of damage to, or the jamming of, the apparatus by impurities or debris such as sand in the flow stream, and to increase volumetric efficiency relative to prior-known devices, the positive displacement devices in one variation as shown in FIGS. 37-40 for example comprise paired first and second rotors 60/62 having a speed ratio of 1:1 and relatively square edges 64 that through most of a rotation may exhibit a "scraping" or steep angle of contact between opposing lobes/valleys during operation. Unlike the "rolling" contact of prior-known devices used to harness the energy of a pressure drop in a fluid flow stream to perform work, the "scraping" contact of the present apparatus is self-cleaning and less susceptible to jamming. In one form, the contact surfaces only engage the opposing rotor near top dead center and bottom dead center to avoid unnecessary scraping and wear. These positions may correspond to a position of maximum volume 204, and a position of minimum volume 206 shown for example in FIG. 40. The positive displacement devices of the present apparatus in some variations are also operable at differential fluid pressures as low as 1 to 2 psig, and may operate at any line pressure up to the design maximum pressure of the expander housing. In a typical application, a differential pressure of between about 2 and 20 psig may be maintained.

Similar variations of positive displacement devices exhibiting the self-cleaning and low differential pressure operability of the present apparatus are further described in the issued U.S. Pat. Nos. 5,755,196; 6,036,463; 6,497,564; 6,634,873; 6,705,161; 6,739,852; 6,887,057 6,923,055, the technical disclosures of which are hereby incorporated by reference. In general, the positive displacement devices of the disclosed apparatus in several forms comprise rotors in configurations of 2, 3 or more rotors, and that are formed as spherical trochoids, spherical involute gear forms, spherical sawtooth forms, spherical involute fin shapes, elongate involute, elongate spiral, rotors designed as balanced rotors and spiral transformations of the foregoing, whereby the rotors have specific surface features in certain places of near-rolling contact where the surfaces are offset or replaced with a thin tread-like pattern, such as in the example of rotors with spherical involutes.

Portions of the following disclosure applies not only to positive displacement expanders, but to similar devices including pumps, compressors, engines, flow meters etc. comprised of two or more rotors at an angle to one another in positive displacement. In prior variations, one of the main challenges for positive displacement spherical tilted (offset) shaft devices has been tolerances, accuracy of machining, and ease of assembly. Machined parts do not have perfect dimensions when manufactured and excessive time required for assembly and modifications during assembly are often not acceptable when cost of manufacture is of great importance. For example, prior art patent application Ser. No. 12/670,735 illustrates a two-rotor separate shaft positive displacement device with tight clearances, where the housing dimensional tolerances are such that the two shaft axis must intersect or be extremely close to intersecting, and at the same time the housing inner sphere should have its center aligned very accurately to this intersection point. Meeting all of these tolerances on a single part can be very challenging if not impractical. It is also challenging or impractical to rely upon consistently successful housings meeting this tolerance in order to maintain tight sealing gaps between and around the rotors. During assembly, an assembler may determine that a housing is of unacceptable tolerances. To repair the discrepancy, the assembler must disassemble, modify the housing, and then reassemble the apparatus. Such a repair may become a reiterative process. Such reiterative repair processes can become very time consuming and costly, negatively affecting the feasibility of the machine all together. Prior art U.S. Pat. Nos. 5,755,196, 6,036,463, 6,634,873 in some variations encounter this same tolerance and assembly problem. U.S. Pat. Nos. 6,497,564, 6,705,161 in some variations have been found to encounter the same problem, amplified by further tolerance accrual by having the housing split through the center of the device. U.S. Pat. No. 6,739,852, in particular the example shown in FIG. 5 illustrates another housing concept that in some variations has tolerance issues. In this variation, the bearing bores may be machined by surfacing rather than turning, and the housings are normally produced in split halves, often making the bearing seats difficult to manufacture/assemble and inconsistent in their final tolerances. Also, ensuring that the two axes intersect is also difficult as the axes are formed by multiple separate surfacing operations. Wildhaber U.S. Pat. No. 3,856,440 FIG. 10 illustrates a housing with the same shortfalls, where it is difficult to consistently machine the surfaces such that the two shaft axis intersect, this shortfall compounded with tolerance accrual with the housing split through the center, now having two separate inner spheres that must precisely line up with the center of intersection of the two axes, and the axial positioning of the bearings do not have any process besides shimming for adjustment. These are just a few examples where all of the mentioned prior designs fall short when it comes to consistent and economical manufacture for successful assembly on the first attempt of assembly.

Figure 45:
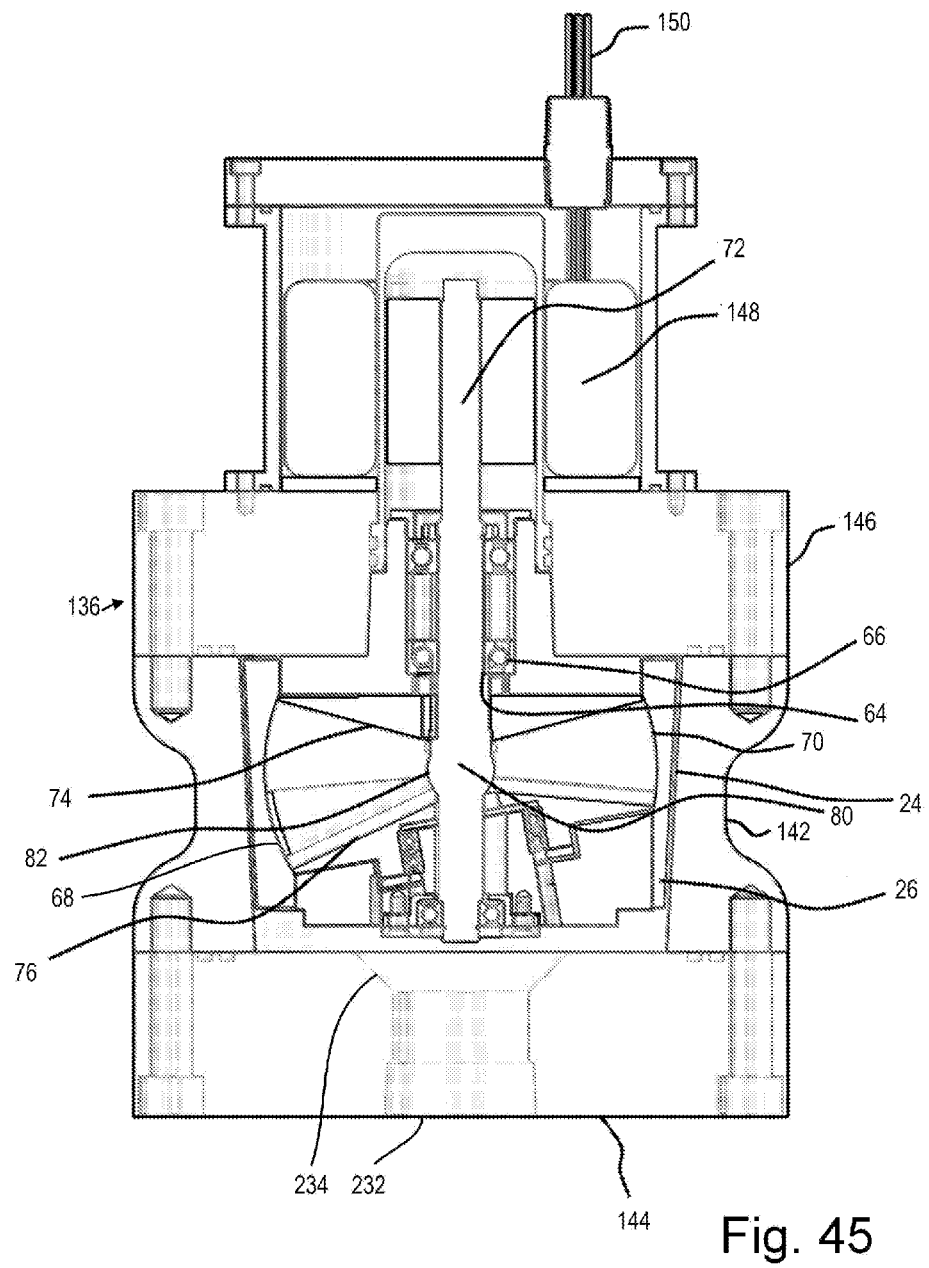
FIG. 45 is a cutaway side view of the variation of FIG. 45.

Several variations of this disclosure at least reduce these shortcomings. Some of these variations comprise removable side seal blocks, conformable housing, and a through-shaft. A through-shaft, much like those covered in patent application Ser. No. 12/560,674 can be very accurately and cheaply machined with accurate shoulders 64 as shown in FIG. 45 to position the bearings 66, resulting in accurate positioning of the first/second rotors 68/70 axially along the shaft 72. The rotors in this variation may not be required to have an outside diameter seal all around their periphery, but rather, they may seal on the rotor back faces 74/76 by way of a tight sealing gap that may be controlled by accurately machined shoulders 64 on the through shaft 72. This gap may be provided in addition to the min and max volume gap seal blocks that may be removable and adjustable in the axial direction as well as in the radial direction by shimming to obtain the required and uniform sealing gap.

A conformable sealing member (or members) 24 as shown in FIGS. 45, 58, 58A, and 58B may be placed around the outside of the side seal blocks 26, sealing all around the inlet 28 and all around the outlet hole 30 which surround the inlet flange face 32 and outlet 34 (FIG. 46) of the inner assembly (consisting of the seal blocks 26, rotors 68/70, and associated components) sealing to the outer housing 78, to maximize flow past the rotors 68/70 and minimize bypass leakage around the inner assembly.

Figure 7:
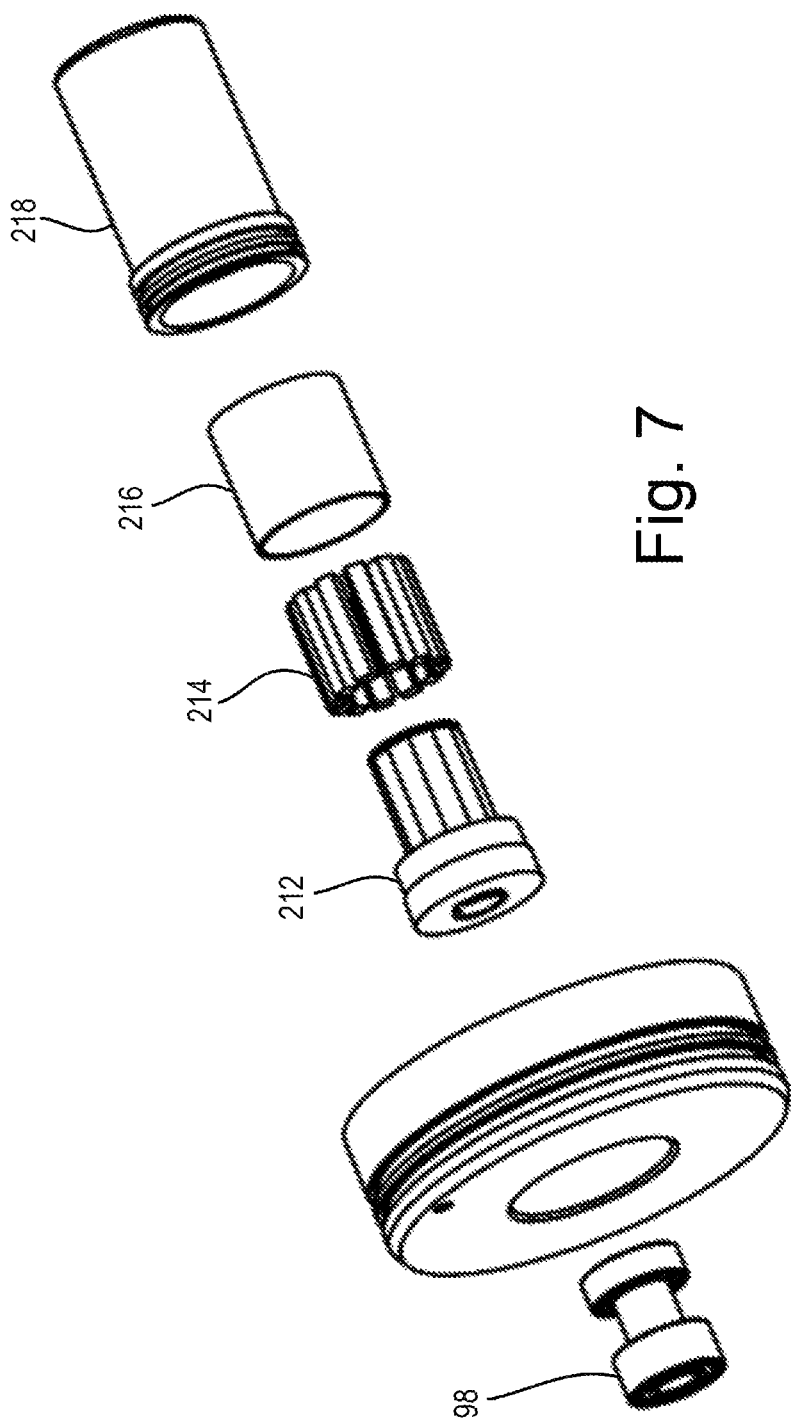
FIG. 7 is a detail view of several components of FIG. 6.
Figure 8:
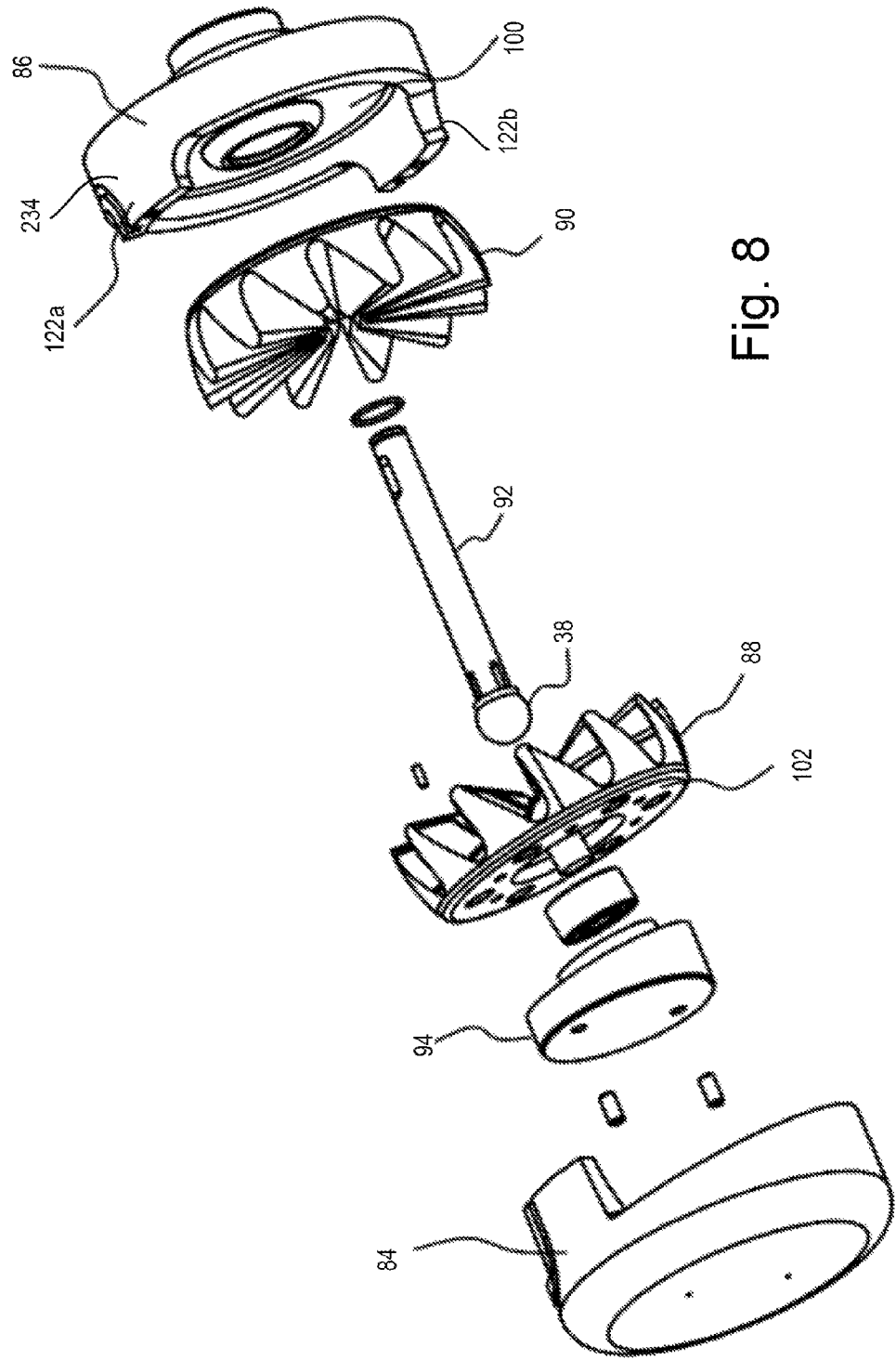
FIG. 8 is a detail view of several components of FIG. 6.

Larger gaps may be specified for around the through-shaft center ball 80 (FIG. 45), in close proximity to the inside spherical diameter 82 of the rotors 68/70. This arrangement allows for more accurate machining at the back faces 74/76 of the rotors 68/70 at the expense of slight misalignments or larger gaps at the inner through shaft sphere (center ball) 80. Since the leakage paths may be much shorter at the inner sphere gap seals than comparatively at other outer diameter locations of the rotors, larger clearance gaps are often acceptable at the through shaft inner ball without sacrificing leakage. Similarly, larger gaps may be specified for around the through-shaft center ball 38 as shown in FIG. 8, in close proximity to the inside spherical diameter 40 and 42 of FIGS. 24/26 respectively of the rotors 44/46.

During initial assembly of one example, the central sphere feature (ball) on the through shaft centralizes the rotors, and the spherical outsides of the rotors are a reference to centralize the outer side seal blocks, and the lower bearing holder component being the last component fastened with clearance holes and the entire inner assembly should reliably be aligned and function, The support components 84 and 86 of FIG. 6 may be separate components that can be placed after the rotors 88/90 and rotor supports are assembled to the through shaft 92.the support components 84/86 may be bolted or otherwise fastened to each other. The support components being support members for the drive rotor 90 and slave rotor 88 respectively. The tilt support component 94 located adjacent the slave rotor 88 may be machined or otherwise formed with a tilt angle. This tilt support component 94 in one form holds the slave rotor 88 at the prescribed tilt angle with respect to the shaft 92 This shaft in one form being centered on and fixedly attached to the drive rotor 90. Adjacent the drive rotor 90 in one form there is an upper support component 86 that houses bearing(s) 98 that support the shaft. Also, shown is a magnet positioning shaft 212 holding magnets 214 in place. A magnet retaining sleeve 216 may be used to further hold the magnets 214 in place. A pressure containment shroud 218 may be placed around these elements to form a fluid seal there around, similar to the containment shroud 110 of FIG. 41. This upper support component 86 may have a lower flat face 100 at right angles to the through shaft that forms a tight sealing gap at the back face of the drive rotor. The tilt support component 94 positioned below the slave rotor 88 in one form may also form a tight sealing gap with the slave rotor back face 102. The two support components 94/96, shaft 92, and rotors 88/90 may be assembled as a sub-assembly first and if required, bearings may be shimmed to ensure that the rotors have the appropriate seal gaps on the back sides and that the rotors are substantially free spinning. Once free spinning, the gaps may be measured with a feeler gage for example, or other tool. Side seal blocks may then be bolted on the sides, spanning between the upper component and the lower tilt component, on two locations. Depending on the design of the expander, these seal blocks may be of substantially equivalent width and positioned 180 degrees apart, the width in one example being approximately one lobe width. For example with high pressure ratio expander designs, the seal blocks may be placed at different angles and one seal block may be wider in comparison to the other seal block. As disclosed in prior art U.S. application Ser. No. 12/560,674, changing the seal blocks' position and size can result in a higher power output and efficiency of the device, particularly in expander applications.

The seal blocks may also provide some rigidity against torsion of the upper support component and lower tilted support component. However, this rigidity is generally only to be trusted for torsional rotation, since the bolted connections are not perfectly rigid, particularly since the bolt holes in the seal blocks are often slightly oversized for adjustability. The sub assembly consisting of the shaft, upper and lower support components, rotors, and side seal blocks, may be designed such that the shaft and upper support component bearings are sufficiently rigid to take any lateral loadings caused by the differential pressure acting across the sub assembly. The sub assembly in one form is designed in this way as the only rigid support is at the upper flange connection and the sub assembly is cantilevered from the upper flange assembly, and the lower section of the inner assembly in one form is only supported by a conformable seal to the housing, which is not rigid.

The previously disclosed conformable seal 24 as shown in one example in FIG. 58 provides a seal between the inner assembly and the inside conical surface of the housing. In one variation, the conformable seal 24 is about ⅛ to ¼" in free (non-compressed) thickness and may be made of soft solid rubber or an equivalent material with desirable chemical compatibility. For example NBR (Nitrile Butadiene Rubber) or HNBR (Hydrogenated Nitrile Butadiene Rubber) may be used.

For relatively low line pressures, Neoprene material may be used and may be substantially compressed during assembly. For example, for an engine supercharger compressor, or low pressure pumping apparatus may operate at atmospheric pressure.

High pressure gas wells and equivalents may require the use of a solid soft rubber seal.

In FIG. 58, the conformable seal 24 in one form wraps around, and may be temporarily glued to the inner sub assembly 136 with the side seal blocks assembled. The conformable seal 24 may have a seam 172 and it may be desired to position this seam 172 at the center of one of the seal blocks between either opening 28/30, to reduce blow-by.

Two large openings 28/30 may be provided in the conformable seal for inlet and outlet ports respectively as shown in FIG. 58.

Figure 46:
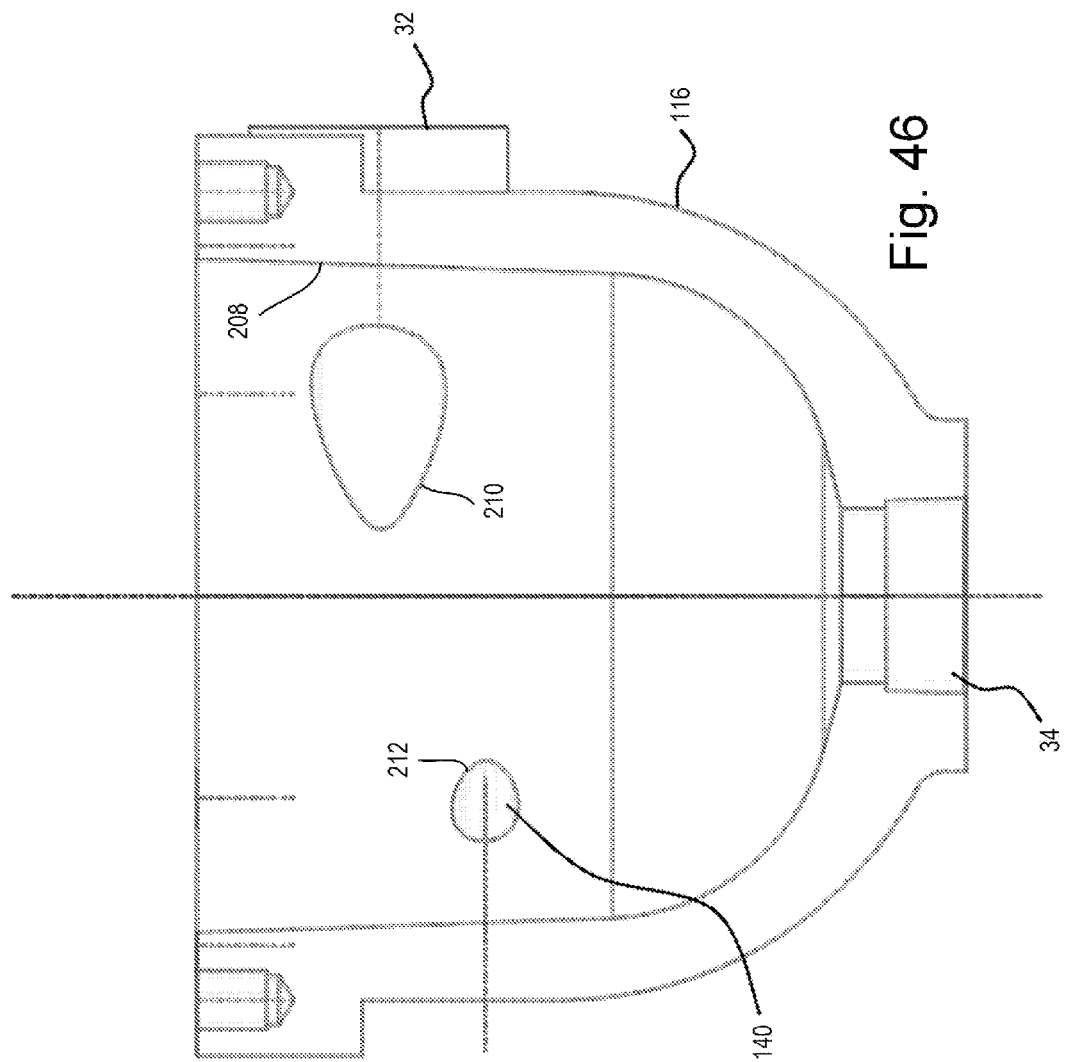
FIG. 46 is a side cutaway view of one portion of the outer housing of the variation shown in FIG. 41.
Figure 47:
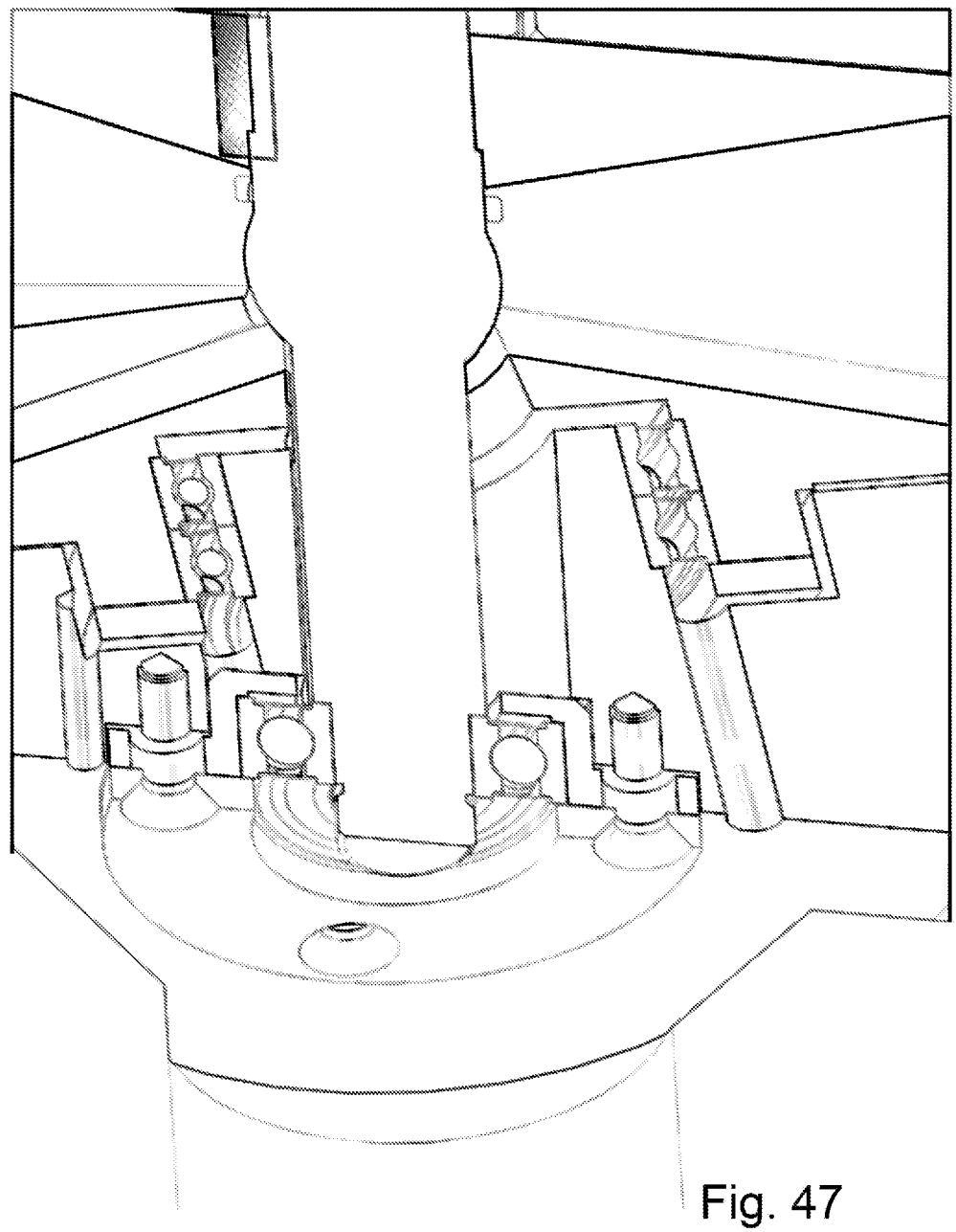
FIG. 47 is a detail view of several internal components of FIG. 41 and/or FIG. 44.
Figure 48:
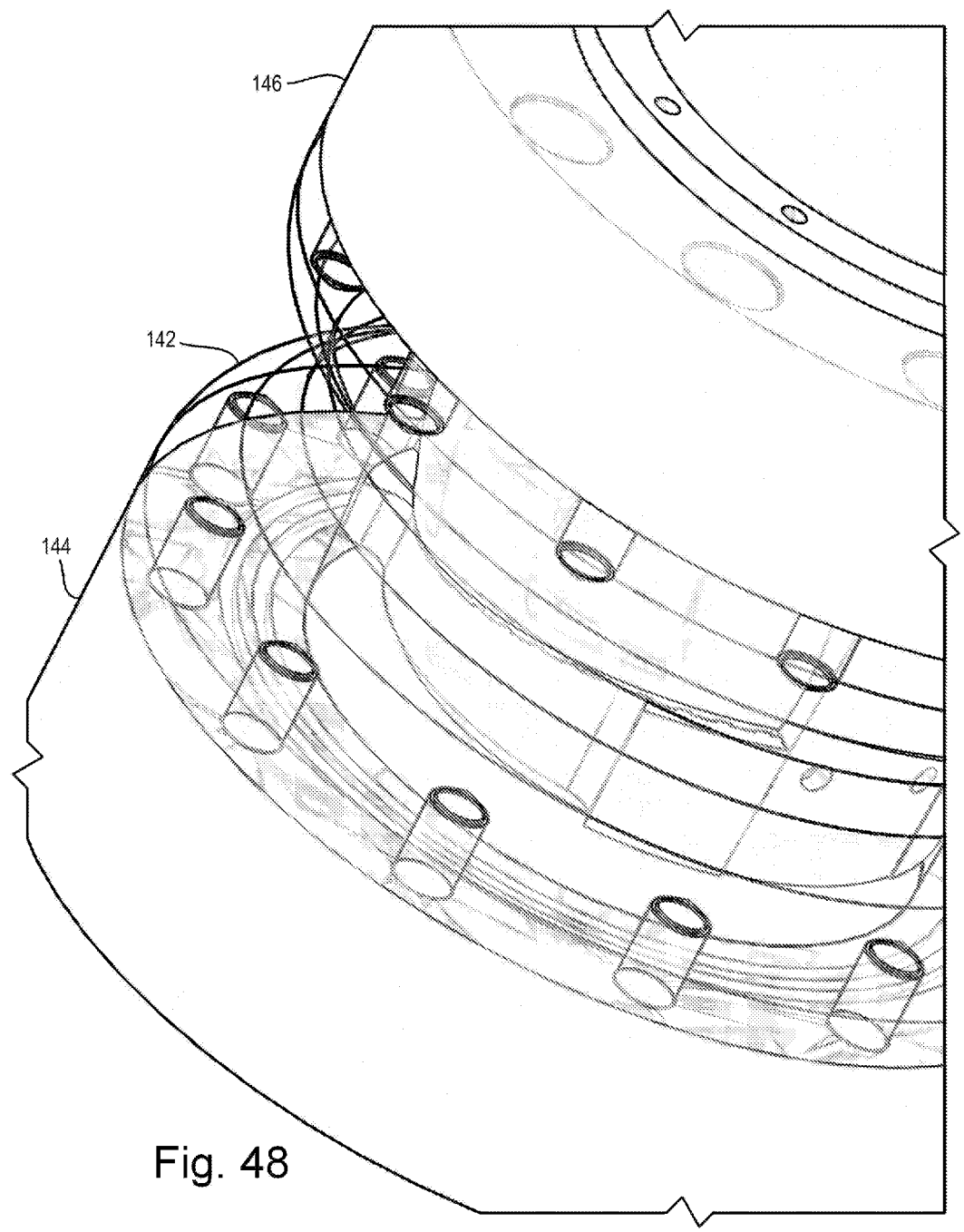
FIG. 48 is a detail view of several internal components of FIG. 41 and/or FIG. 44 with a portion of the outer housing made transparent to show the internal components more clearly.

As can be understood when looking to FIGS. 58 and 46, the arrangement of the conical inner surface 208 of the lower housing 116, and conical outer surface 114 of the inner assembly 136, improves efficiency of assembly or disassembly without damaging the conformable seal 24, and without the seal getting "hung up" on the edges 210 of the inlet port hole flange face 32 (FIG. 46) nor the edges 212 of the pressure tap opening through the inner surface 208 of the outer housing 206.

Figure 9:
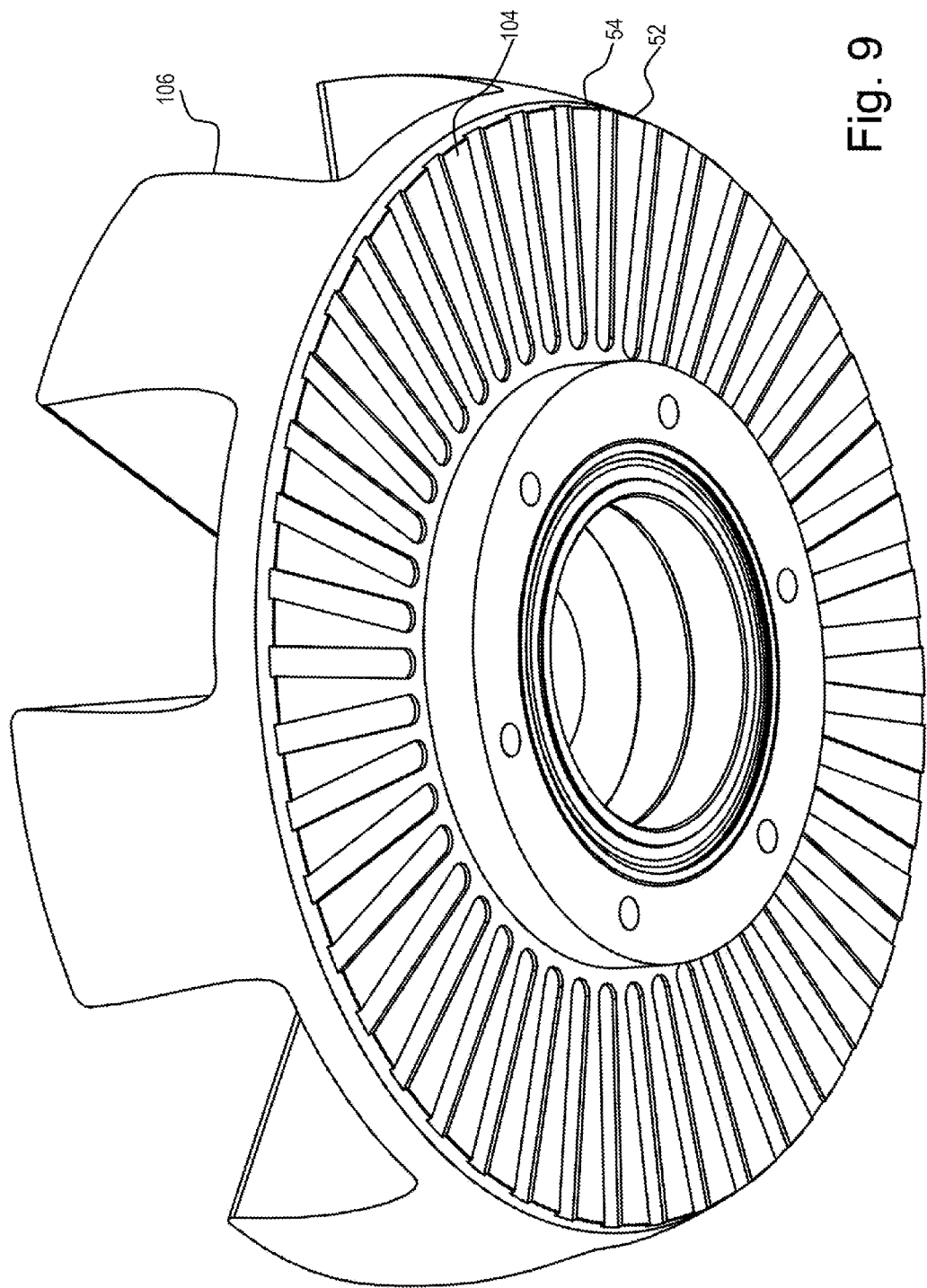
FIG. 9 is a rear isometric view of one variation of a rotor.

On the back faces 104 of the rotors 106 as shown in the example of FIG. 9 are bosses 52 or groves 54. The rotor 106 may for example be used as the slave rotor 88 (FIG. 6) wherein the bosses 52 or grooves 54 will be in close proximity to the upper component 86. The rotor 106 for another example may be used as the drive rotor 90 wherein the bosses 52 or grooves 54 will be in close proximity to the and lower tilt support component 94. The groves 54 function to prevent build-up of debris in the tight gap between the back face 104 of the rotor 106 and the adjacent non-rotating structure. Such build-up may easily hinder performance of the apparatus by friction.

Figure 41:
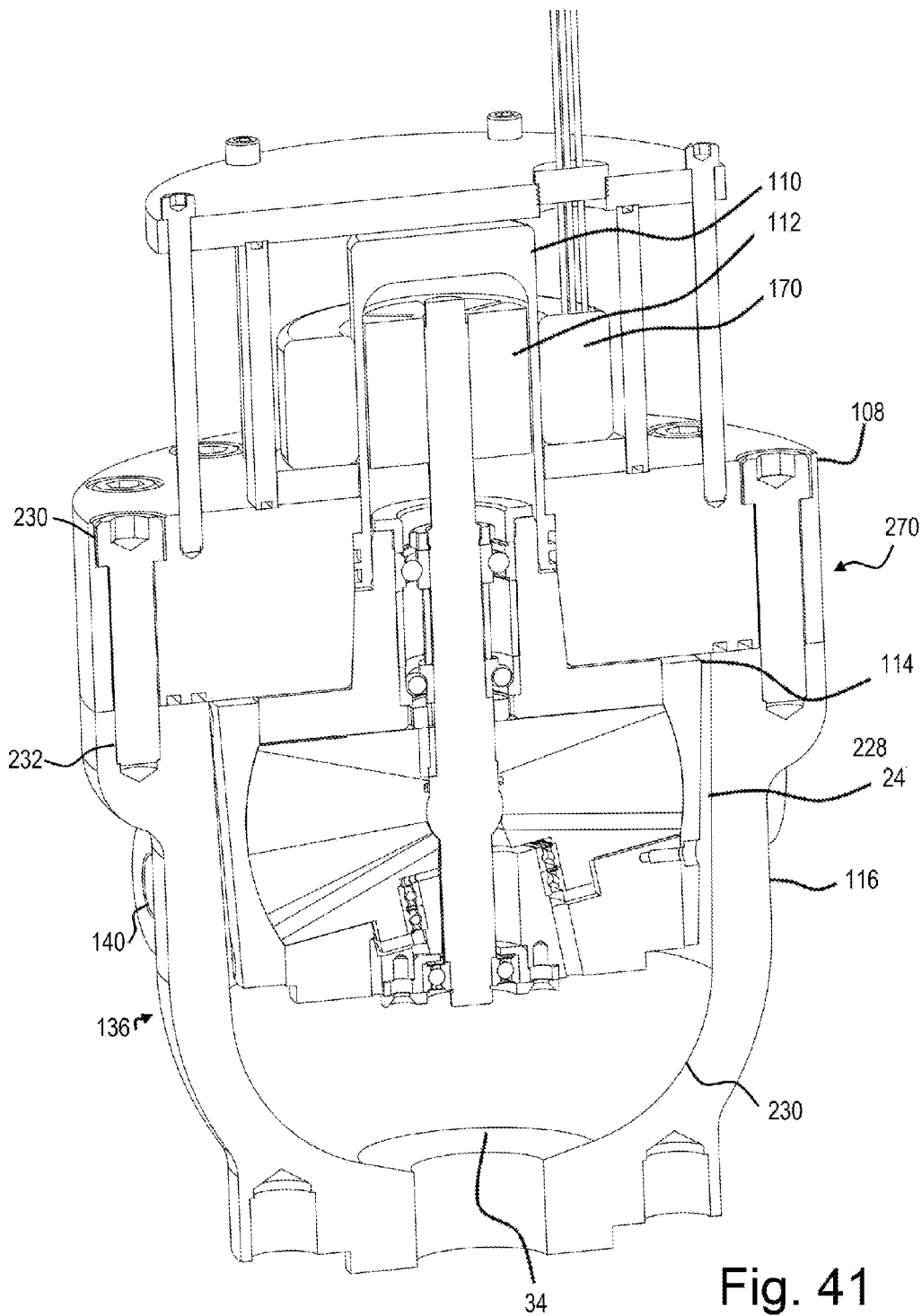
FIG. 41 is an isometric cutaway view of an variation of a positive displacement generator.

The inner rotor/support components assembly of the variation of FIG. 41 is shown mounted to a top flange 108, with a radial flux permanent magnet (RFPM) rotor 112 and containment shroud or "hat" 110 protruding from the top, such that the inner assembly 136 becomes centralized to this upper flange 108. The containment shroud 110 provides a thin wall pressure containing vessel separating the process gas/fluid within the lower housing 116 from coming into contact with the stator 170. To facilitate assembly in one form, there is provided a conical taper 114 on the outer surface of the inner assembly 136 which corresponds to a tapered inner surface 228 of the inside of the bore of the lower housing 116 as previously described relative to FIG. 45.

When inserting the inner assembly with the conformable seal 24 of FIG. 58 or equivalent on the outside 114 of the inner assembly 136 and bolting down the top flange 108 to the lower housing 116, the assembly goes together very easily. Fasteners may be passed through surfaces defining clearance holes 230 and threaded into surfaces defining threaded holes 232 or equivalent fastening systems. The assembly is significantly tolerance insensitive due to the conformable seal 24 reducing the requirement for high tolerances of the assembly components. Also the conic surfaces may substantially eliminate the problem of the conformable seal 24 becoming hung-up or "cut" by assembly past the side port hole 140 of the housing better understood in relation to the edges 212/210 on the inner edge of the openings 140/32 as seen in FIG. 46. Port hole 140 may be used for attachment of instrumentation pressure sensing purposes in this example. Another port hole 334 is shown on the opposing side and may be utilized as an inlet.

One significant difference between the variation of FIG. 41 and the variation of FIG. 45 is seen in the lowermost portion which in FIG. 41 forms a larger volume bell housing 230 leading to a drain/outlet 34 in the lowermost portion thereof. The variation of FIG. 45 is more compact, by substantially removing this open region. A drain/outlet 232 is provided in the bottom thereof leading from a reduced volume lower surface 234.

Figure 34:
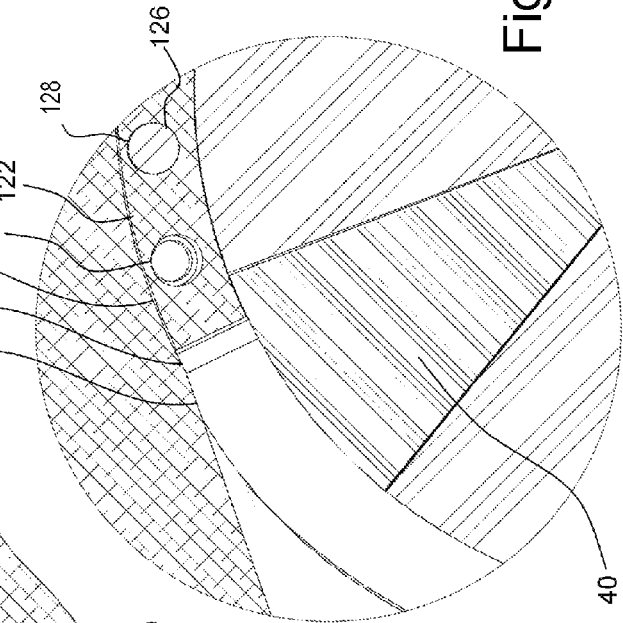
FIG. 34 is a detail view taken of region 34 of FIG. 33.
Figure 33:
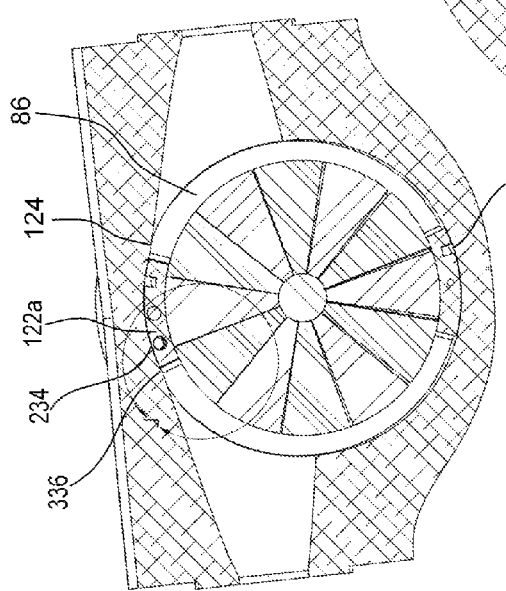
FIG. 33 is a cutaway view taken along line 33-33 of FIG. 32.
Figure 35:
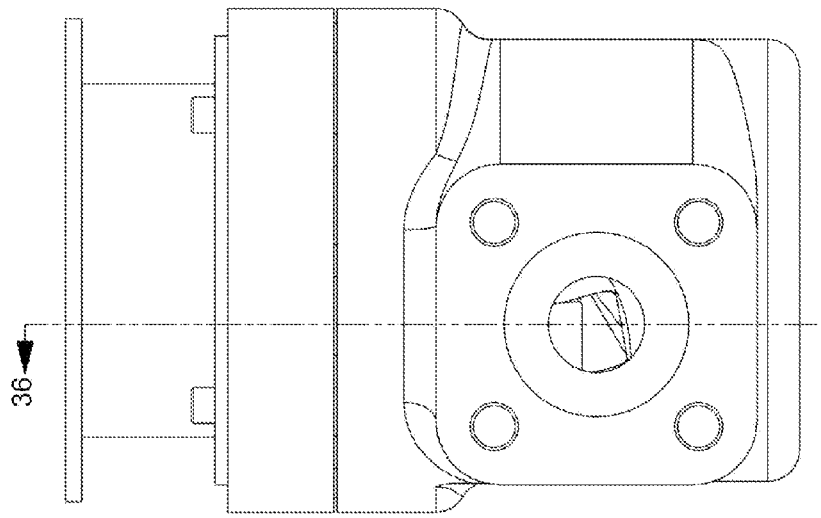
FIG. 35 is a side view of the variation of FIG. 28.
Figure 36:
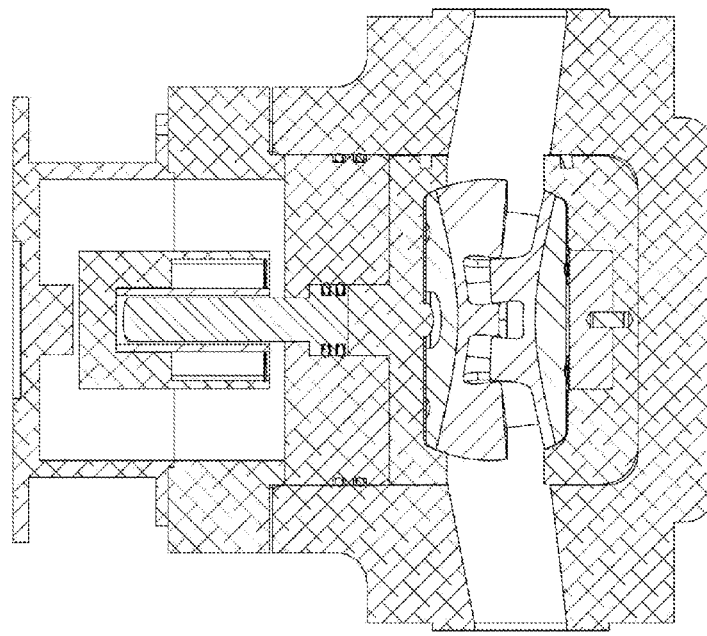
FIG. 36 is a cutaway view taken along line 36-36 of FIG. 35.
Figure 38:
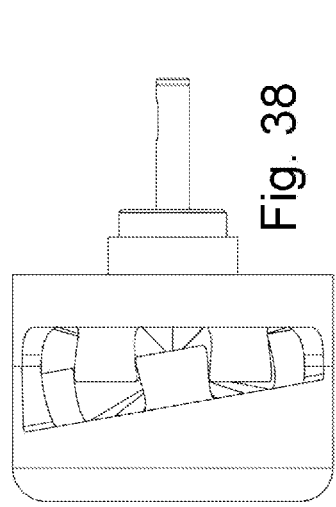
FIG. 38 is a side view of the variation of FIG. 37.
Figure 37:
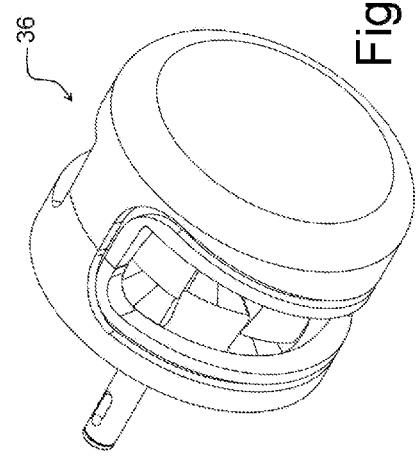
FIG. 37 is an isometric view of another variation of a pair of interoperating rotors held by a plurality of support components.
Figure 40:
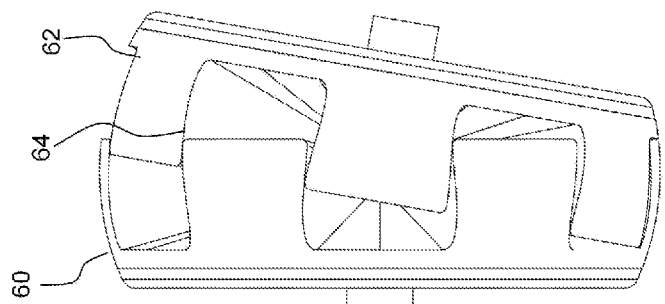
FIG. 40 is a side view of the variation of FIG. 39.
Figure 39:
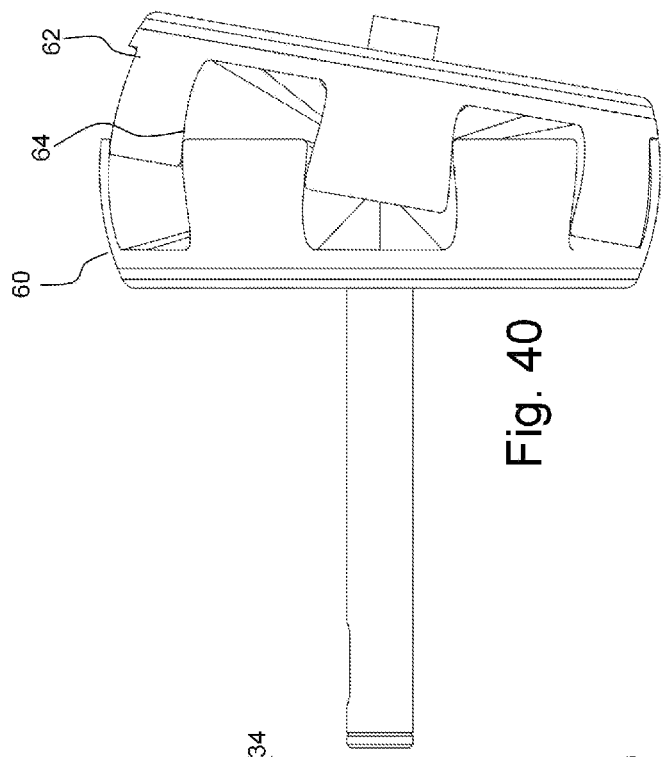
FIG. 39 is an isometric view of another variation of a pair of interoperating rotors such as those of FIG. 37 with the seal blocks removed for clarity.

It is important in at least several forms of the design to not allow debris to be directed towards the gap formed between the outside spherical diameter of the rotors and the inside diameter of a seal block, which in one form is also spherical. When the porting is designed so that the outer walls of the porting smoothly transition to the seal block, such that the port leads up to the rotors smoothly becoming nearly tangent to the rotor outer diameters, a wedging action may be created, increasing the likeliness that debris will become trapped between the outer diameter of the rotors and the inner diameter 120 of seal blocks. This disclosure in one form at least in part solves this by having an abrupt flat or scoop 118 as shown in FIGS. 59-66 that directs debris directly backwards, or directly downward into the rotor lobes away from the inner surface 120 of the seal block, rather than directing the debris tangentially. The scoop example of FIGS. 59-65 comprises a first rotor surface 238 which is adjacent or in contact with the outer radial surface of a first rotor, and a second rotor surface 240 which is adjacent or in contact with the outer radial surface of a second rotor. The scoop surface 238 is generally tangential to the rotation of both rotors. The flat or scoop surface 242 of the scoop 118 in one form is normal to the spherical outer surface of the rotors and of some reasonable depth that may be greater than the diameter of a typical particle in the flow stream. FIGS. 33 and 34 show cross sections of a device very similar to that shown in FIG. 8. In this FIG., the protrusions 122 are indicated as protrusions 122a and 122b. The radially outward surface of the protrusions 122 are in contact with the inner surface 124 of the seal blocks. FIG. 34 shows a cross section which passes through one of the protrusions 122. In the variation shown, fasteners 126 such as dowel pins, screws, etc. are fitted into voids 128 to align the upper and lower support components 84 and 86 during assembly. Voids 129 may also be utilized for fastening the support components 84 and 86 together. These voids 129 may be threaded for easy construction of the apparatus.

FIG. 66 further shows one variation comprising a scoop 118 wherein the scoop depth 236 is relatively small. The depth 236 of the scoop 118 in one may not need to be very large, depending upon the size of the debris or particles encountered in the flow stream the debris particle size may be substantially smaller than the distance (gap 244 of FIG. 60) between the rotor outer diameter and the housing inner diameter 120.

Figure 71:
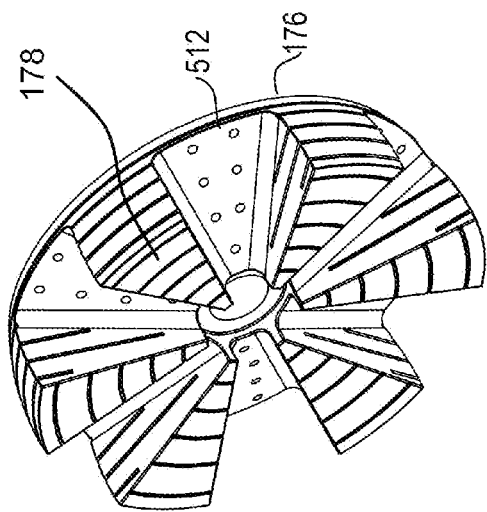
FIG. 71 is one variation of a core structure for an overmolded rotor.
Figure 73:
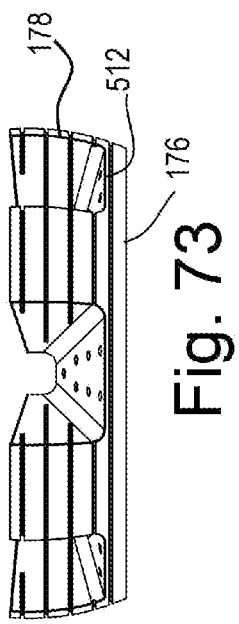
FIG. 73 is a side view of the variation of FIG. 71.
Figure 72:
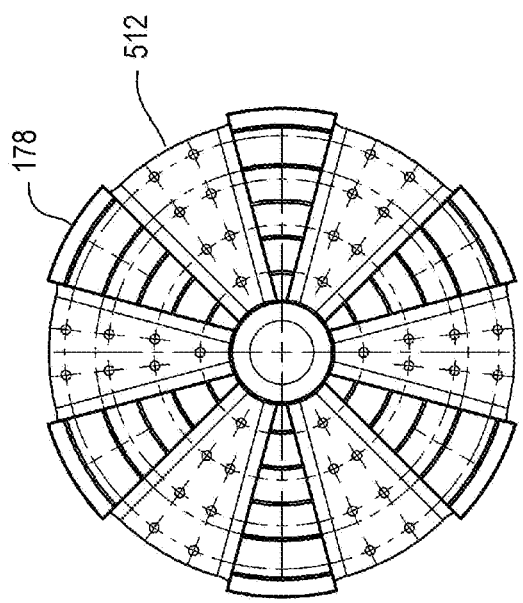
FIG. 72 is a face view of the variation of FIG. 71.

In one variation, the apparatus is configured as an expander (engine) wherein the expander unit may be exposed to a wide range of flow temperatures, changes in operation, and shut downs, ranging in a short period of time from high temperatures to very low (sub-zero) temperatures in the case of a shut down. As a result, thermal expansion or contraction of the components may occur. As the expander in one form has tight clearances (seal gaps), it may be important for the performance of the apparatus that these seal gaps do not change substantially through a wide range of temperatures. Also it may be important that the rotor material, the seal blocks material, or both (if arcing due to static electricity are not a concern with explosion proof standards), comprise a polymer material so as to allow for debris to (temporarily) impregnate the outer surface of a rotor rather than jam the rotors. It may also be important in some variations, such as that shown in FIG. 39, to provide rotors 130 that are made with a malleable (polymer) main body 132 attached to a metal support or backing plate 134. In such applications it may be desired to provide that the thermal expansion coefficient of the polymer used in the rotors be very close to the metal thermal expansion coefficient of the backing plate. Thus, under large temperature variations there are no significant stresses induced in the polymer from different expansion rates. Testing has shown that the polymer may separate or crack from the metal backing plate 134 when the thermal expansion coefficients are not similar. In one variation the rotors are produced with a polymer material that is chemically compatible with the working fluid and has a similar coefficient of thermal expansion. The surrounding materials of the assembly may be stainless steel, aluminum, and or similar materials. Polyphenylene Sulfide (PPS) bearing grade is one of many such polymer materials that has chemical resistance and has a similar thermal expansion coefficient as these metals, particularly aluminum. In one form, the metal support and/or backing material is fastened by way of fasteners 138 to the rotor body although other attachment methods could be used such as adhesives, or by molding the main body 132 onto the backing materials. One example of such a backing plate assembly is shown in FIGS. 71-73 described in more detail elsewhere in this disclosure.

The housing is configured in one form so that any fluid heavier than the process gas inside of the unit should generally drain downward and out the discharge port such as the outlet 34 of FIG. 58. This outlet 34 may be incorporated to facilitate drainage when the unit is not operating. In cold atmospheric conditions the lower positioned drain 34 is provided as it is normally disadvantageous for liquids to build up and freeze in the unit, which could lock up the unit, and may cause corrosion. In addition, freezing process fluid (water) can expand and damage components. Additionally, an opening 140 for attachment of a pressure tap or other sensor may be incorporated into the housing. While one variation of the opening 140 is shown in FIG. 58, the inner portion of this opening is also shown in FIG. 46 which shows the opening passing through the inner surface of the outer housing 206 for the inlet flange face 32.

FIG. 8 illustrates the main moving stationary stators components of one variation. In this variation, a ball 38 is inserted, or a spherical shape protrudes from, the inside of one of the rotors such that the ball lies centered at the spherical centers of the rotors 88/90. The ball 38 may be machined or attached to the end of the shaft 92.

If the spherical inner diameter 40 of one rotor has an overhang, the sphere (ball) can be inserted by snapping the sphere past the overhang. This may be facilitated in variations using polymer materials or coverings due to the polymer being relatively malleable. For example, looking at the example shown in FIG. 24, the inner spherical diameter 40 of the rotor 44 may be more than half a sphere such that in a plane parallel to the back face 48, the largest diameter at a median region 246 is larger than the diameter at the upper region 248 near the upper edge of the lobes 256.

The ball 38 may provide a tight seal gap at the inside diameter of the lobes. The rotor lobes may be designed to also have a relatively tight sealing gap between the individual lobes of opposing rotors. The rotors generally mesh with each other, and rotate in the same direction. The rotors may or may not be made of the same material and have either a through shaft design described above, or in other variations each rotor can be supported on their own individual shafts and bearings.

The lobes 256 of the rotor 44 shown in FIG. 24 show a radially projecting ridge 434 or undercut which will engage the opposing face of an opposing rotor during rotation.

The lobes 436 of the rotor 46 shown in FIGS. 15-23 and 26 may include a sloped projection 440 on one face thereof. The sloped projection in one form has a lower edge 442 just above the bucket bottom 162. The sloped projection 440 also has a top edge 444 even with the ridge 446 above the undercut 154. This sloped projection 440 keeps the lobe tip 160 of the opposing rotor from catching on the ridge 446 during rotation. The sloped projection 440 also enhances rolling contact (rather than sliding or scraping contact) between the rotors 44/46.

In one form, the rotors 44/46 shown in FIGS. 24/25 respectively are substantially the same as the rotors 44/46. The rotors of 44/46 are shown attached to backing plates 448/450 respectfully. Such backing plates are disclosed in more detail elsewhere in this disclosure such as with respect to FIG. 39.

Figure 88:
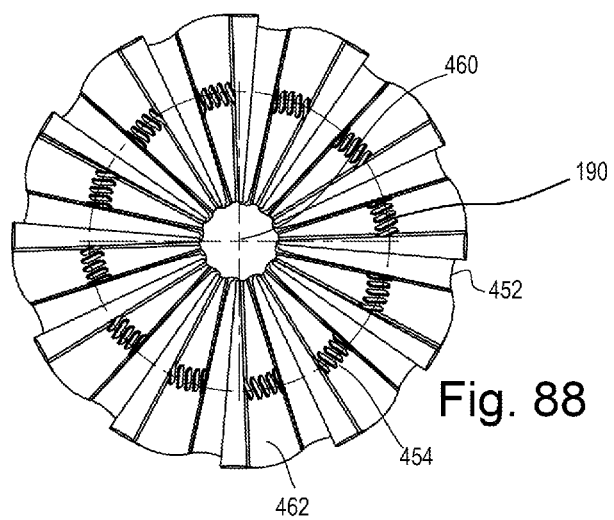
FIG. 88 is a front view of another variation of a rotor with a tread pattern.
Figure 89:
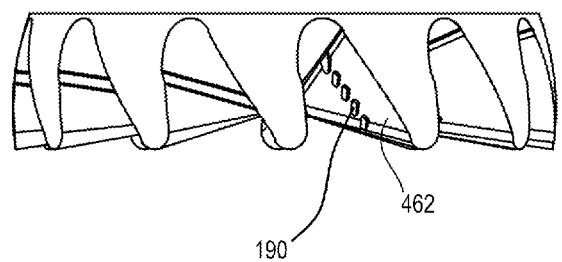
FIG. 89 is a side view of the variation of FIG. 88.
Figure 90:
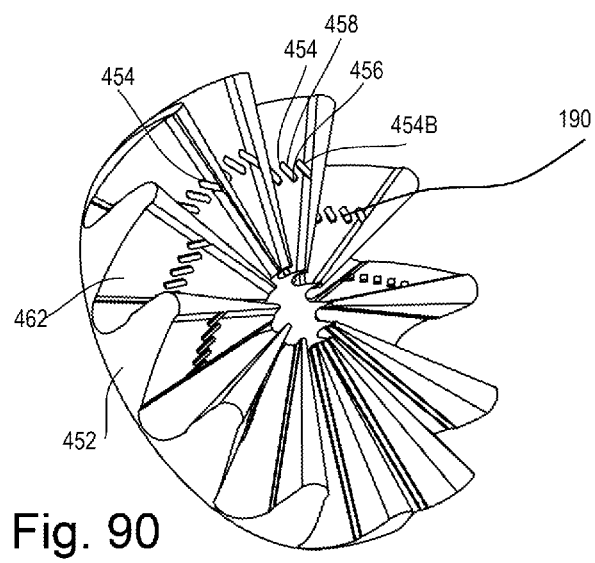
FIG. 90 is a perspective view of the variation of FIG. 88.

Looking to FIGS. 88-90 is shown a rotor 452 which functions in a similar way to the rotor 46, but where the function of the sloped surface 440 is fulfilled by a plurality of projections 454 where the upper edge 456 of a first projection 454A is vertically above the lower edge 458 of a second projection 454B adjacent and vertically above the first projection. In one variation, the uppermost projection abuts the ridge forming an overhang. In one form, any radial line extending from the spherical center 460 of the rotor, on the surface 462 will pass through at least of the protrusions 454. Thus, the lobe tip of the opposing rotor will not "drop" between adjacent protrusions, potentially causing vibration.

Such a tire tread pattern 98 functions to eliminate vibration in the same manner as the sloped surface 440 described above, but also provides a fluid flow path between adjacent protrusions. As the fluid flows between protrusions, it may also carry dirt and debris with it, away from the contact surfaces.

Figure 69:
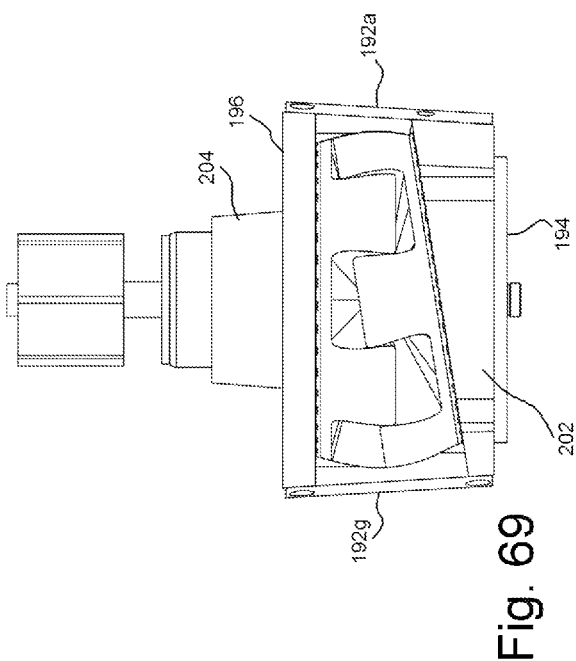
FIG. 69 is a side view of the variation of FIG. 67.

Several variations, including that shown in FIG. 45 have an outer cylindrical housing 142, and one or more end caps 144/146 that attach to the housing 142. At least one variation is disclosed wherein the stator 148 is isolated from the process fluid. Wires 150 may exit the apparatus through the housing or end cap 146. Generators may be of the switch reluctance (SR) type, or permanent magnet type such as axial flux permanent magnet (AFPM), or radial flux permanent magnet (RFPM) configurations. Several variations utilize a through-shaft arrangement while others utilize an independent shaft design where there may be a generator coupled to the through-shaft. A generator may be coupled to the shaft extending out of one or rotor or another generator coupled to the second rotor. Although several devices shown herein utilize two rotors, the device may be designed with additional rotors such as found in U.S. patent application Ser. No. 12/560,674 at FIG. 69A which shows a three rotor configuration. In addition, the lobe geometries and/or speed ratio between rotors may be altered. Additionally, rotors can be layered or sandwiched within the rotor assembly.

Figure 55:
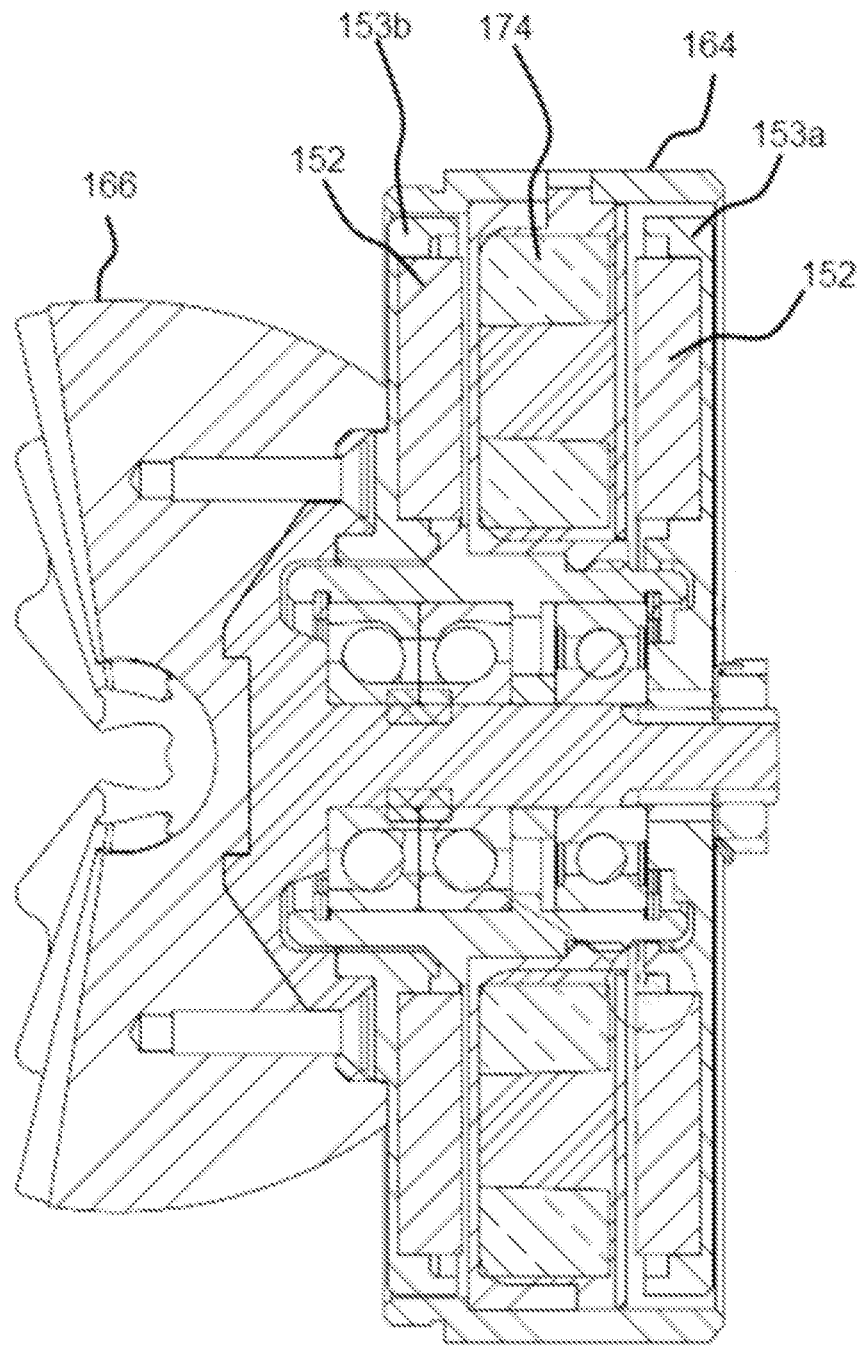
FIG. 55 is a side cutaway view of the variation of FIG. 54.
Figure 68:
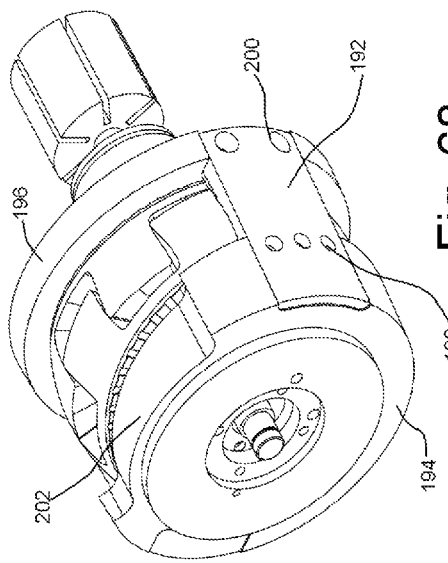
FIG. 68 is an isometric view of the variation of FIG. 67.

An example of an axial flux permanent magnet design with four magnet plates is illustrated in FIG. 56. FIG. 55 represents one generator side wherein magnets are attached to two plates 153a and 153b. In one form there are an equal number of magnet plates on the other rotor making a total of 4 magnet plates in this example of the apparatus.

Figure 14:
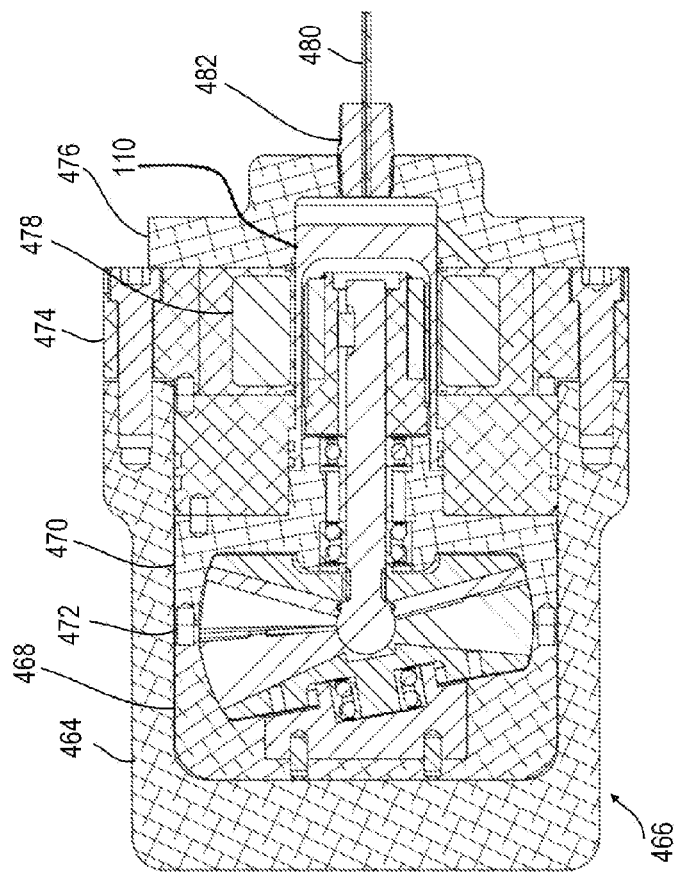
FIG. 14 is a side cutaway view of the variation of FIG. 10 taken along line 14-14 of FIG. 13.
Figure 13:
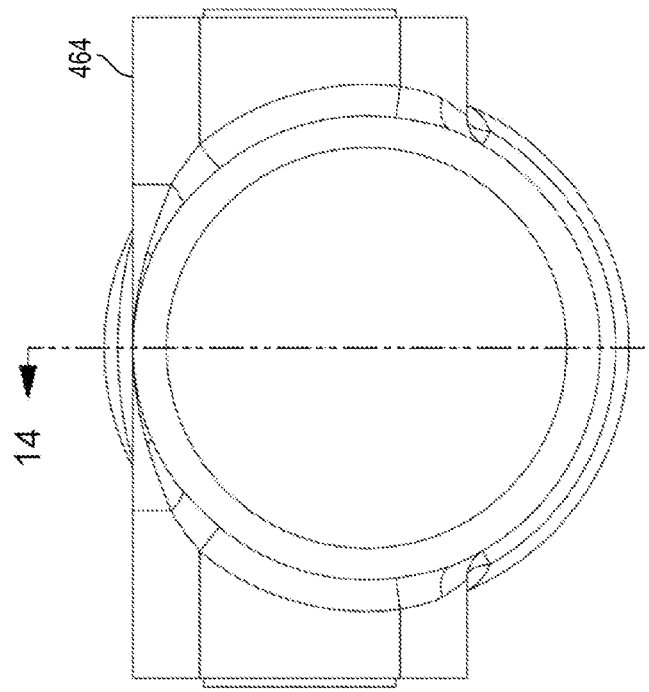
FIG. 13 is a front view of the variation of FIG. 10.
Figure 31:
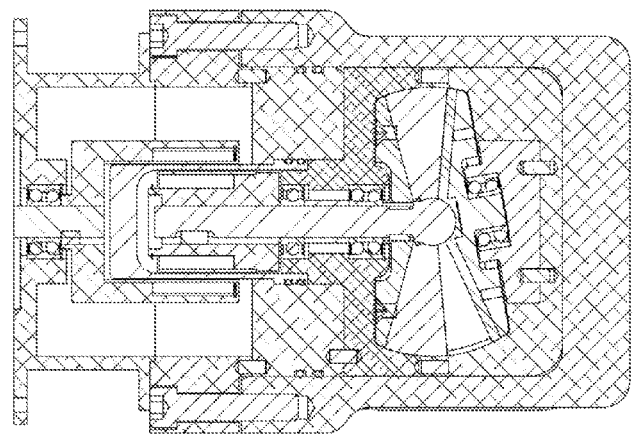
FIG. 31 is a side cutaway view taken along line 31-31 of FIG. 30.
Figure 28:
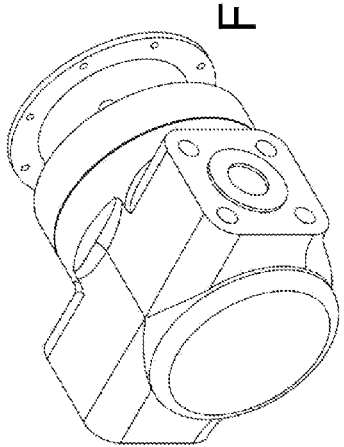
FIG. 28 is an isometric view of another variation of the disclosure.
Figure 30:
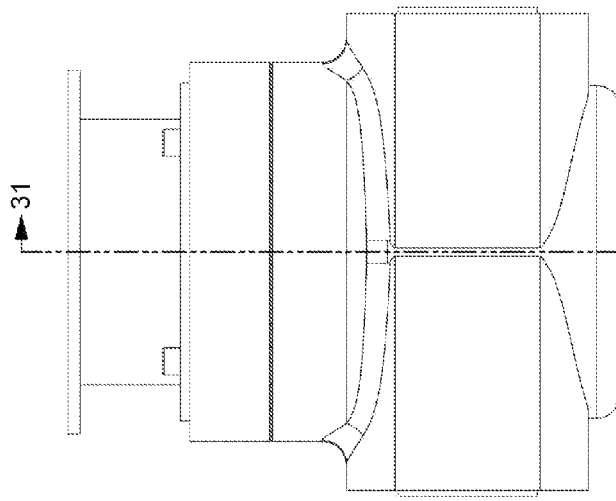
FIG. 30 is a top view of the variation of FIG. 28.
Figure 29:
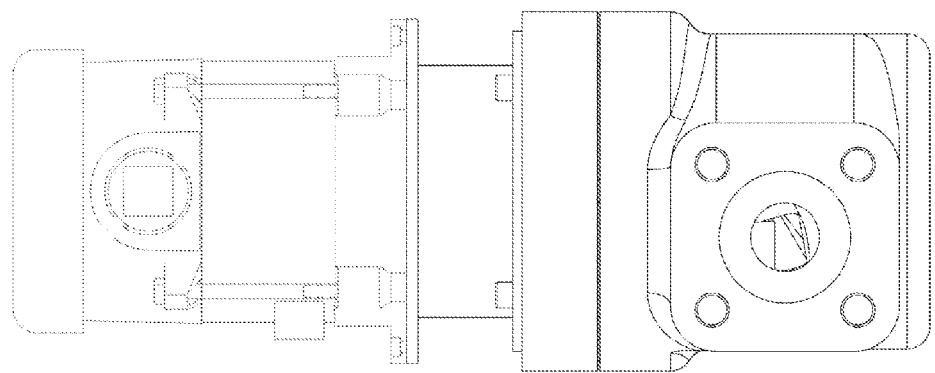
FIG. 29 is a side view of the variation of FIG. 28 with a generator attached thereto.
Figure 32:
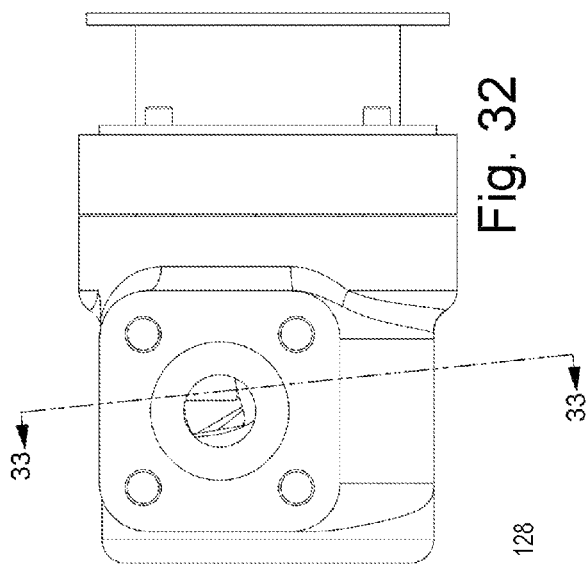
FIG. 32 is a Side view of the variation of FIG. 28.

When utilized as a switch reluctance generator or as a radial flux permanent magnet generator, the apparatus can utilize a stator either immersed in the process fluid, or isolated from the process fluid by means of a thin metallic sleeve containment shroud 110 previously described (FIG. 14) that separates the rotor from the stator. Removing or not providing the containment shroud 110 would result in a "wet" running RFPM configuration. The "dry" RFPM configuration may utilize a magnetic coupling as shown herein. In a dry RFPM configuration, the wiring may be completely isolated from the process fluid and provide a design wherein explosion proof design standards may be more easily met. For the case of permanent magnet generator(s) in the assembly, magnet plates may consist of a ferromagnetic material in order to magnify the magnetic flux through the stator, the stator being stationary relative to the housing. The magnet plates in at least one variation are fixedly attached to a rotor shaft. The configuration of the magnets shown in FIG. 56 uses six flat permanent magnets 152 on each side of the stator, however the design is not limited to a particular number of magnets, and many arrangements (configurations) of magnets could be used, such as a Halbach array with or without a ferromagnetic material for the magnet plates. Several coil geometries can be used in the stator. While the stator may be wound in several different configurations, preferred is three phase windings for many applications. The rotors and armature may be supported by rolling element bearings, journal bearings, or hydrodynamic bearings, including foil bearings for high-speed applications.

The rotors may be mounted on shafts, and/or within a housing such that their axis of rotation are offset from collinear as described in several references listed above.

By definition used herein, "seal blocks" are substantially gap seals that are placed at the outside diameter of the (spherical) rotors. These seal blocks may be placed or their width sized in such a way so as to optimize the performance of the device (expander). Typically for a low differential pressure application, the two spherical gap seals may have a depth (circumferential width) slightly larger than one lobe width measured at the outside circumference of the rotors, and the two sealing locations located approximately 180 degrees apart, and centered on the imaginary plane formed by the axis that are offset from collinear.

Some features of the Field Expander that may make it novel or useful in comparison to competing technologies:

The disclosed constant velocity shape with the undercut lobe-ends 154 as shown for example in FIG. 19, or, undercut buckets 156, is designed such that there is a clearance 158 between lobe tips 160 and bucket bottoms 162. This clearance 158 is beneficial for passing debris such as sand particles, without jamming the rotors, since the lobe-to-lobe sealing as seen in FIG. 15 may occur in a "scraping" motion in combination with the scoop feature mentioned. That is, the rotors may be designed to eliminate grinding or rolling action. The result is the device does tend to get jammed with debris and incorporates self-cleaning characteristics, particularly with the teardrop shaped 1:1 rotors providing a large tilt angle with the lobe to lobe contacts much like a scraping action. The undercut lobes 436 of FIGS. 19, 26 also help to isolate rotor to rotor contact to the maximum volume position 454 (FIG. 17) and minimum volume position 454.

Positive displacement rotors, such as the referenced and incorporated lobe designs in some variations have relatively tight clearances to minimize leakage and flow-through. The result is that the required flow rate of gas to turn the device is minimal compared to most flow-through devices such as bladed, centrifugal or paddlewheel turbine designs. Lower required flows results in more power and less flow required to pass through the device, potential higher efficiency as a result, which could mean cost savings for example, in a natural gas line when a compressor is required to step the pressure up to line pressure.

Low differential pressure required to turn the device relative to prior art devices, as there is minimal rubbing friction in the device—for example, either there are no contacting dynamic seals, or the dynamic seals are of a low-friction design. The disclosed design may result in low friction and therefore low differential pressures required, resulting in energy savings. Rotation and power conversion with differential pressures as low as 1 psi are attainable, and at full power differential pressures of 8 to 12 psig are typical for the several variations. Devices with contacting seals have been shown to have high friction and as a result are less efficient.

Polyphenylene Sulfide, or similar non-hygroscopic polymer material, may be used for the exposed rotor surfaces in the preferred variations. The material should remain relatively dimensionally stable in the working environment and have a similar thermal expansion coefficient to surrounding assembly components, also should be low friction and high wear resistance, and ability to allow sand particles to embed within the rotor material rather than jam the rotors such as if the rotors were a hard metal. Polymer creep may also make the device run more efficiently as sealing gaps tighten at the seal blocks over time with centrifugal forces. The polymer layer may be disposed on the rigid rotor body by compression or injection molding to make rotors more practical for manufacture in high volumes.

Seal blocks in one form have a "scoop" 118 as shown in FIG. 59 or other feature such as the protrusions 122 shown in FIGS. 33 and 34. Such surfaces serve to deflect relatively large sand or debris in the fluid stream from jamming between the outside diameter of the rotors, and the inside surface of the seal blocks at the spherical seal gap. In the example of FIG. 33, the radial edge 336 serves this function. In the example of FIG. 59, the surface 242 serves this function. The scoop 122/118 in one form deflects particles into the central lobe-to-lobe regions away from the outside diameter of rotors.

In one variation illustrated in FIGS. 50-57, the symmetrical seal block 338 and generator design in one form results in two generators 164 of equal design each coupled to separate rotors 166, and cogging of the generators 164 are "timed" to minimize friction between rotors in that both generators 164 should produce the same resisting torque at the same rotational position, and therefore one rotor should not excessively rub on the other in that the cogging torque varies but is equal and balanced between the two rotors. The generators 164 are mounted to seal blocks 338, which are then mounted to an outer housing 500 having a fluid inlet 502 and a fluid outlet 504. One or more fittings 506 may be provided for electric connection thereto. The seal block assembly also has a fluid inlet 508 and outlet 510. The inlet/outlet may be reversed.

Figure 51:
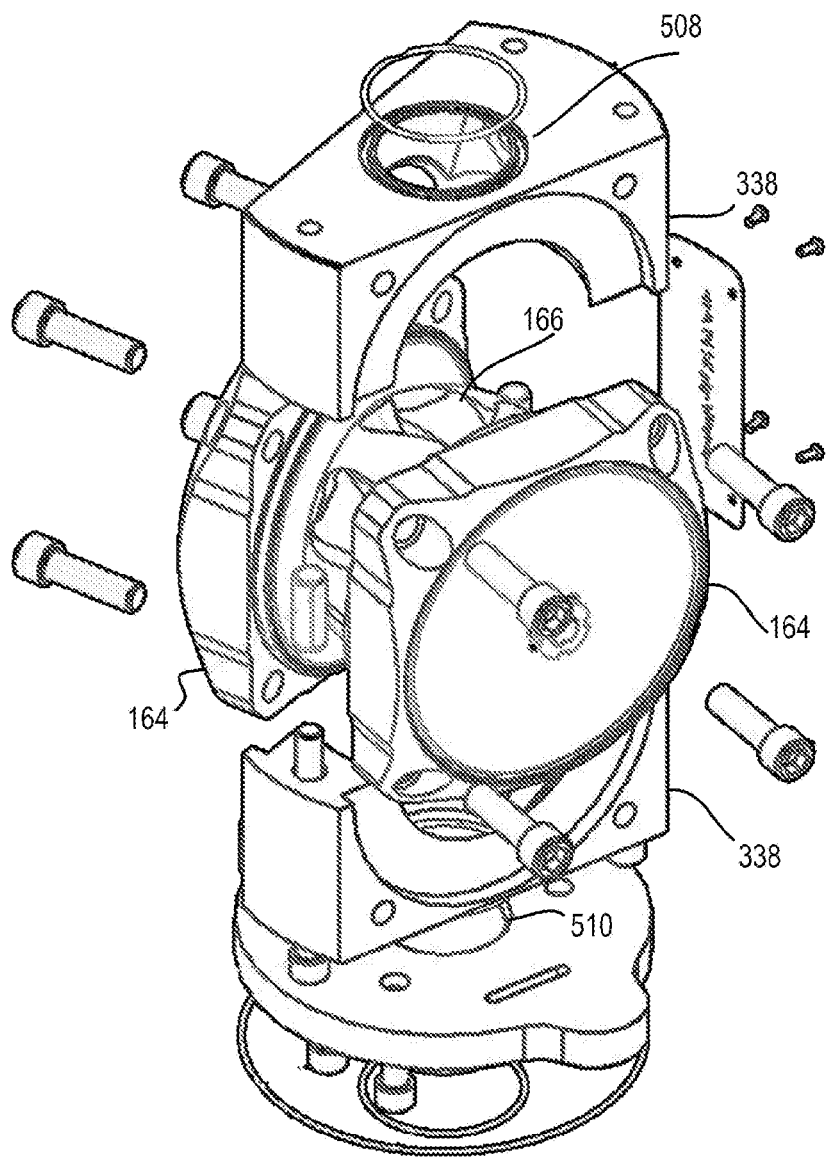
FIG. 51 is an exploded view of one form of a generator assembly portion of the variation of FIG. 50
Figure 52:
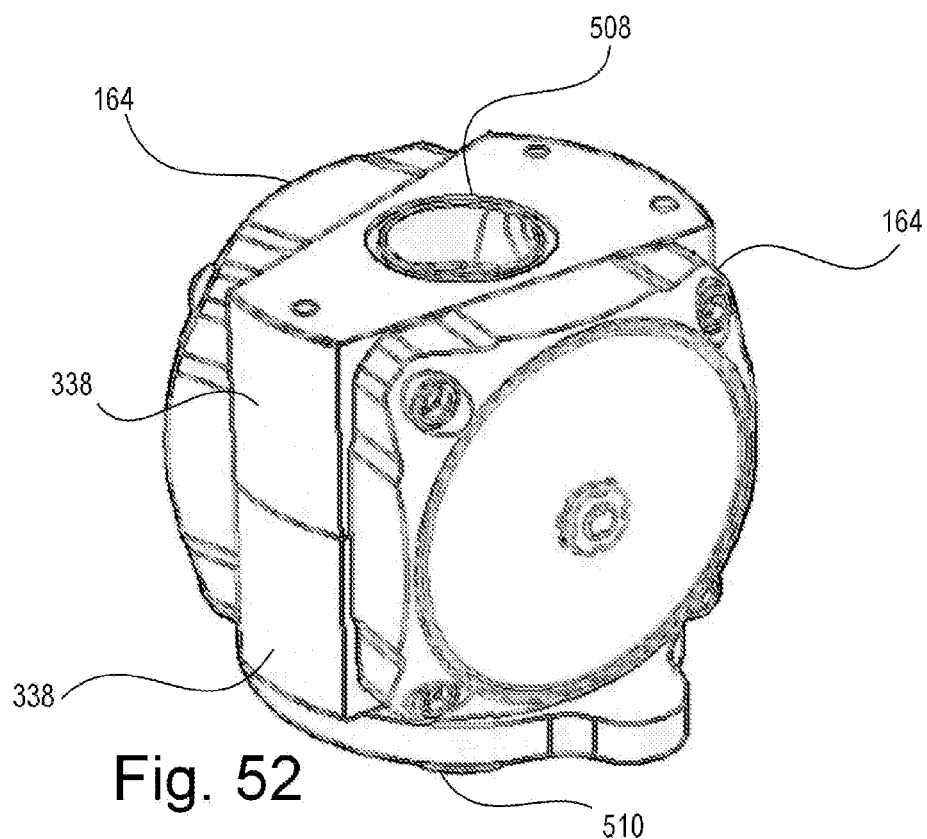
FIG. 52 is an assembled isometric view of the variation of FIG. 51.
Figure 53:
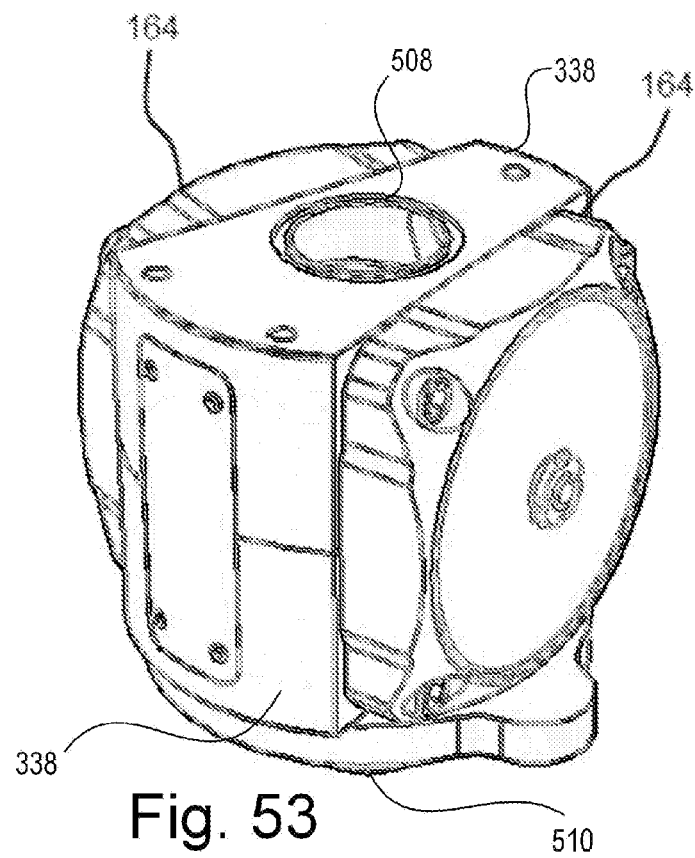
FIG. 53 is an assembled isometric view of the variation of FIG. 51 from an alternate angle from that shown in FIG. 52.
Figure 54:
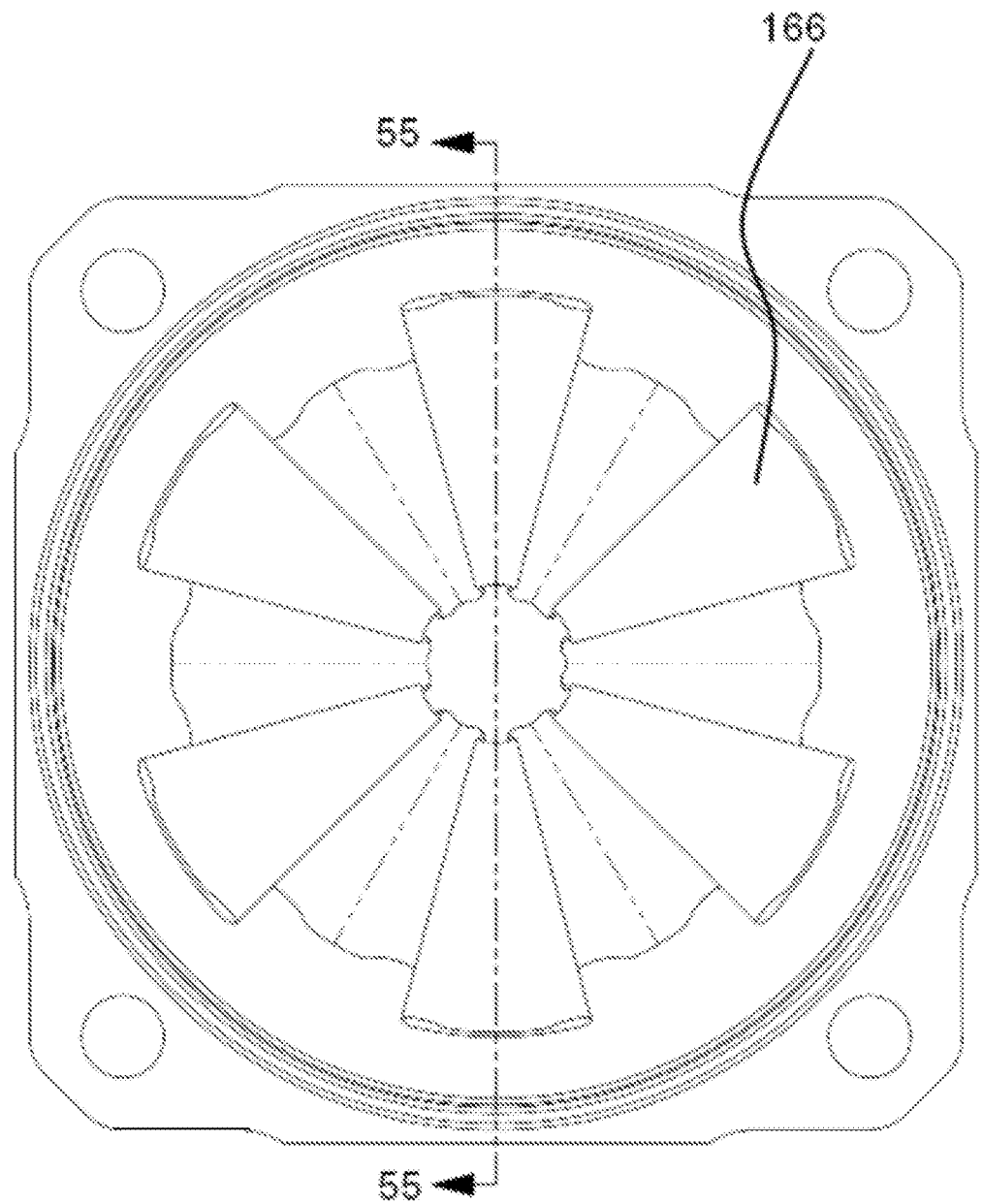
FIG. 54 is an end view of a slave rotor assembly of the variation of FIG. 51.

In the example of FIG. 51, the seal blocks 338 may be identical, and attached to each other by way of fasteners and/or alignment pins and a cover plate. While the scoop feature 242 may be provided on both seal blocks 338, it may also be provided on only one seal block. Especially when the fluid flow is constant in a single direction, only one scoop feature may be required. Utilizing a seal block 338 without a scoop feature 242 may reduce the difficult and cost of manufacture.

In one form, coils 174 are provided within the generator 164. These coils 174 may be "coreless" in that there may be no (iron) core within the coils. It is typical for iron cores to be provided inside coils to concentrate magnetic field density and make generation more efficient with only a single set of magnets attached to a magnet plate on one side only, however in the variation of FIG. 55, two magnet plates 153 are shown, the magnets 152 on each side of the coil (stator) provide for the magnetic field to be substantially constant across the coils, which may in some applications preclude the need for (iron) cores. By eliminating the iron cores the design may substantially reduce cogging effects. As a magnet passes by a core, the magnet is strongly attracted to the core which may cause a cogging effect once the magnet has passed a certain point in moving past the core. Such a cogging effect is generally detrimental as the generator should be relatively "free spinning" to operate in low differential pressures. For the same reason it may be ideal for RFPM machines also not to have cores, however, it has been found that some motors with iron cores have very little cogging torque and thus may not be of concern for some motor designs.

Cogging torque between the two rotors can be changed based on the position of rotor lobes relative to each other and relative to the poles of the generator, so as to make the unit more smooth running in the case of the variation shown in FIGS. 50-57.

A balanced rotor design, such that one rotor has a modified profile as outlined in patent application Ser. No. 09/757,126, can be incorporated to improve efficiency of a given rotor pair, example rotors shown in FIGS. 10-27.

In the example of FIGS. 10-27, the lower housing 464 may be cast or machined as a unitary structure. The inner assembly 466 may comprise a lower seal block 468 and upper seal block 470 attached together by way of fasteners 472. Likewise the top cap 474 is fastened to the lower housing. A stator enclosure 476 may be fastened to the top cap 474 housing the stator 478 and hat 110. The lower housing forms the inlet and outlet which in this example are on opposing lateral sides of the lower housing 464. Wires 480 extend from the stator enclosure 476 through optional fitting 482.

The generators may be driven by a magnetic coupling as illustrated in FIGS. 28-40, to isolate from the working fluid.

Rather than a magnetic coupling, one variation utilizes a "canned motor" as illustrated in FIGS. 41-43 and FIGS. 1-8. This design is similar to prior art application 2010/0133834, where the stator is isolated from the process fluid by means of a pressure containing containment shroud 110 and the rotor with the permanent magnets 112 may be exposed to the process fluid. The containment shroud is made of a suitable material that in one form is non-magnetic which can withstand substantial fluid line pressure. Laminated containment shroud designs are also ideal for high rotational speeds to reduce eddy current losses.

Figure 42:
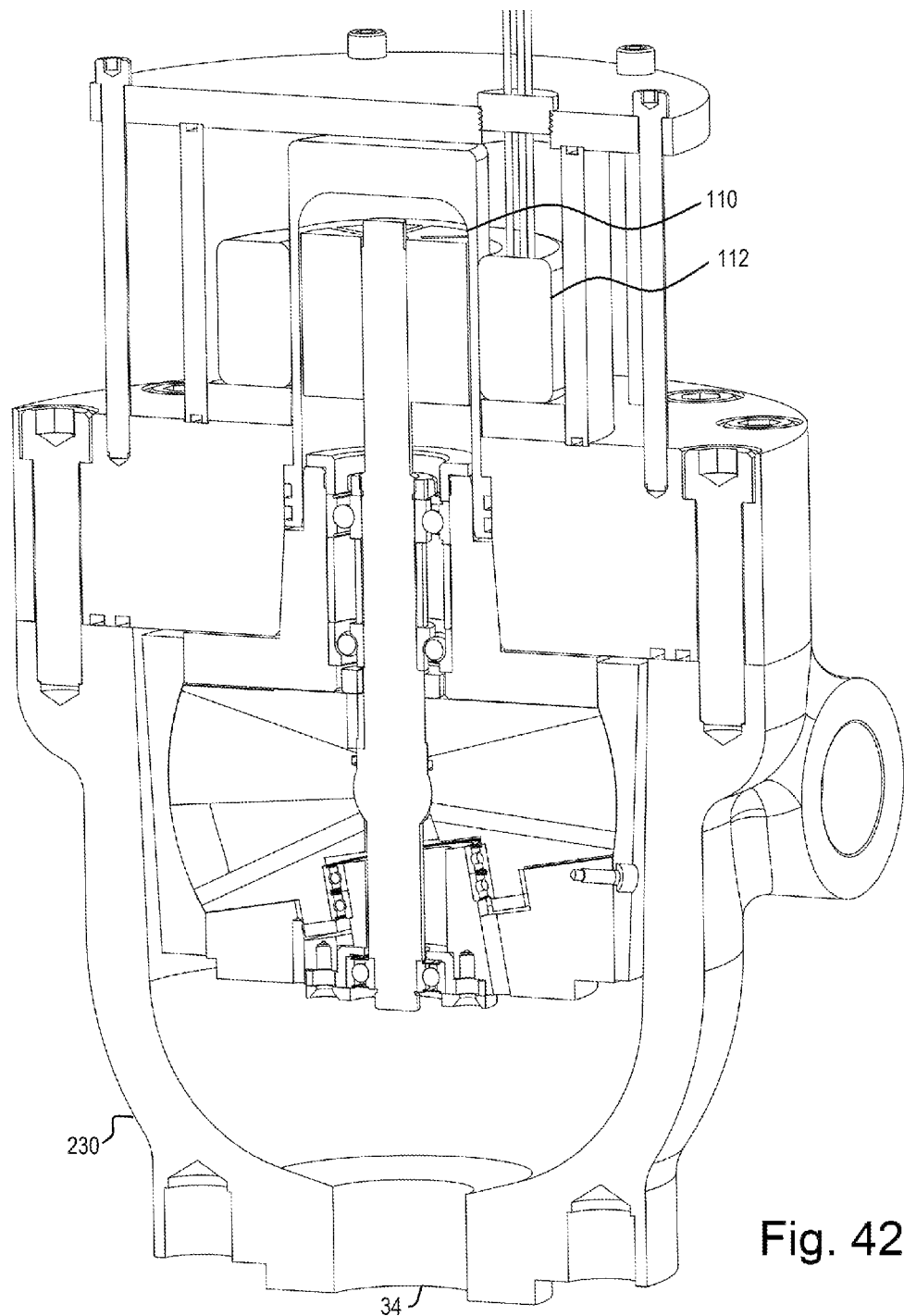
FIG. 42 is an isometric cutaway view of the variation of FIG. 41 from another angle.
Figure 43:
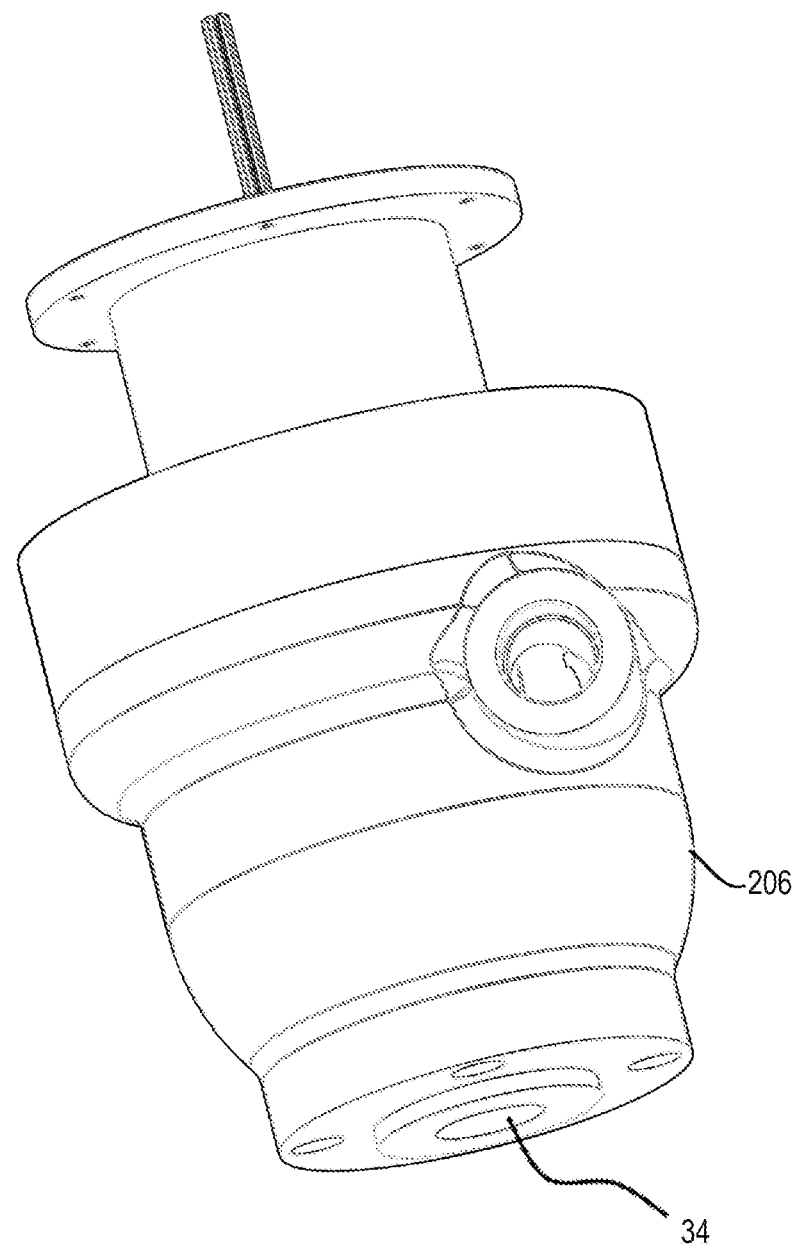
FIG. 43 is an isometric view of the variation of FIG. 41.
Figure 44:
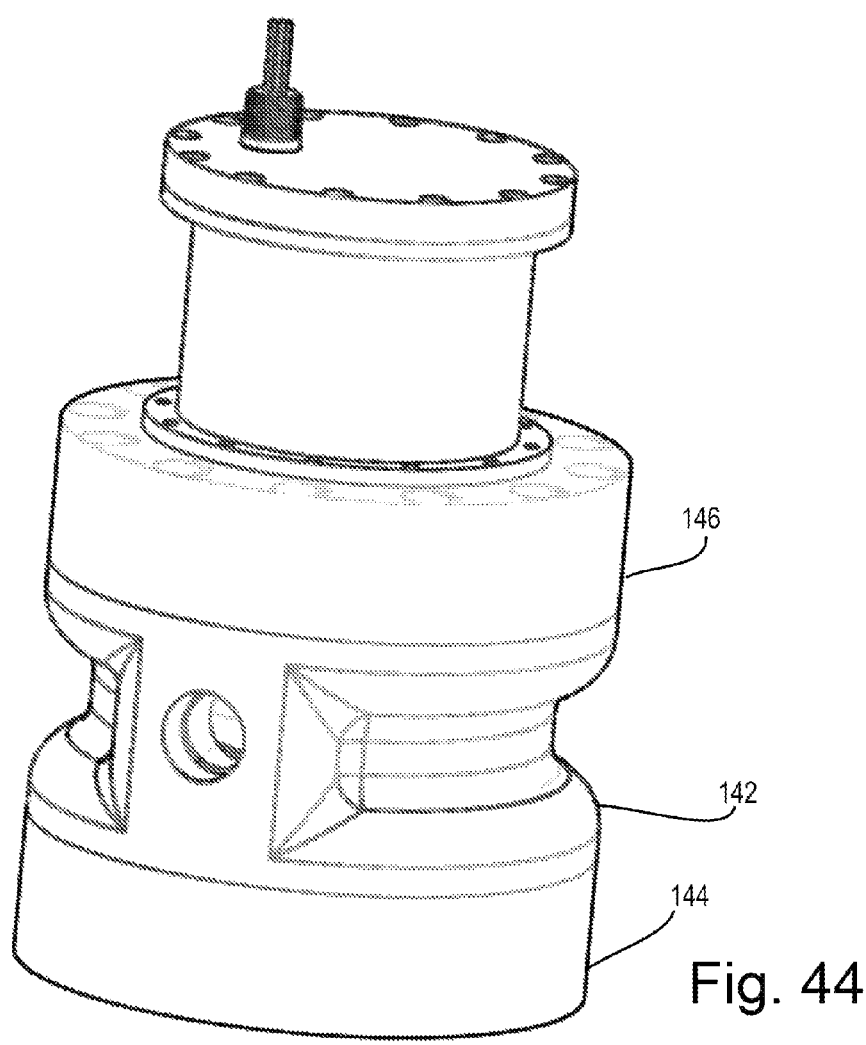
FIG. 44 is an isometric view of one variation of the disclosure similar to that of FIG. 41 with a different outer casing shape and arrangement.

In all the variations except for that shown in FIGS. 41-43, whereby the rotor sealing is primarily at the outside diameter of the rotors rather than the back faces of the rotors, clearance gaps may be relatively large around the back sides of rotors to allow for easier assembly adjustment as well as to reduce viscous torque from sticky fluid properties such as from asphaltenes in well gas.

In the symmetric variation depicted in FIGS. 50-57 with symmetric seal blocks 338, bearings 168 may be indirectly sealed via a tortuous (indirect) path, much like a labyrinth, such that it is unlikely that debris from the gas stream can get to the bearings 168. These seal blocks 338 in one form are shown in more detail in FIGS. 59-66.

The apparatus in several variations may use ceramic and/or sealed bearings or other longer lasting bearings to extend bearing life.

The rotors, seal blocks and generators may be assembled as a single unit separate from the pressure-containing vessel, for cost effective part maintenance, ease of access, etc.

Also disclosed is a variation comprising a hybrid type rotor whereby half of each lobe consists of the classical teardrop shape, and the other half of the same lobe is a spherical involute, where the spherical involute side of the lobe generally has a rolling contact, but primarily this involute surface on one or both rotors lies on a "tread" pattern similar to a tire tread, mid-radius in the rotor. The tread pattern and positioning of the tread minimizes the chances of debris becoming trapped within the rolling contact. Also the involute contact may prolong the life of the rotors by mitigating frictional wear on the lobe tips. Also the balanced rotor design can be applied to the involute hybrid rotors as shown in FIGS. 18 and 19 which illustrate a "balanced" set of sawtooth rotors. In this variation, the rotors comprise lobes that are hybrids of teardrop variations, and half spherical involute variations.

An optional "lip" or boss 220 along the outer edge 222 of the spherical surface 224 following the teardrop profile of the rotors 226 may be added as shown in FIGS. 82-87, indenting much of the outer spherical area of the radially outward surface of the rotors away from the inner spherical surface of the seal blocks, so as to reduce viscous drag from asphaltenes and other contaminants.

In one variation as disclosed above, when the unit is mounted in the upright position, it is self-draining; to prevent fluid buildup as the fluid will drain out of a drain 34 such as that shown in FIG. 42. This self draining feature can eliminate damage from water freezing inside of the device, or prevent other problems associated with a sitting liquid such as corrosion.

The apparatus in several variation benefits from a compact overall design. Such a design is easily serviced as the internal components can be removed and worked on separate from the housing.

In one form, the outer housing may be designed with simple end flanges or one end flange and an outer housing sleeve. Optionally a ball valve may be bolted directly to one side of the outer housing rather than having an end cap on the discharge end of the device. A bypass line may be used to supply the device with a small fraction of gas, a small pressure drop occurs over that bypass, and is then returned to the main line. Typically no combustion occurs and the expander's implementation is environmentally friendly. The apparatus can be isolated from main line during maintenance using shutoff valves.

The design may be modular so that multiple turbine unit housings may be arranged in a skid cost effectively, and in another single-sided generator variation of the turbine device, the generators could also be stacked modularly together along a single central shaft, or multiple turbines stacked within a lengthened outer housing, could drive a single through-shaft, that in turn drives an elongated generator. Little design modification is necessary.

The low pressure drop design in one form is such that the positive displacement rotors pass the fluid from one side of the device to the other, whereby the expansion of the gas occurs quickly over a barrier, rather than sustaining the expansion within an expanding sealed volume. It may be more efficient to have an expansion that occurs within a changing sealed volume such as for example, in a piston cylinder of an internal combustion engine. The apparatus more efficiently utilizes higher pressure drops than prior designs, the "expansion ratio" offered by the CvR geometry can be exploited since the volume of the trapped volumes changes over a partial revolution of the device. To accomplish this outcome, it may be desired to extend and adjust the "seal block" angles, or spans, such that the fluid may expand and produce mechanical work over a greater time period inside of the trapped rotor volumes. In this way, the apparatus can optimize mechanical work for a given pressure drop, particularly higher pressure drops. For example, an expander that has a pressure drop ratio of 2:1 may be better with specially designed seal block angles, however with a pressure drop ratio of 1.1:1 the device's seal block angles may not be that critical as long as they are 180 degrees apart and approximately greater than a lobe width.

Another approach to higher pressure drops is to use multiple units fluidly connected in series and drop the pressure in stages. This could also be done internally within a single assembly housing, with multiple rotor units within one housing.

The complete assembly has an electronic control unit, which regulates the flow rate through the system using valves, and controls the rotor velocity and power generated. These flow rates and rotor velocities are controlled in such a way as to prevent the unit from spinning faster than the design speed, and other important limitations.

In one configuration, the device (expander) is installed on a bypass line wherein the gas flow is directed into a passive pressure reduction valve and the expander unit in parallel. In this variation, the pressure drop through the expander is substantially equal to the pressure drop in the pressure reduction valve. To control the flow in this circuit, an active controlled valve may be used wherein the active controlled valve controls the flow distribution between the two parallel streams. Utilizing this method, the speed of the expander may be controlled to stay substantially constant close to the design revolutions per minute (RPM). For example, when the load on the expander is reduced, the rotors may speed up. The controller senses this speed change and reduces the flow through the expander by directing more flow towards the passive pressure reduction valve. Therefore, the flow rate and pressure drop through the expander is reduced and the expander rotor stabilizes back to a design speed.

The control valve may be located upstream of the expander or on another branch upstream of the pressure reduction valve.

In one form, the rotor may be produced by an overmolding process as shown in FIGS. 71-78 using the steps of providing a backing plate 176 with mounds 178 and valleys 512 machined or cast integral thereto. Wherein the mounds 178 extend into an overmolded polymer material 180 (FIG. 78) during the overmolding process. The mounds may closely follow the profile of the final polymer coated lobe shapes, such that the thickness of polymer material may be quite small (such as for example about ⅛" in thickness). This overmolded design may result in production of rotor lobes which are less susceptible to stresses induced from differences in coefficient of thermal expansion, and may reduce the chances of the polymer material cracking under stress. This production method may also result in an improvement of the final component tolerances as the components may be more dimensionally stable as a larger percentage of the rotors comprise the underlying metal.

Figure 80:
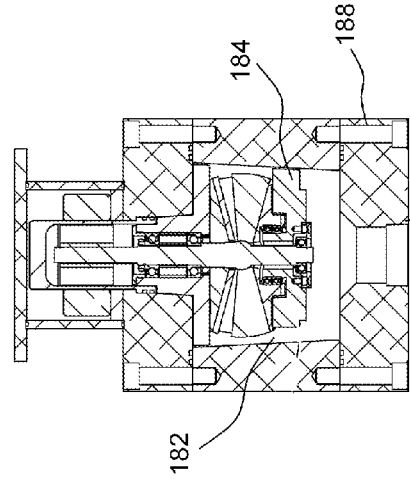
FIG. 80 is a cutaway view of the variation of FIG. 79 taken along line 80-80.
Figure 79:
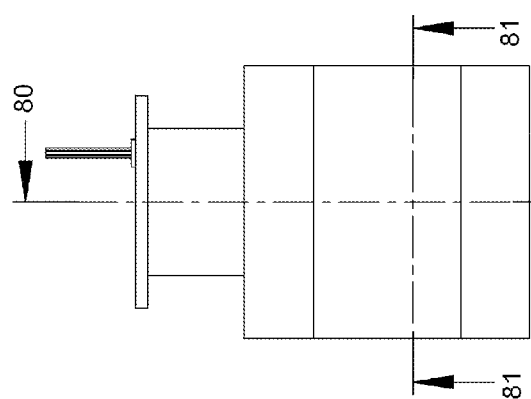
FIG. 79 is a side view of an variation similar to that of FIG. 44.
Figure 81:
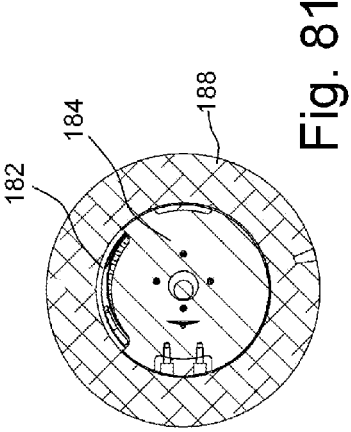
FIG. 81 is a cutaway view of the variation of FIG. 79 taken along line 81-81.

FIGS. 79-81 show an variation which more clearly illustrates how the discharge porting may be configured. In this variation, there is a cutout 182 that is provided on the side of the lower support component 184 so that the discharge flow may flow past, and down out through the bottom 186 of the outer housing 188.

FIG. 88 shows a front view of another variation of a rotor with a tread pattern 190 and FIG. 89 is a side view of the same variation. The tread pattern 190 minimizes the chances of a (sand) particle or other contaminant becoming crushed/rolled between the involute profile tread pattern, and the opposing rotor. The tread pattern may allow debris to pass between the treads centrifugally rather than possibly becoming trapped at the rolling contact, and may also reduce the surface area of rolling contact thus reducing the probability of debris getting crushed (which could cause jamming or accelerated wear).

FIGS. 20-23 show an embodiment with a shaft 484 extending from a housing comprising a support component 486 and adjacent support component 488. In this variation, the side seals/projections 494/496 are fixed to/extensions of the support components. The housing contains rotors 490/492 as with previous variations. In this example a seal groove 498 is provided to contain and position a seal to an outer housing not shown but functionally equivalent to the seal 360 of FIG. 93.

Figure 70:
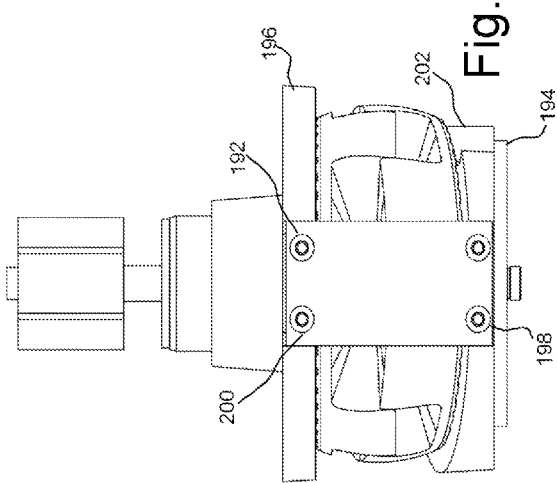
FIG. 70 is a top view of the variation of FIG. 70.
Figure 67:
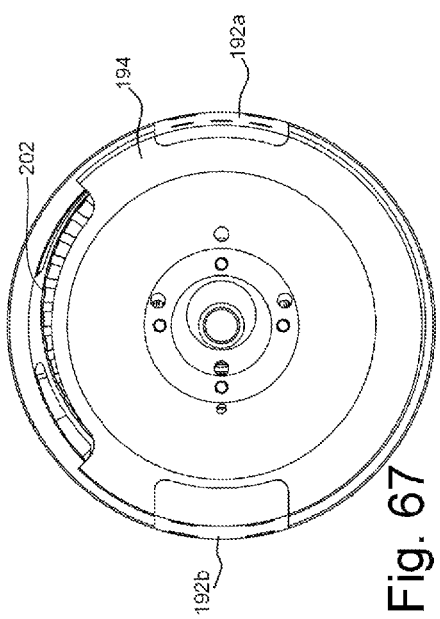
FIG. 67 is an end view of another variation of a rotor assembly with removable seal blocks.

The variation shown in FIGS. 67-70 uses removable seal blocks 192 which may be fastened to a lower support component 194 by way of fasteners 198 and may also be fastened to upper support component 196 by way of fasteners 200. In addition, the discharge opening 202 can easily be seen in these images. This discharge opening 202 in one form is in fluid connection to the outlet of the housing, such as for example the outlet 34 of FIG. 46. Looking to FIG. 69 in particular, it can be seen how the shape of the structure is generally frusta-conic, to interoperate with a housing, substantially equivalent to the outer housing 78 of FIG. 45 and others as previously described in reference to a conformable seal. In this variation, the lower support component 194 functions as equivalent to a combination of the lower support component 84 and tilt support component 94 of FIG. 6. In this variation, the lower support component 194 is not symmetric, as can be seen in FIG. 70 when paying attention to the discharge opening 202.

Figure 91:
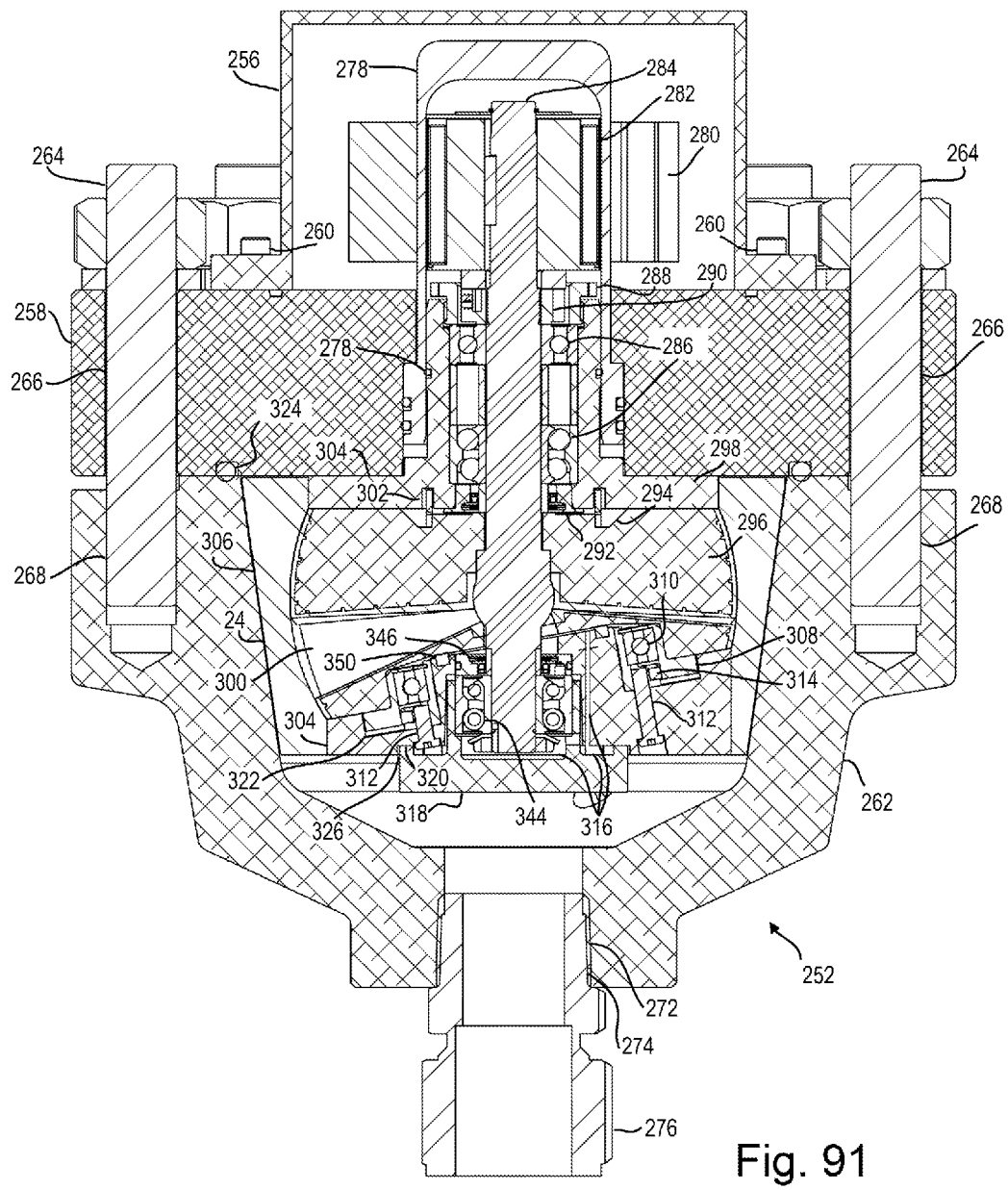
FIG. 91 is a section view taken along line 91-91 of FIG. 92

Looking to FIG. 91 is shown a generator assembly 252 of similar design and function to the generator assembly 254 of FIG. 58 with several modifications and improvements. The generator assembly 252 comprises several outer structural members including a stator enclosure 256 attached to a top flange 258 by way of fasteners 260. The top flange 258 in this example is likewise attached to a lower housing 262 by way of fasteners 264 which may pass through surfaces defining voids 266 into threaded surfaces to 68 similar to that as shown in FIG. 41 for example. As with the generator assembly 270 of FIG. 41, the generator assembly 252 of FIG. 91 comprises an outlet 272 which in this example comprises a threaded surface 274 having a compression fitting 276 threaded and in one form sealed thereto.

The generator assembly 252 further comprises a containment shroud or containment shroud 278 having a fixed stator 280 in close proximity or attached thereto. The containment shroud 278 generally placed radially outward of a plurality of magnets 282 positioned within the containment shroud or hat 278 to fluidly seal the magnets 282 from the standard 280 as previously discussed. The magnets 282 are generally attached to a shaft 284 supported by the top flange 258 by way of a plurality of bearing sets 286 which may be held in place relative to the top flange 258 by way of an upper bearing outer race retaining nut 288. The outer race retaining nut 288 may be held in place by an upper bearing inner race retaining block nut 290. A shaft seal holder 292 and shaft seal, may be positioned at the lower end of the bearing assembly including the bearings 286. Additionally, a wear sleeve may be positioned at the shaft seal holder 292. Pressure balance of the bearing chamber may be achieved in one example with a felt shaft or face seal at the shaft seal holder 292.

A flow channel 294 may be provided in the upper rotor 296 which may cooperate with a recessed face near the discharge on the upper bearing support component 298. The (circular high speed) flow channel or "moat" 294 promotes dirt to flow past the bearing seal area towards the discharge outlet 272. A dirt deflector 302 may be attached to the back side 304 of the upper rotor 296 to further facilitate flow of dirt past the bearing seal area.

Below the upper rotor 296 is provided a lower rotor 300 as previously discussed wherein the lower rotor 300 is supported by a tilt support component 304 which functions in a similar manner to the tilt support component 94 of FIG. 6 previously described. Seal blocks 306 are provided in a similar manner to the seal blocks 26 of FIG. 58. A sealing member 24 may be positioned between the lower housing 262 and the seal blocks 306 as previously described to facilitate assembly. Similarly, the seal blocks 306 in one form are fastened (bolted) to both the upper and lower bearing holder components 298/304.

A lower bearing holder 308 may be positioned with and the tilt support component 304 to support a lower bearing assembly 310. The bearing holder 308 may be secured in place by way of fasteners 312. The fasteners 312 may be fixed through the tilt support component 304. A radial felt seal 314 may be provided and mounted in the inter-bearing holder 308.

To pressure balance the lower bearing chamber and lower bearing seal, passages 316 may be provided between a bottom cap 318 and the tilt support component 304. The bottom cap 318 in one variation has a surface which tightly engages a surface 320 of the tilt support component 304 to seal thereto.

In one form, a relatively large gap 326 may be provided between the upper edge at an upper protrusion of the bottom cap and the tilt support component. When assembled, this gap 326 improves the likelihood that components will make and align correctly together such that the rotors 296/300 and shaft 284 will rotate freely. In addition, an open channel 322 may be provided between the tilt support component 304 and the bearing holder 308 to promote dirt to flow toward the discharge outlet 272 rather than towards the bearing assembly 310. In one example, one or both of the surfaces defining the gap 326 may be tapered to help align the components during assembly and A seal 324 such as an o-ring may be placed in an o-ring groove between the top flange 258 and lower housing 262 to reduce or eliminate fluid flow at the adjacent surfaces thereof.

Figure 92:
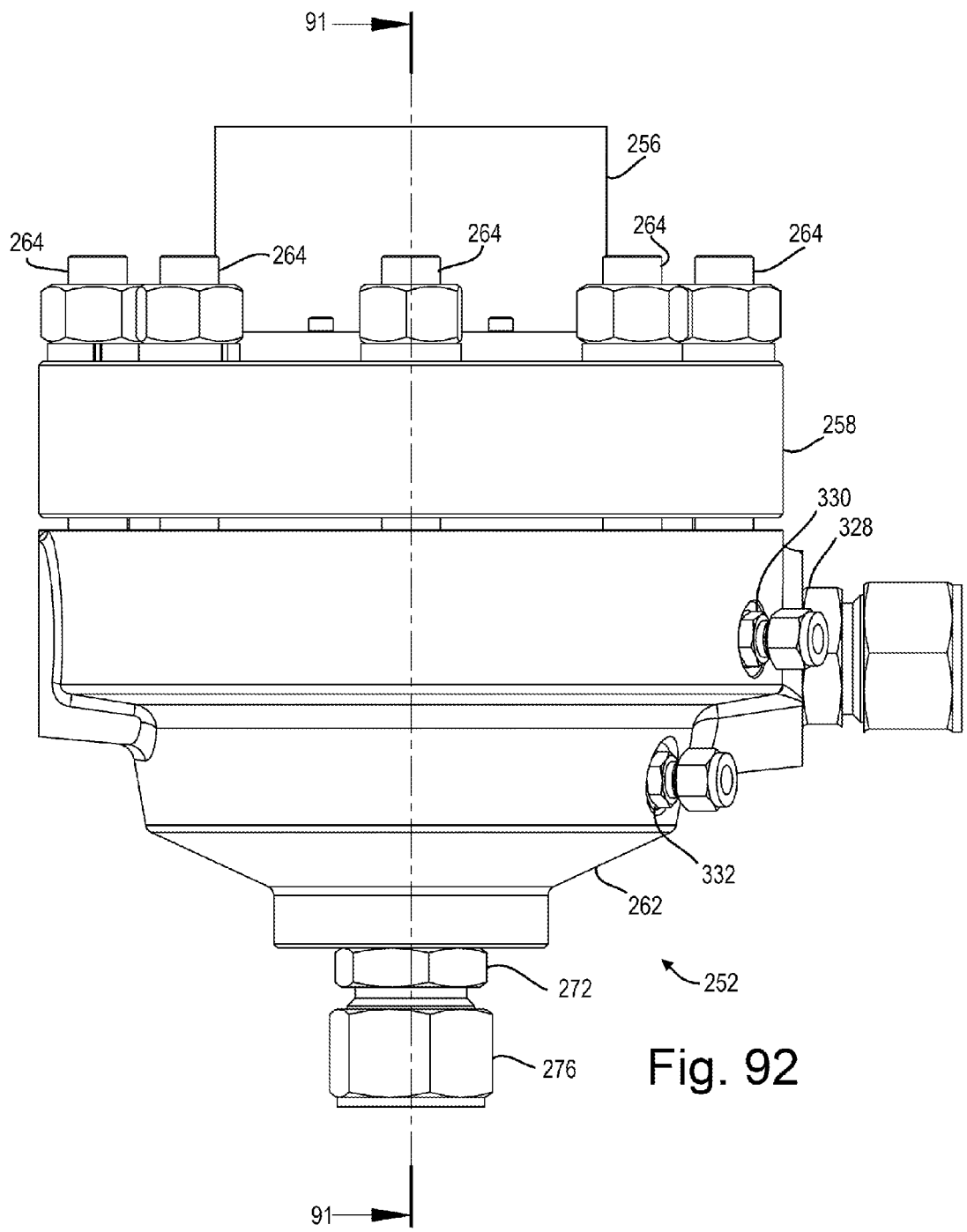
FIG. 92 is a side view of one variation of a generator assembly.

FIG. 92 shows the external surfaces and components of the generator assembly of FIG. 91 including the stator enclosure 256, top flange 258, lower housing 262, and fasteners 264. The external surface of the compression fitting 276 can also be seen, along with the outlet 272 from which the compression fitting 276 extends. Also shown is a compression fitting 332 attached to a pressure tap opening. A compression fitting 328 is also shown, extending from an inlet 328. The compression fitting 328 is substantially large, and generally sized in consideration of the outlet 272, the process fluid, and the pressures/expansion of the apparatus in operation. A pressure tap 330 may be included, extended from another opening for another pressure tap or similar use. The compression fittings may be provided to attach instrumentation. These instruments may be utilized for experimental purposes to better understand the pressures internally. In some applications, they may not be needed for the regular function of the apparatus (expander). In commercial models these ports may be omitted to reduce manufacturing costs and for other advantages. The compression fitting 276 in one form attaches to a discharge line. The compression fitting may be replaced with other fittings such as a pipe connection such as an NPT threaded connection or a flanged connection for example.

Figure 102:
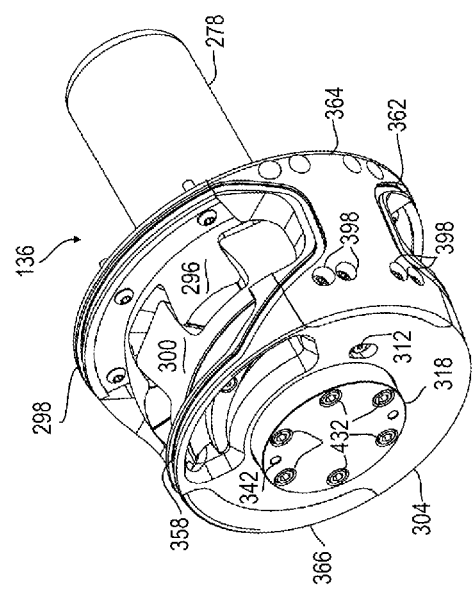
FIG. 102 is a bottom isometric view of the inner sub assembly of FIG. 101.
Figure 101:
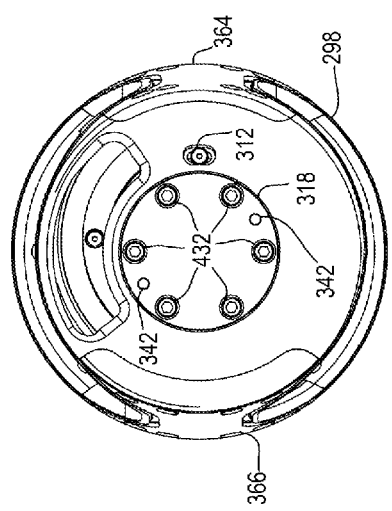
FIG. 101 is a bottom view of one variation of an inner sub assembly.
Figure 103:
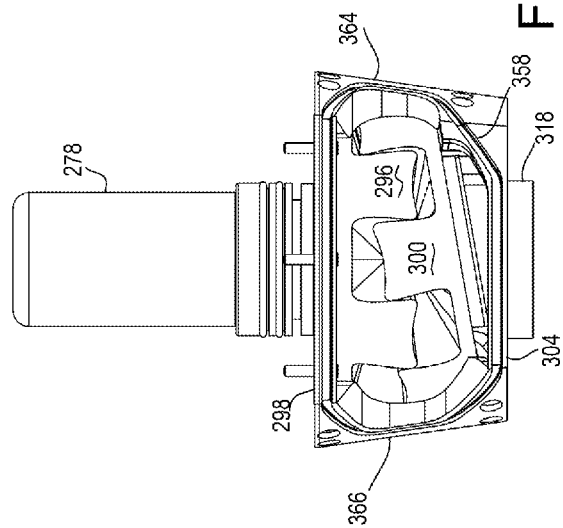
FIG. 103 is a side view of the inner sub assembly of FIG. 101.

Looking to FIGS. 93-95, detailed views of one variation of the tilt support component 304 are shown. This tilt support component is also shown in FIG. 91 and several portions thereof have already been described. FIG. 93 shows the upper surface 340 of the tilt support component 304. Passages 342 may be provided for pressure balancing of the lower shaft bearing 344. The optional cutout 342A when utilized cooperates with the lower shaft bearing seal 346 of FIG. 91. The bearing seal 346 in one form cooperates with an O-ring and lip seal and is held in place with a seal holder adjacent the tile support component 304. A seal groove 348 may also be provided, for containment and positioning of a seal 350 which may be a felt face seal or equivalent. This seal 350 is in contact with the back face of the lower rotor 300. Also shown is a better view of the channel 322 which promotes a high speed flow of the process fluid, thus removing a significant portion of dirt and debris in direction of flow 352 around the central projection 354 and past a surface defining a discharge opening 356. Also shown in FIG. 93 are seal grooves 358/362 which provides positioning of an O-ring 360 shown in cross section. The seal grooves 358/362 can better be seen in FIG. 102 where the grooves 358/362 cooperate with grooves on attached projection components 364/366.

It may be desired that the inlet and outlet O-ring seals fitted into grooves 362 and 358 respectively are equal in perimeter. In this way, the lateral force on the inner assembly is equal and opposite and thus balanced. In previous examples, particularly using (neoprene) flat gaskets often resulted in unequal lateral loading on the shaft 284, and shaft bearings such as 286, 344.

As can be seen in FIG. 94, the back face 368 of the tilt support component 304 includes a recessed region including the surface 320 which engages a surface of the bottom cap 318 as previously discussed. A plurality of threaded holes 370 are provided, through which fasteners 432 are attached for attachment of the bottom cap 318 to the tilt support component 304. In one form, surfaces defining oblong holes 430 are provided through which fasteners 312 pass for attachment of the tilt support component 304 to the bearing holder 310.

FIGS. 96-100 show one example of a support component 298 as previously described and shown in FIG. 91. This example shows a vertical projection component 372 extending vertically from a plate component 374. In one example, the projection component 372 comprises a seal groove 376 which holds an O-ring 378 in place between the projection component 372 and the inner surface of the containment shroud 378 as can be seen in FIG. 91.

The support component has an inner cylindrical surface 380. A groove 382 may be machined in this surface for an O-ring or snap ring for engagement with or retention of the bearings 286. The inner surface 380 may also comprise a shelf or ledge 384 for retention and proper placement of the bearings 286.

In one form, the plate portion 374 comprises seal grooves 386/388 which cooperate with seal grooves 358/362 previously described, via seal grooves in removable seal block components or side projections 364/366.

Adjacent the inner surface 380, and machined into the bottom surface 390 is a flow channel 294 previously discussed which promotes the flow of fluid and suspended dirt and debris along lines 392 towards a recessed area/surface 394. This recessed surface 394 at the discharge end promotes the fast majority of dirt and debris towards the discharge opening rather than towards the shaft seal and thus into the bearings.

Another recessed surface 396 may be created at the inlet side. This surface results in a shoulder tangential to the spherical outer diameter of the rotor. This surface promotes dirt away from instead of into the close gap surface interface at the non-recessed surface 390.

Figure 104:
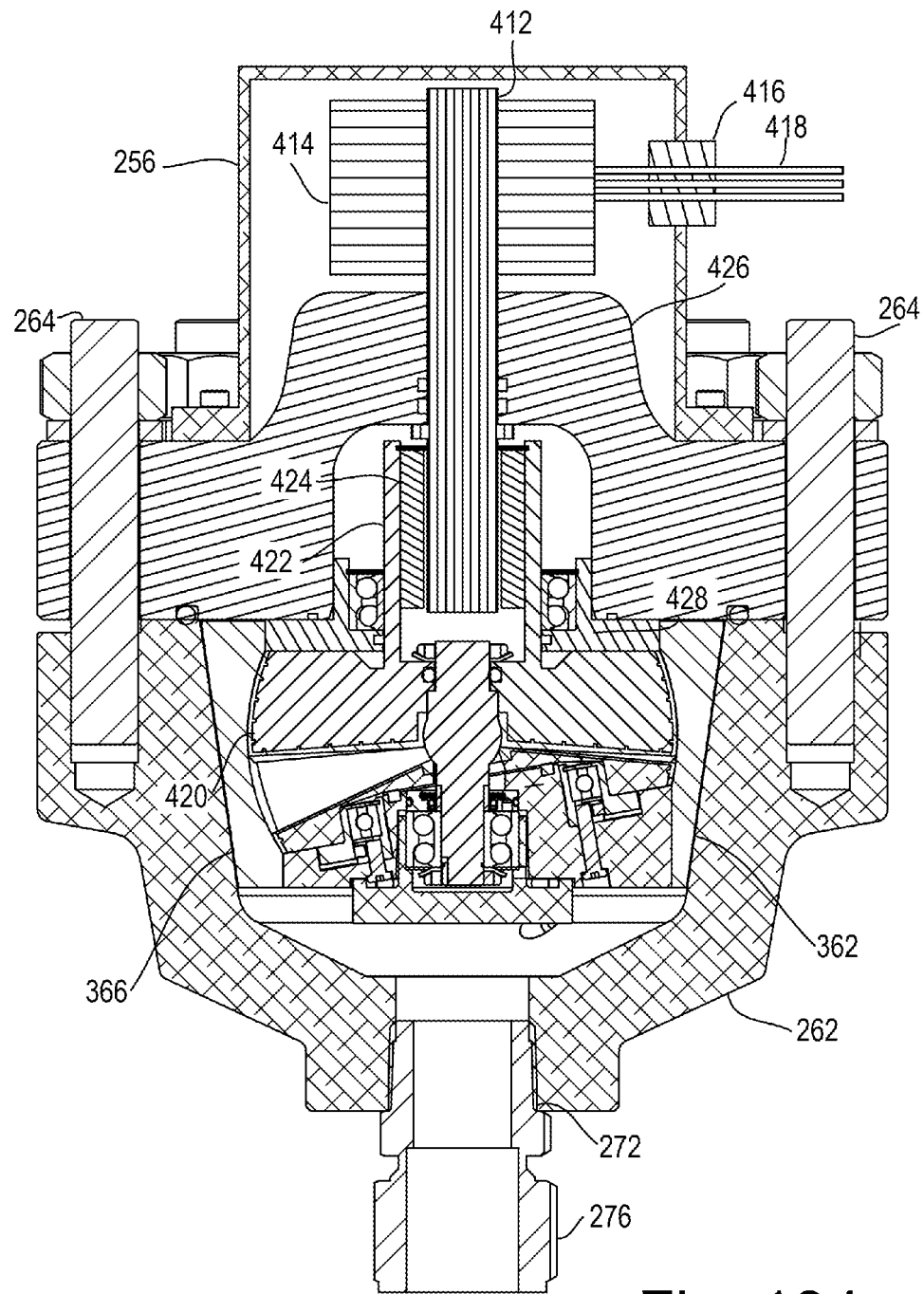
FIG. 104 is a side view of the apparatus using magnetic field translation cable.

The perimeter edge of the support component 298 in one form has recessed surfaces 400/402 which cooperate with recessed surfaces 406/408 in the tilt support component 304 (FIG. 93) for attachment of side projections 364/366 (FIG. 104). In one form fasteners 398 pass through holes in the projections 364/366 and are received by (threaded into) receiving surfaces 410 in the support component 398 and tilt support component 304.

Looking to FIG. 104 is a variation utilizing the magnetic field translating cable of disclosed in U.S. Pat. No. 6,239,361 incorporated herein by reference for the technical features which it presents. It can be seen in FIG. 104 that several components of this variation are substantially identical to the equivalent components of FIG. 91 such as the lower housing 262, outlet 272, fitting 276, and fasteners 264.

This variation used a magnetic field translating cable 412 which is adjacent a stator 414. In this variation, the upper rotor 420 has a protrusion 422 that rotates a plurality of magnets 424. This generates a magnetic field flux which is translated through the cable 412 and then generates power (electric current) in the stator 414 which is transmitted by wires 418 through the stator enclosure 256 at a fitting 416.

It can be seen in this example how the upper flange 426 is different than the flange 258 of FIG. 91. In particular, the pressure containing flange 426 is designed to allow the magnetic field cable 412 to run through it, the cable 412 is sealed and rigidly constrained to the flange. It can be seen in this variation how the upper bearing holder/support component 428 is similar in some ways to the support component 298 but is reconfigured for this application. In particular, this variation allows for reliable assembly and alignment with removable side seal blocks such as the side seal blocks (projections) 364/366. The support component 428 may well use an equivalent to the perimeter seal groove 386/388 shown in FIG. 97.

While the present invention is illustrated by description of several variations and while the illustrative variations are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A rotary positive displacement device comprising:
   an outer housing comprising an outer housing fluid inlet, outer housing fluid outlet, and wherein at least a portion of the inner surface comprises a frusta-conic surface;
   an inner housing having a frusta-spherical inner surface, a frusta-conic outer surface, an inner housing fluid inlet adjacent the outer housing fluid inlet, an inner housing fluid outlet; and
   a malleable gasket radially pressed between the frusta-conic inner surface of the outer housing and the frusta-conic outer surface of the inner housing to form a fluid-tight seal therebetween.

2. The rotary positive displacement device as recited in claim 1 wherein a slight degree of movement of the inner housing relative to the outer housing is permitted by the gasket relative to the outer housing during assembly, and movement of the inner housing relative to the outer housing is repressed following assembly by rigid attachment of the inner housing to the outer housing.

3. A rotor for a rotary positive displacement device comprising;
   a forward surface operatively configured to interoperate with an opposing rotor;
   a rearward surface longitudinally opposite the forward surface;
   wherein the forward surface comprises a circumferential pattern of mounds and valleys;
   wherein the rotor is configured to rotate in a first rotational direction defining a leading face on each mound;
   wherein the leading face of each mound comprises a raised portion from a radially inward portion of each mound toward the radially outward portion of the mound to form a contact surface on the leading face of each mound where the opposing rotor will contact during the period of minimum volume of the rotation,
   wherein the raised portion does not extend the radial length of the mound; and
   wherein the remainder of the leading face does not contact during any point of rotation.

4. The rotor for a rotary positive displacement device as recited in claim 3 where the raised portion on the leading face of each mound of will contact the opposing rotor during full rotation of the rotors, wherein the remainder of the leading face does not contact the opposing rotor during full rotation of the rotors.

5. A rotary positive displacement device comprising:
   a plurality of interoperating rotors each having a frusta-spherical outer surface;
   wherein the axis of rotation of the rotors are offset from parallel and intersecting;
   a housing having a frusta-spherical inner surface of larger diameter than the outer diameter of the rotors;
   the housing further having a fluid inlet and a fluid outlet to the frusta-spherical inner surface;
   wherein the rotors rotate within the housing; and
   at least one deflecting projection extending from the frusta-spherical inner surface of the housing, and
   the deflecting projection having a radial thickness substantially equivalent to the gap between the inner surface of the housing and the outer surface of the rotors to deflect or direct debris and fluid passing through the housing towards the center of rotation of the rotors.

6. The rotary positive displacement device as recited in claim 1 further comprising:
   the outer housing and the inner housing forming an overall housing containing the interoperating rotors;
   the malleable seal fitted between an inner surface of the outer housing; and an outer surface of the inner housing; and
   the malleable seal having a thickness substantially equivalent to the gap between the inner surface of the outer housing and the outer surface of the inner housing.

7. The rotary positive displacement device as recited in claim 6 wherein the malleable seal is an O-ring, fitted partially within an O-ring groove disposed in the outer surface of the inner housing and/or the inner surface of the outer housing.

8. The rotary positive displacement device as recited in claim 6 wherein the malleable seal is flat seal disposed between the outer surface of the inner housing and the inner surface of the outer housing.

9. The rotary positive displacement device as recited in claim 1 wherein rotors comprise an outer surface formed of a malleable material so as to allow debris such as sand and other contaminates within a fluid flow passing through the device, to temporarily impregnate the surface of the rotor such as to reduce jamming or damage to the rotors.

10. A rotary positive displacement device comprising:
    a plurality of interoperating rotors having interoperating lobes and valleys on a front side thereof, each rotor having a frusta-spherical radially outward surface;
    wherein the axis of rotation of the rotors are offset from parallel and intersecting; and
    wherein each rotors is constructed of a malleable material fastened to a rigid backing plate.

11. The rotary positive displacement device as recited in claim 10 wherein the malleable material is a polymeric composition.

12. The rotary positive displacement device as recited in claim 10 wherein the rigid backing plate is coupled to a back side of the malleable material in opposition to the face side of the rotor wherein the backing plate is comprised of a different material than the malleable material.

13. he rotor as recited in claim 10 wherein the backing plate is comprised of metal.

14. The rotor as recited in claim 10 wherein the coefficient of expansion of the malleable material is substantially equivalent to the coefficient of expansion of the backing plate.

15. he rotor as recited in claim 10 wherein the backing plate is fastened to the main body with screws.

16. A rotary positive displacement device comprising:
    a plurality of interoperating rotors each having a frusta-spherical outer surface;
    wherein the axis of rotation of the rotors are offset from parallel and intersecting; and
    wherein the rotors comprise interoperating mounds and valleys which contact substantially at a top dead center position and substantially at a bottom dead center position wherein the rotors do not contact at other positions through rotation.

17. A positive displacement rotary motion device comprising:
    an inner housing formed by:
    i. side blocks attached between and supporting the upper support component and lower tilt support components;

ii. the side blocks having spherical concave faces that engage spherical outsides of the first and second rotors;

iii. a bottom bearing holder, bearing against the through shaft, the bottom bearing holder fastened to the tilt support component;

an upper support component;

a through shaft with a center sphere feature;

magnets mounted to rotate with an upper part of the through shaft, a lower angled tilt support component;

a first and a second spherical rotors each with a plurality of lobes where the rotors are offset from collinear;

a first rotor mounted to through shaft;

the rotors having a frusta-spherical radially outward surface; and a second rotor bearing against the tilt support component.

18. The positive displacement rotary motion device as recited in claim 17 further comprising: a mating gasket or O-ring seal on a radially outer surface thereof for placement of the rotary motion device into an outer housing having inlet and outlet ports.

19. The positive displacement rotary motion device as recited in claim 17 further comprising:

an end cap attached to the housing, a containment shroud member extending out of the housing end flange; and the containment shroud member surrounded by a stator element for producing electricity.

20. The positive displacement rotary motion device as recited in claim 17 further comprising clearance holes to allow some freedom of movement of the side blocks relative to the upper support component and/or lower support component during assembly.

21. The positive displacement rotary motion device as recited in claim 17 further comprising:

an upper bearing chamber;

a lower bearing chamber; and surfaces defining communication ports between the upper bearing chamber and the lower bearing chamber to provide pressure balancing between the bearing chambers.

22. The positive displacement rotary motion device as recited in claim 17 further comprising: felt seals positioned between bearing and fluid chambers for pressure balancing bearings and/or bearing seals.

23. The positive displacement rotary motion device as recited in claim 17 further comprising:

a magnetic field translating cable having a first end within a fluid chamber positioned near the shaft;

a plurality of magnets fixed to rotate with the shaft about the magnetic field translating cable;

the magnetic field translating cable having a central portion passing through and sealed to a pressure containing flange; and the magnetic field translating cable having a second end positioned external of the fluid chamber and within a stator such that rotation of the magnets produces a magnetic field flux, which is translated through the cable to the stator where the magnetic field flux to produce electric current within the stator.

24. The positive displacement rotary motion device as recited in claim 23 wherein:

the stator is contained within a stator housing, sealed to the pressure containing flange; and electric current transmitting wires pass through a sealed fitting of the stator housing to transmit electric current generated in the stator to external devices.

* * * * *